US007694312B2

(12) United States Patent
Rivard et al.

(10) Patent No.: US 7,694,312 B2
(45) Date of Patent: Apr. 6, 2010

(54) METHODS AND APPARATUS FOR ENABLING BUS CONNECTIVITY OVER A DATA NETWORK

(75) Inventors: Alain Rivard, Kanata (CA); Martin Dubois, Charny (CA)

(73) Assignee: Pleora Technologies Inc., Kanata (CA)

( * ) Notice: Subject to any disclaimer, the term of this patent is extended or adjusted under 35 U.S.C. 154(b) by 1157 days.

(21) Appl. No.: 10/937,423

(22) Filed: Sep. 10, 2004

(65) Prior Publication Data

US 2006/0059287 A1 Mar. 16, 2006

(51) Int. Cl.
*G06F 9/54* (2006.01)
(52) U.S. Cl. .................. 719/321; 719/328; 710/305
(58) Field of Classification Search .............. 719/321, 719/328; 709/223, 225; 710/305, 306
See application file for complete search history.

(56) References Cited

U.S. PATENT DOCUMENTS

| | | | | |
|---|---|---|---|---|
| 5,978,856 | A | | 11/1999 | Jones ........................ 709/301 |
| 6,101,555 | A | * | 8/2000 | Goshey et al. .............. 719/321 |
| 6,308,282 | B1 | * | 10/2001 | Huang et al. ................... 714/4 |
| 6,895,588 | B1 | * | 5/2005 | Ruberg ....................... 719/321 |
| 7,124,228 | B2 | * | 10/2006 | Grouzdev ................... 710/306 |
| 2005/0210479 | A1 | * | 9/2005 | Andjelic ..................... 719/321 |

FOREIGN PATENT DOCUMENTS

| JP | 11266286 | 1/1999 |
|---|---|---|
| WO | WO 04/001615 | 12/2003 |

* cited by examiner

*Primary Examiner*—Li B Zhen
(74) *Attorney, Agent, or Firm*—Brett J. Slaney; Blake, Cassels & Graydon LLP

(57) ABSTRACT

A method and system for interconnecting peripherals, processor nodes, and hardware devices to a data network to produce a network bus providing OS functionality for managing hardware devices connected to the network bus involves defining a network bus driver at each of the processor nodes that couples hardware device drivers to a network hardware abstraction layer of the processor node. The network bus can be constructed to account for the hot-swappable nature of the hardware devices using a device monitoring function, and plug and play functionality for adding and removing device driver instances. The network bus can be used to provide a distributed processing system by defining a shared memory space at each processor node. Distributed memory pages are provided with bus-network-wide unique memory addresses, and a distributed memory manager is added to ensure consistency of the distributed memory pages, and to provide a library of functions for user mode applications.

50 Claims, 31 Drawing Sheets

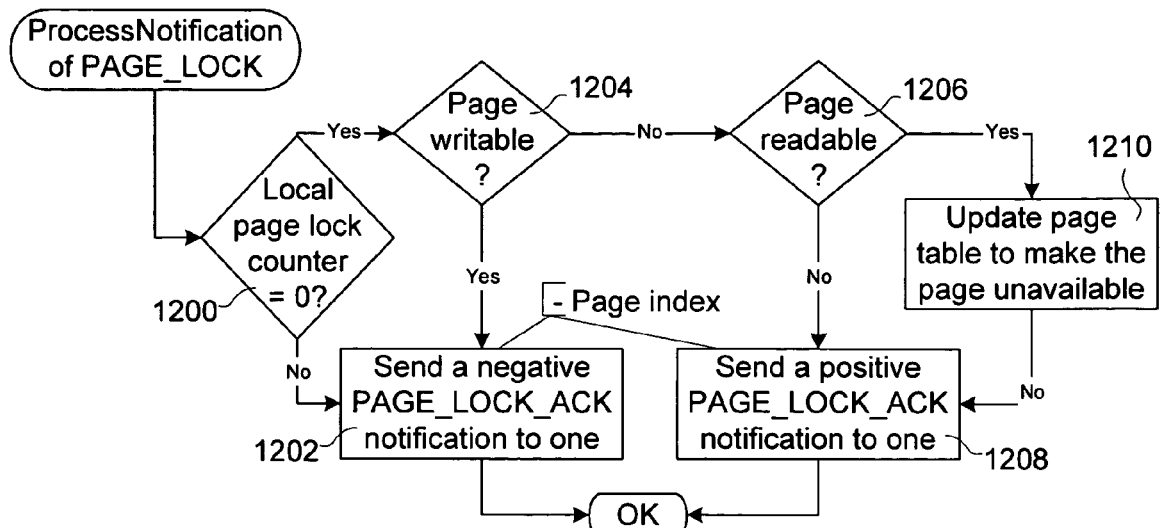
FIG. 17
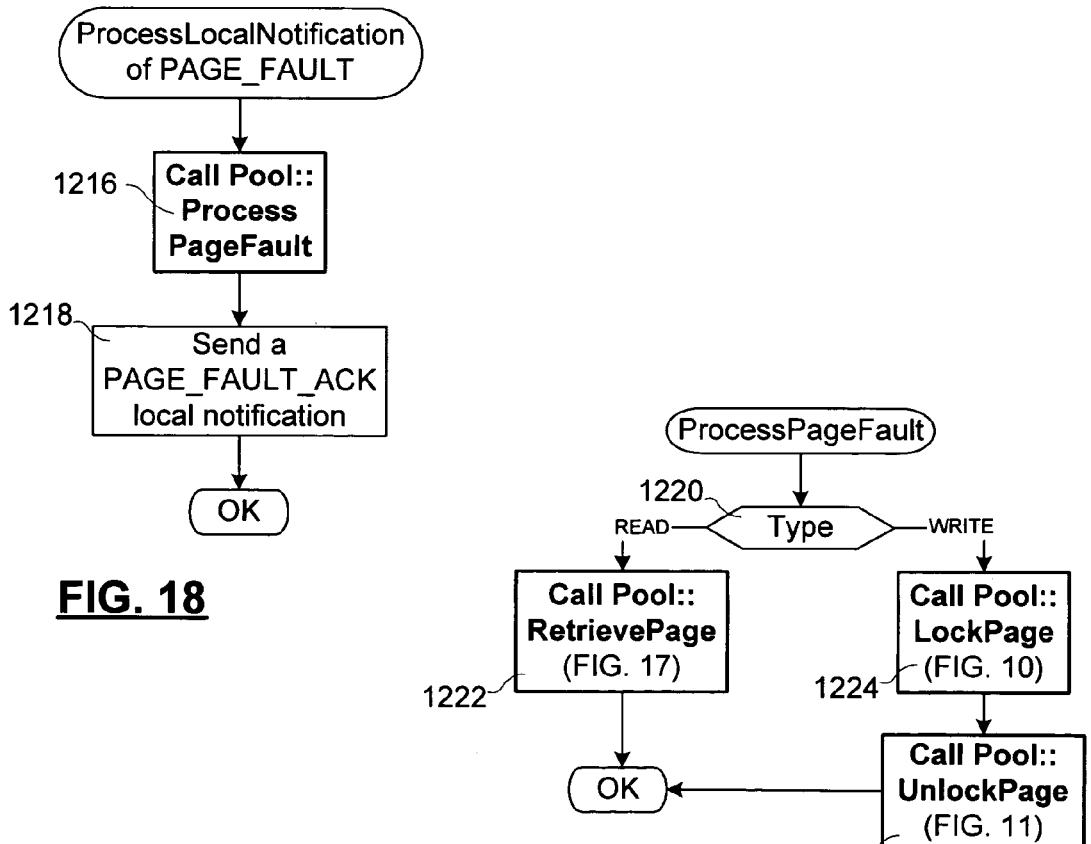
FIG. 18
FIG. 19

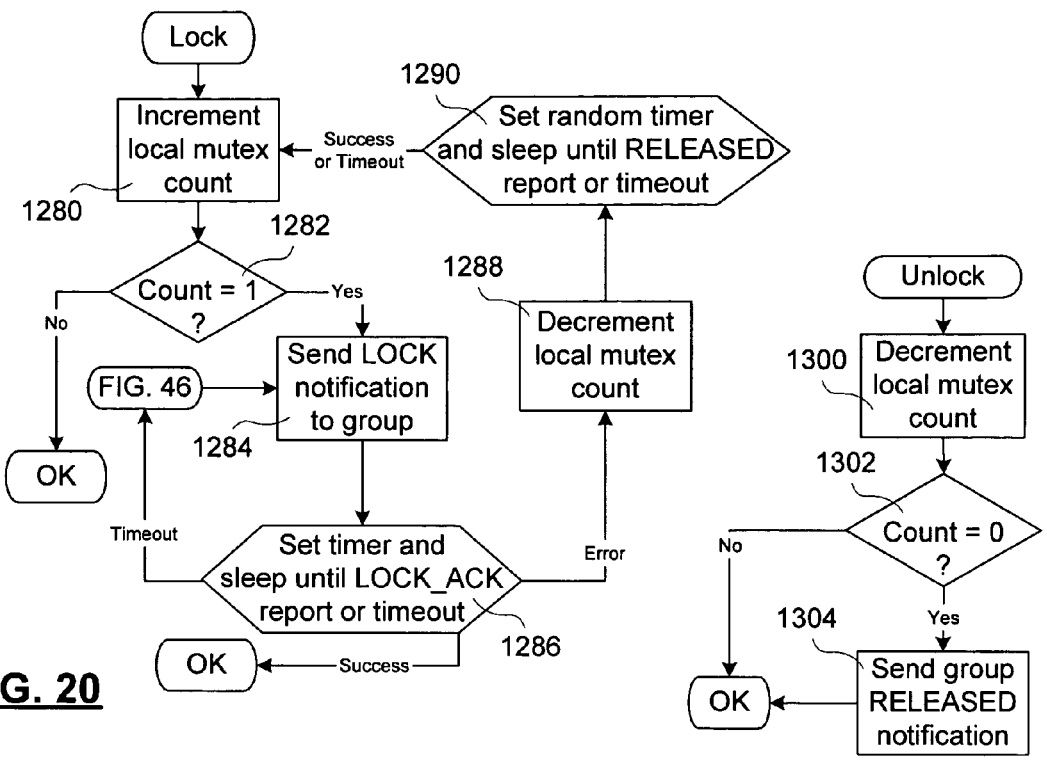
FIG. 20
FIG. 21
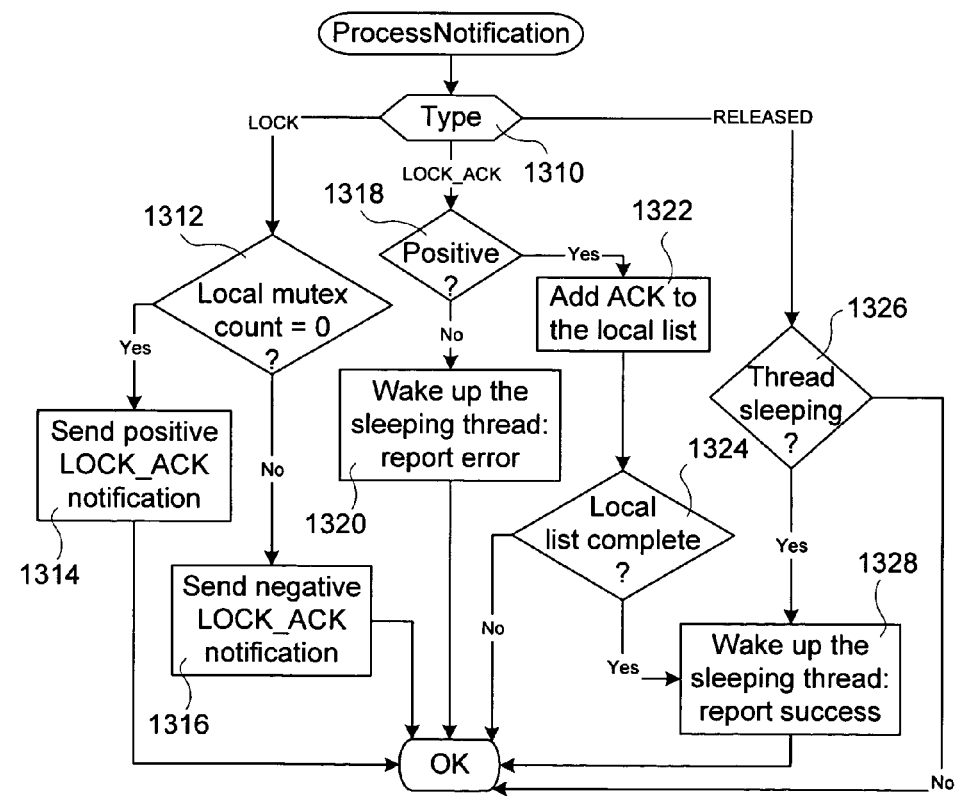
FIG. 22

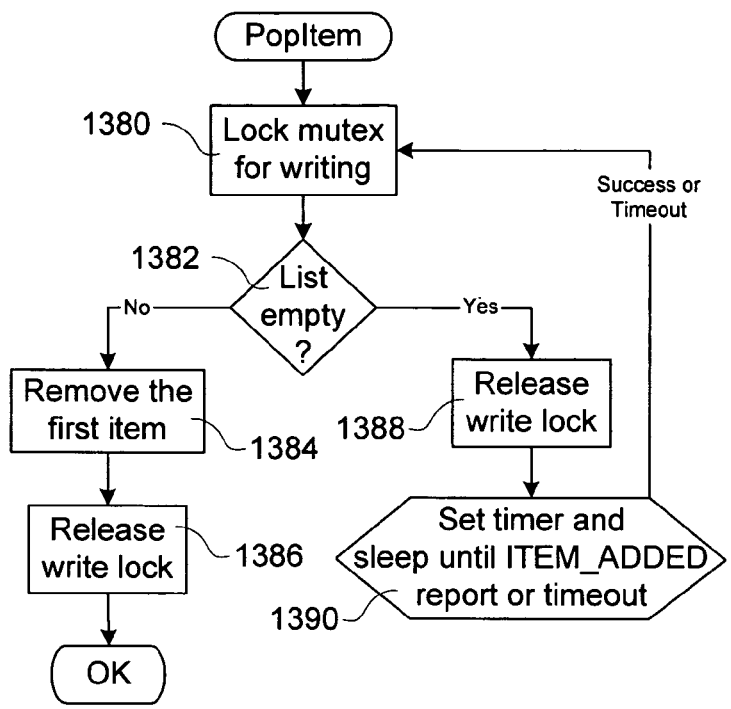
FIG. 26
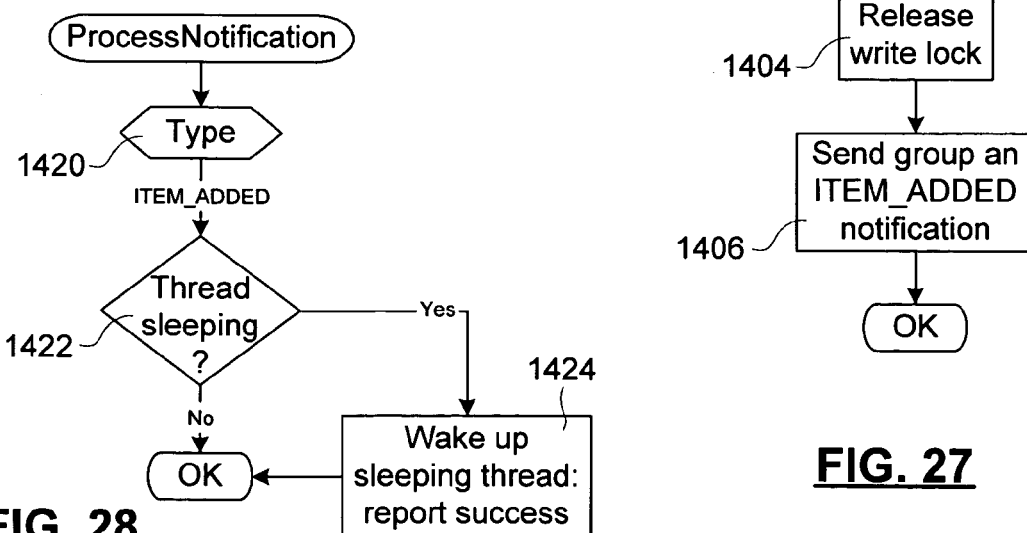
FIG. 28
FIG. 27

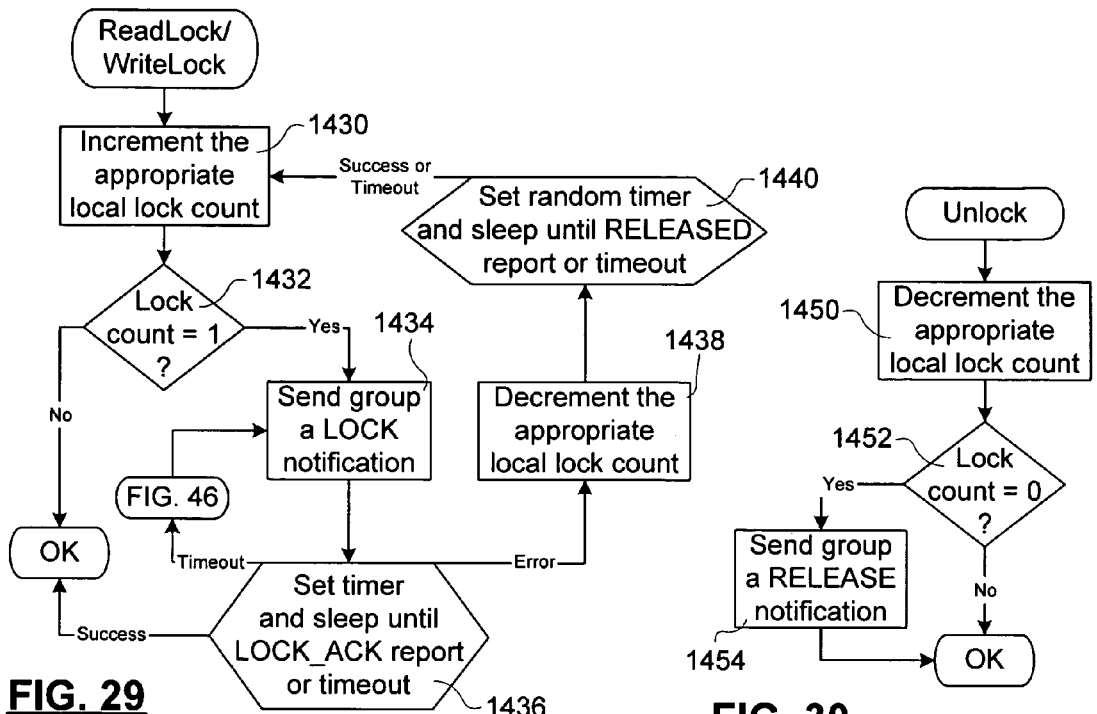
FIG. 29
FIG. 30
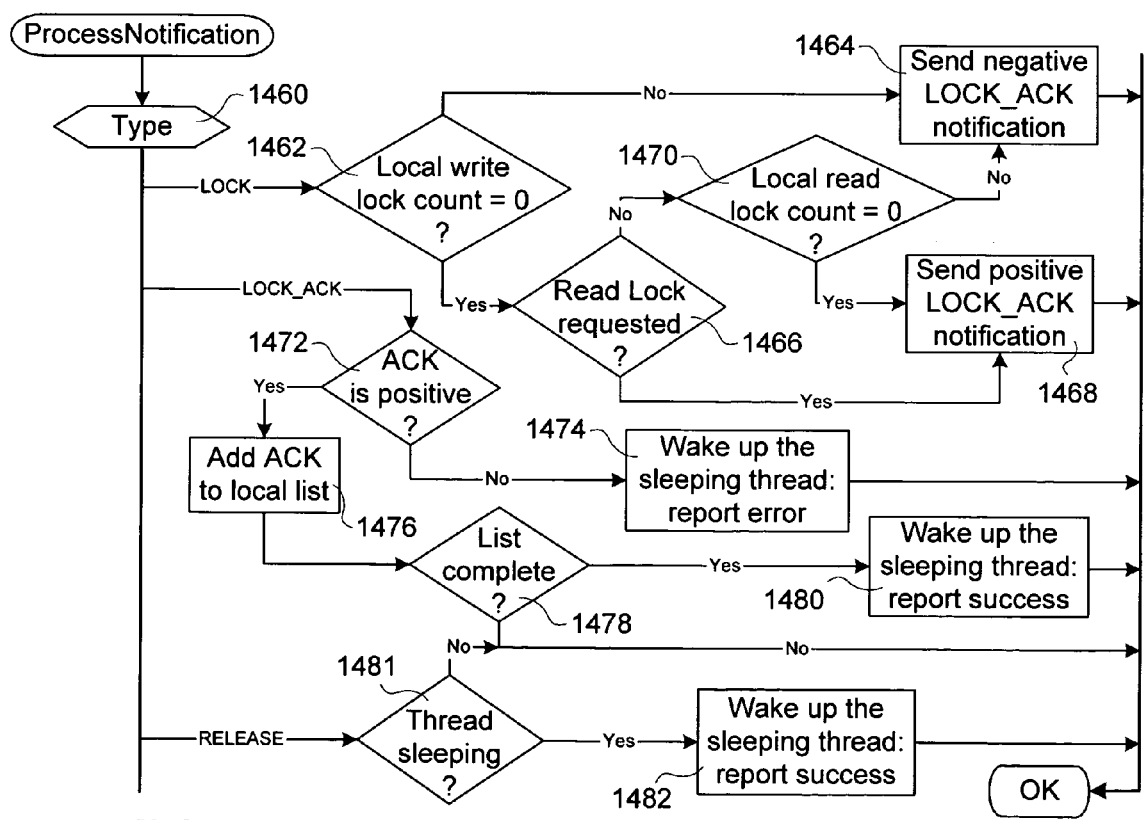
FIG. 31

METHODS AND APPARATUS FOR ENABLING BUS CONNECTIVITY OVER A DATA NETWORK

CROSS-REFERENCE TO RELATED APPLICATIONS

This is the first application filed for the present invention.

MICROFICHE APPENDIX

Not Applicable.

TECHNICAL FIELD

The invention relates in general to data communications and computing, and in particular to methods and apparatus that permits bus connectivity over a data network so that standard network interface cards serve as bus controllers, in order to create a network bus for sharing device connections, management tasks, memory, input/output operations and processing capabilities among network-connected nodes.

BACKGROUND OF THE INVENTION

The coupling of processor nodes by data networks to permit the cooperation and sharing of data and resources has long been of recognized value. Distributed processing systems have been developed to harness processing capabilities of many individual processor nodes. Typically, distributed processing systems define each processor node as a client or a server, which runs corresponding software. Distributed applications, i.e. application that run on processor nodes of a distributed processing system, control peripheral devices, and communicate information to remote applications. It is the nature of distributed applications that details of the remote applications are required by the local application. The client/server approach has well known limitations respecting scalability, i.e., as the number of client processor nodes is increased to satisfy increasing processing load, the server (the center of communications and control) becomes a bottleneck of the system. In order to produce a scalable system, the server's communications bandwidth and processing capability must scale with the number of processor clients.

Remote invocation methods which permit applications to share resources over a network, such as Remote Procedure Call (RPC), have also been proposed. Numerous distributed operating systems (OSs) have been developed to take advantage of the features associated with remote invocation methods to permit direct processor node-to-processor node communication. This method does not inherently rely on a client server architecture, which permits designers to overcome the scalability limitations associated with client server-based systems. Distributed operating systems such as Amoeba, and Cajo rely on RPC.

Because of complexity inherent in some distributed operating systems, such as Amoeba, the costs of developing distributed applications are much higher that when creating comparable non-distributed applications. To date all distributed operating systems rely on an RPC-like communication structure.

The RPC protocol was designed to be implemented on a processor node with general purpose capabilities, and as such is not easily implemented on network-enabled hardware devices that do not have processors.

Both of these prior art methods also require the software developer to specify how each application is to be distributed and how the data is to be shared. A method for building distributed applications as easily as non-distributed applications, is therefore desirable.

Additionally, with a proliferation of network-enabled hardware devices, such as cameras, that do not include native processors, there is a need for processorless devices to be able to communicate with a processor node. In some applications of distributed processing systems, it is cost effective to deploy hardware devices that do not have native processors for certain tasks. Hardware devices, such as cameras, produce volumes of data, and it is cost effective to distribute the processing of this data between a number of different processor nodes. A method is therefore needed to enable communications with processorless hardware devices that is also consistent with communications between multiple processor nodes. A scalable distributed architecture is needed to support the processing of this data.

Accordingly it is clear that there remains a need for improved communications between processor nodes and hardware devices.

SUMMARY OF THE INVENTION

It is therefore an object of the invention to provide an improved communications framework that permits processor nodes to selectively leverage operating system capabilities within a network environment.

In accordance with one aspect of the invention a method for enabling bus connectivity to hardware devices interconnected by a data network is provided, where the hardware devices include at least one processor node coupled to the data network by network interface circuitry (NIC). The method involves installing a network bus driver on each processor node connected by the network bus, registering a driver of each NIC with the respective network bus driver, to permit the network bus driver to effect communications with the hardware devices via the data network, and instantiating device drivers on each of the at least one processor node for controlling respective hardware devices through the network bus driver. The network bus driver, NIC driver and device drivers define a bus abstraction layer that permit a network bus to be defined over the data network. The NIC assumes functionality of a bus controller.

Instantiating the device drivers may accommodate a hot-swappable nature of the hardware devices. For example, instantiating the device drivers may involve instantiating drivers for base driver objects that may be added to or removed from the network while the processor node remains connected to the data network, providing a device monitoring function that uses network messaging to detect the connection and disconnection of the hardware devices from the data network, and providing a plug and play functionality for adding and deleting device driver instances in response to the connection and disconnection of the hardware devices.

The method may further provide a device and service connector in communication with the network bus driver at each of the processor nodes, the device and service connector embodied as a plug and play kernel mode device driver. The device and service connector publishes a user mode access interface that permits device and service drivers to access the network bus driver through the device and service connector. The user mode access interface defines a list of functions for an I/O manager of an operating system of the processor node.

The method may further permit a peripheral device or special application of one of the processor nodes to be bus-connected to the networked devices by providing a user mode software device gateway that uses the published access, interface to permit a driver of the peripheral device (or a special service) to access the network bus driver, or by providing a kernel mode plug and play driver for accessing the network bus driver.

The method may further enable memory sharing and distributed processing among processor nodes connected to the network bus, in which case each of the processor nodes having a same operating system is provided with a distributed memory manager that cooperates with the operating system to define and maintain a shared memory space of distributed memory pages that is consistent with those of the other processor nodes to define a pool of shared objects. The distributed memory manager uses an addressing scheme for uniquely identifying each of the distributed memory pages. And the method further provides a distributed memory driver of the distributed memory manager for effecting communications over the network bus to update pages of the shared memory space in order to maintain the consistency of the data when changes are made at one of the processor nodes.

The addressing scheme is enforced by providing program instructions for each processing unit to maintain a code space of addressable program instructions, the code space definable by a list of operations loaded and unloaded by the processing unit, and by providing program instructions for communicating any change in the code space to the corresponding code spaces of processing units of the same distributed process by adding code space change operations to the operation list.

Preferably the distributed memory manager provided further enables a notification system for permitting shared objects to exchange data.

The method may further permit bus-to-bus bridges for enhanced security, link aggregation for increasing a bandwidth of the network bus, and high availability applications that provide redundancy of processing units.

Further objects of the invention involve a system for embodying the method.

BRIEF DESCRIPTION OF THE DRAWINGS

Further features and advantages of the present invention will become apparent from the following detailed description, taken in combination with the appended drawings, in which:

FIG. 17 is a flow chart illustrating principal steps involved in processing a notification sent to lock a page in accordance with an embodiment of the invention;

FIGS. 18 and 19 are flow charts illustrating principal steps involved in processing page faults in accordance with an embodiment of the invention;

FIGS. 20, 21 and 22 are flow charts illustrating principal steps involved in mutex locking and unlocking data structures in accordance with an embodiment of the invention;

FIGS. 26, 27 and 28 are flow charts illustrating principal steps involved in PopItem, PushItem and notification handling methods of the ListHead object used to manage a queue of IDLE ProcessingUnits, in accordance with an embodiment of the invention;

FIGS. 29, 30 and 31 are flow charts illustrating principal steps involved in ReadWriteMutex methods used to provide shared read locks on a data structure, in accordance with an embodiment of the invention;

It should be noted that throughout the appended drawings, like features are identified by like reference numerals.

DETAILED DESCRIPTION OF THE PREFERRED EMBODIMENT

In accordance with the invention a system and method are provided for interconnecting peripherals, processor nodes, and hardware devices via a network bus. The invention provides a network bus that leverages operating system (OS) functionality of processor nodes for managing the hardware devices, and for providing an alternative mechanism for accessing the hardware devices at the processor nodes that avoids delays associated with legacy network subsystems of current OSs. A network bus driver is provided at each of the processor nodes that couples hardware device drivers (and other, preferably plug and play, drivers) to a network hardware abstraction layer of the processor node. By using plug and play hardware device drivers the network bus can be constructed to account for the hot-swappable nature of the hardware devices. Peripherals of the processor nodes can be connected to the network bus by providing a software device gateway between a driver of the peripheral (or other user mode software providing a special service) and the network bus abstraction layer. The sharing of control of certain hardware devices can be enabled/facilitated by providing a kernel mode shared memory space at each of the processor nodes, the kernel mode shared memory space providing mirror images of parts of the kernel mode of each of the other processor nodes, to permit the sharing of context information related to the hardware devices.

The network bus can be used to produce a distributed processing system by defining a shared user mode memory space at each processor node. Distributed memory pages belonging to a distributed process are provided with network-wide unique memory addresses, and a distributed memory manager is added to ensure consistency of the distributed memory pages, and to provide a library of functions for user mode applications. Mutually exclusive locking of application-defined data structures permit consistency of data. The maintenance of a consistent code space for each processing unit may be provided using an operation list that provides a complete list of the order in which user mode library files are loaded and unloaded from memory into the code space.

Figure 1:
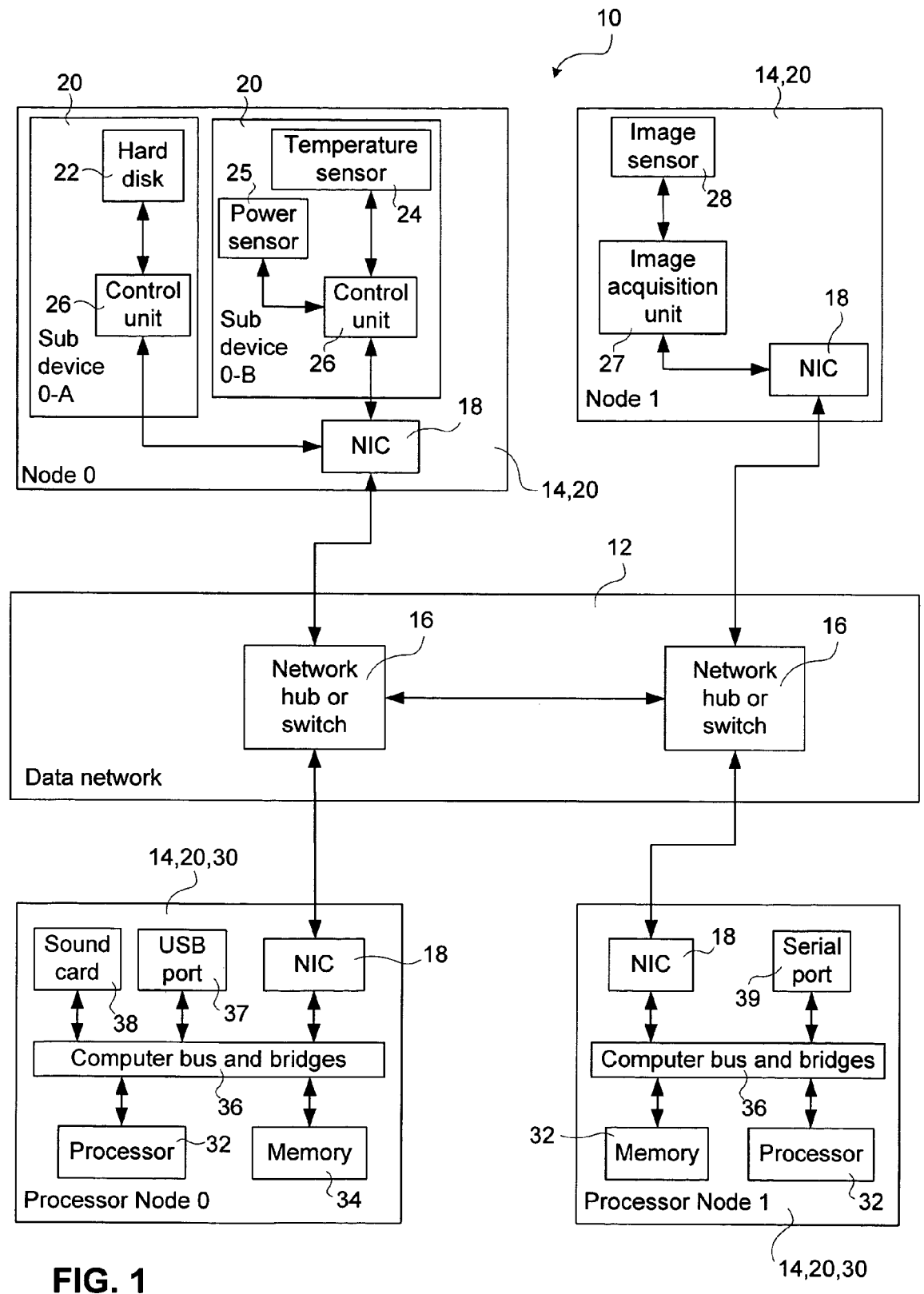
FIG. 1 is a block diagram of an example of hardware components of a network bus in accordance with an embodiment of the invention.

FIG. 1 schematically illustrates principal hardware blocks of an exemplary embodiment of a network bus 10 in accordance with the invention. The network bus 10 consists of a data network 12 which interconnects a plurality of nodes 14.

The data network 12 may be of any known configuration, including those that include multiple subnetworks. As is typical of current data networks, data network 12 consists of a plurality of interconnected hubs, routers, and/or switches 16 (two illustrated) that are interconnected, and connected to the nodes 14 by data transmission links. The data network 12, for example may permit transmission of Internet Protocol (IP) packets between the nodes 14. In accordance with the present invention, the data network 12 supports a network bus 10.

Any end-point hardware connected to the data network 12 (i.e. not a dedicated hub, switch or router 14) by network interface equipment (e.g. network interface cards or chips or circuitry (collectively referred to as NICs 18)) is a node 14. It is a considerable advantage of the present invention that commonly used NICs (such as commercially available Ethernet cards and integrated circuits) are acceptable, and the data network 12 can likewise consist of common used network equipment. The present invention permits standard NICs 18 to serve as bus controllers for the network bus 10. Each node 14 will contain a network bus driver to control the interface with the NIC. The network bus driver can be software or hardware based on the resources available on the node 14.

Each node 14 is a hardware device 20, and may further include one or more hardware devices 20 as respective subsystems. Each hardware device 20 for the data network 12 has a respective address and serves as a respective message termination point of the data network 12. Each message termination point is effected by a NIC 18 of a node 14 on which the hardware device 20 resides, but any hardware device 20 may or may not be a node 14. A node 14 with functional units known as sub-devices provides network bus access to the sub-devices via the node's NIC 18.

For example, a Node 0, and a Node 1 are illustrated. Node 0 includes a NIC 18, and two sub-devices (0-A, 0-B) which are hard disk 22, temperature sensor 24 and power sensor 25, which are each hardware devices 20. Each of the hardware devices 20 of Node 0 is a message termination point, and includes a control unit 26 that provides limited message processing capabilities to effect commands issued to the corresponding hardware (hard disk, sensor, etc.).

Node 1 has no subdevice. Accordingly Node 1 includes a NIC 18 that is dedicated to the (camera) hardware device 20, which includes an image acquisition unit 27, for controlling an image sensor 28. Typically a NIC 18 used in a node 14 like Nodes 0,1 is a network interface chip, rather than a network interface card. The functioning of such hardware devices 20 are known in the art and will not be further elaborated.

A node 14 with processing capability is known as a processor node 30. Processor nodes 30 are adapted to access any hardware device 20 connected to the network bus 10. Nodes 14 that are not processor nodes 30 can be slave devices to processor nodes 30, as will be well understood by those skilled in the art. As illustrated, typical Processor Nodes 0,1 include one (or more) processors 32 (such as central processing units), memory 34, and a plurality of peripheral devices, all of which are interconnected by a processor node bus 36. Processor Node 0 includes the following peripherals: a universal serial bus (USB) port 37, and a sound card 38; and Processor Node 1 includes a serial port 39 peripheral. In accordance with an aspect of the invention, peripheral devices of processor nodes, can be made accessible to the network bus 10.

Figure 2:
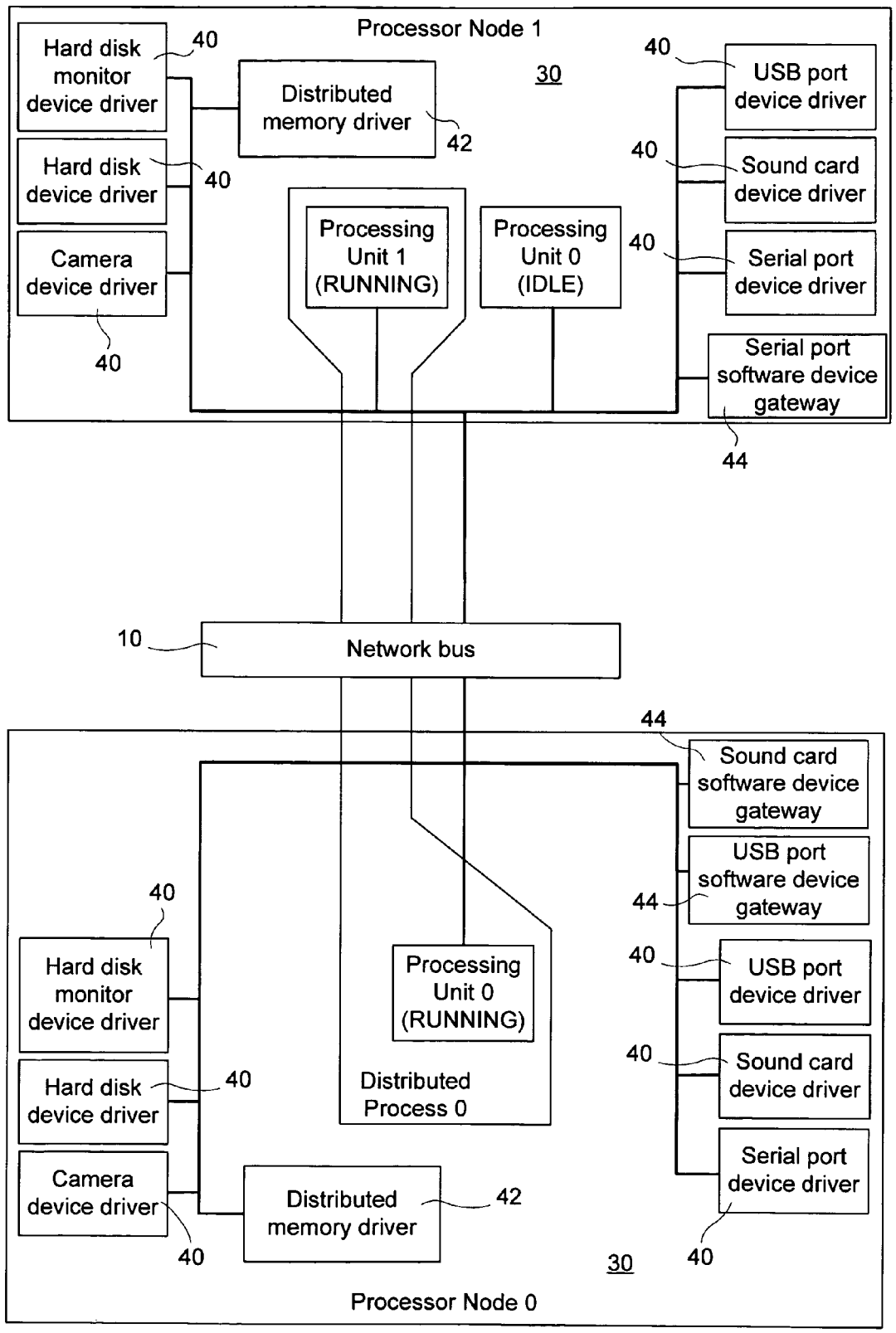
FIG. 2 is a block diagram of software functionality of the processor nodes shown in FIG. 1.

FIG. 2 schematically illustrates selected functional blocks of software resident on respective Processor Nodes 0,1 shown in FIG. 1. It will be evident to those skilled in the art that there are typically numerous drivers resident on a processor node 30 that are not illustrated in FIG. 2. FIG. 2 schematically shows that each of the Processor Nodes 0,1 has a corresponding device driver 40 for each of the hardware devices 20 that are connected to the network bus 10. Specifically, device drivers 40 are supplied for each of the camera, hard disk, and temperature sensor and power sensor hardware devices 20.

In accordance with some embodiments of the invention, the network bus 10 provides transparent connections between all hardware devices 20 enabling the sharing of their respective capabilities. Capabilities include, but are not limited to, processing capacity, memory (including kernel and user space memory), and input and output (I/O) devices such as a display, a camera, a mouse and a keyboard.

In order to enable the processor nodes 30 to share user mode memory, a distributed memory driver 42 is resident on the processor nodes 0,1. The distributed memory driver 42 is a part of a distributed memory manager adapted to maintain a pool of distributed memory pages that can be accessed by all of the processor nodes 30, as is further described below. Accordingly, different threads of one or more user mode applications can be executed by threads of a processing unit at remote processor nodes 30.

As the term is used herein, a distributed process is a process running on a set of processing units. The address space of the distributed process is separated into three parts that consist of the code space, private data and shared data. Each processing unit of the distributed process is started using the same start image. Each processing unit of a distributed process has an address space which indexes memory such that identical functions of different processing units are located at the same memory address. The addressing space of each processing unit includes a private data space and its main distributed memory pool. The distributed process is associated with an object created in the main distributed memory pool.

The user mode application can start a processing unit and directly give it a task to execute, in which case the processing unit is in a RUNNING state. A processor node 30 may also be configured to ensure a predefined number of IDLE (i.e. not RUNNING) processing units remain available. The number of processing units to keep available may be configured based CPU usage, for example.

In accordance with some embodiments of this invention, the selection of processing units as needed by a distributed process is made by device drivers and libraries, hidden from the applications themselves. From a running application's perspective the threads that are dispatched remotely are indistinguishable from threads that are dispatched locally. Consequently, application developers, do not need to be concerned with the details of the distributed system. The developer need only determine whether the process may be distributed, without defining a selection algorithm.

As illustrated in FIG. 2, threads of processing units (such as Processing Units 0,1) may be distributed across the processors 32 on a thread-by-thread basis. Threads of Processing Unit 1 are being run on the processors 32 of Processor Nodes 0,1, while Processing Unit 0 remains idle on Processor Node 1. The processing units can be controlled by any type of operating system (OS) that supports multiple threads, but the threads of a single distributed process must typically be run on processing units controlled by OSs of the same type.

In some embodiments, it is desirable to permit the processing load associated with controlling shared hardware devices 20 to be shared between processor nodes 30. If multiple processor nodes 30 are to serve as masters of a single (slave) hardware device 20, it may be helpful to share a kernel memory space between the processor nodes 30 using the distributed memory driver 42, as is further explained below. The distributed memory space is mapped such that a part of the kernel memory space of each processor node 30 is mirrored at the other processor nodes 30 and the user memory space is mapped with non-overlapping address spaces on all processor nodes 30.

In some embodiments, a reach of the network bus 10 is extended to include peripheral devices of the processor nodes 30 (such as the USB port 37, sound card 38, and serial bus 39). As will be explained further below, the inclusion of peripheral devices on the network bus 10 is enabled by adding software device gateways 44, which act as intermediaries between native drivers of the peripheral devices, and the network bus 10. In order to permit remote processor nodes 30 to control the peripheral devices, corresponding device drivers 40 are provided. Specifically both the Processor Nodes 0,1 are provisioned with serial port device drivers, sound card device drivers, and USB port device drivers.

It will be appreciated that the processor nodes 30 that have a processor node bus 36 that connects its processor 32 to the peripheral is able to access the peripheral via either the processor node bus 36 or the network bus 10, in accordance with one embodiment of the invention. Alternatively, in accordance with another embodiment of the invention, only one of the two buses may be used.

Enabling Bus Connectivity

One aspect of the invention permits processorless hardware devices 20 to be seen as a physical resource available to all the processor nodes present on the network bus 10. By configuring the hardware devices 20 to communicate as if over a bus, for example, a printer can be shared at the network bus level removing the need for network stack processing, which is a burden at high data throughput rates. As will be appreciated by those skilled in the art, typical OSs provide a network subsystem that permits communications according to a predefined protocol that involves numerous checks and intermediate steps that can be dispensed with when communicating with known devices if each device is associated with a respective kernel mode driver, as is further explained below.

If each of the hardware devices 20 is presented to the operating system as a native device, all security features the OS provides work normally over the network device. For instance, if a mass storage device is connected to processor node 30 via the network bus 10, an OS file management subsystem manages the file system and all features provided by the OS are supported.

Figure 3:
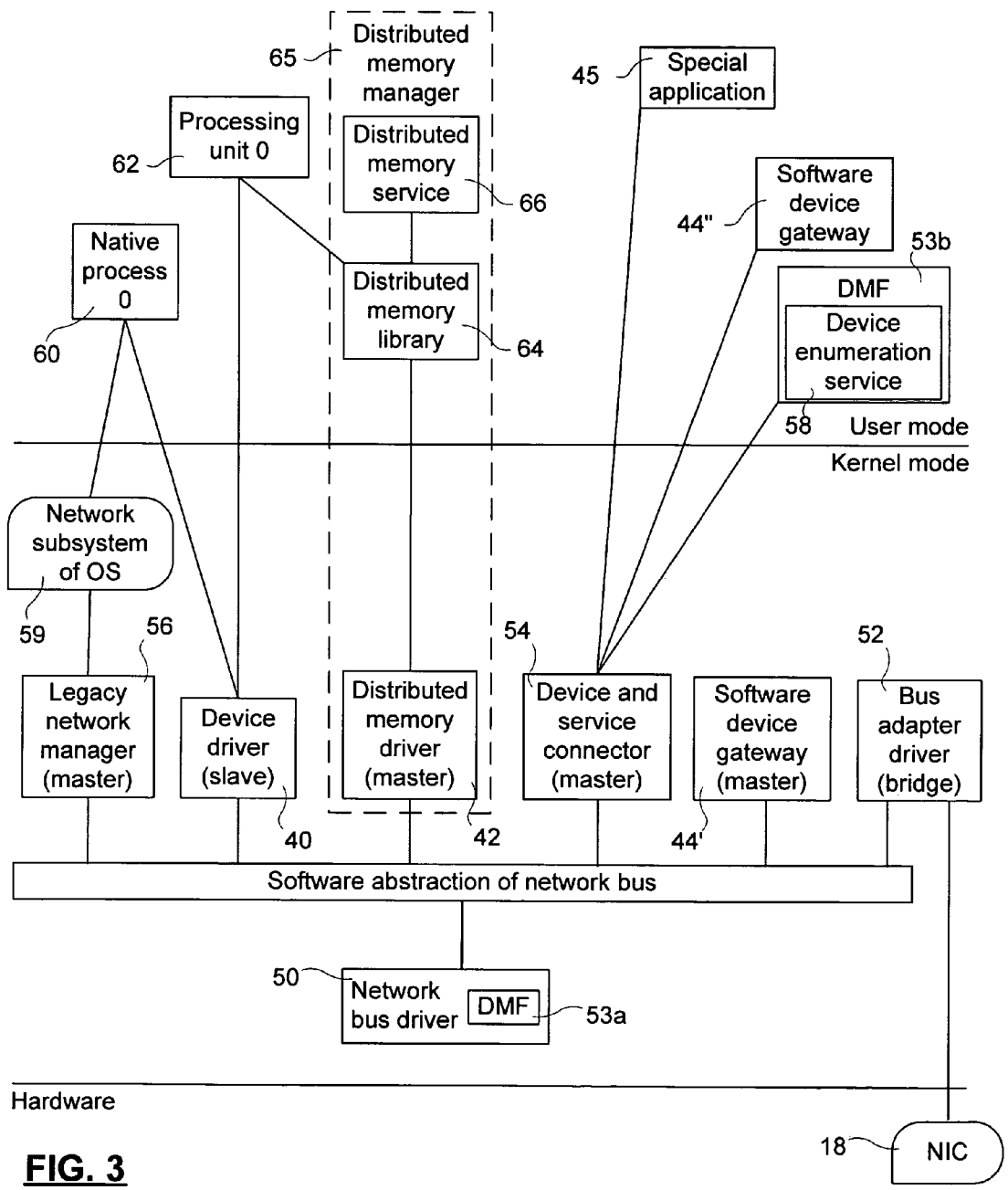
FIG. 3 is a schematic overview of a software driver architecture in accordance with an embodiment of the invention.

The bus connectivity shown in FIGS. 1,2 is achieved in part using a bus architecture, an overview of which is shown in FIG. 3. Control to this architecture is a network bus driver 50, an exemplary embodiment of which is described in detail below. The network bus driver 50 controls the exchange of network messages through a bus adapter driver 52, which directly controls the NIC 18. A plurality of plug and play device drivers communicate with the network bus driver 50 (including device drivers 40, distributed memory driver 42, and a software device gateway 44'). The plug and play device drivers are instantiated for a base OS network subsystem support to allow communications with standard data networking equipment and processes.

Each device driver 40 controls a corresponding hardware device 20. The device drivers 40 are designed to respect the operating system driver architecture enabling full interconnection with the operating system. Consequently the underlying data network connection is hidden the from the overlaying software layers.

In accordance with the illustrated embodiment, each plug and play driver provides one or more end points for communications over the data network 12, and is therefore associated with one or more sub-device numbers. Sub-device numbers are formed by concatenating a hardware (e.g. MAC) address of the NIC 18 with a locally unique 16 bit unsigned integer.

It is an advantage of the present invention that it can be deployed over Ethernet protocol networks. Ethernet cards are relatively inexpensive NICs, and Ethernet hubs, switches and routers are also relatively inexpensive. Furthermore, to facilitate access and control of hardware devices 20 that have limited or no general purpose processing capabilities, the network bus drivers 50 of respective processor nodes 30 run relatively low complexity standard protocols such as Ethernet, IP, user datagram protocol (UDP), transport control protocol (TCP), etc.

The network bus driver 50 maintains an up-to-date list of available hardware devices 20 in cooperation with a device monitoring function 53 (DMF) provided in part by the network bus driver 50, and in part by a device enumerator described further below. The device monitoring function updates a list of available hardware devices 20 and accesses a plug and play functionality which generally involves detecting newly connected hardware devices, and detecting disconnected (non-responsive) hardware devices. In accordance with the present invention the former is provided by a device enumerator DMF 53b, whereas the latter is provided by the network bus driver 50 DMF 53a, although it will be appreciated by those of skill in the art that the DMF may be provided cooperatively by both or exclusively by either, and can be effected in numerous ways. Where ever changes in the list of enumerated devices are detected, there must be a link to the plug and play functionality, which is a part of some OSs, but not a part of others. Part of the plug and play functionality involves instantiating device drivers for added hardware devices, and removing the device drivers of disconnected hardware devices.

The device monitoring function uses the presence or absence of network messaging to detect the connection and disconnection of the hardware devices. For example, a combination of message processing techniques and timers for each of the hardware devices 20 may be used. A timer for a hardware device 20 is reset every time a packet is received from the hardware device 20. If the timer reaches a predefined maximum value, the network bus driver 50 directs the bus adapter driver 52 to issue a message to the hardware device 20, in order to verify that the hardware device 20 remains in an operational state. If no reply to the message is received within an established period of time, the hardware device 20 is declared "dropped" to the plug and play functionality. Alternatively or additionally, each hardware device could broadcast a "keep alive" packet before expiry of its timer expires.

The network bus driver 50 registers three types of plug and play device drivers: slave device drivers, bridge device drivers and a master device drivers. Each slave device driver 40 (one shown: Device Driver 0) is associated with a respective slave hardware device 20. At least one bridge entity is required (such as the bus adapter driver 52) and is associated with (at least one) NIC 18. There are different plug and play drivers that are of a master device driver type, including software device gateways (such as Software Device Gateway 1 44'), the distributed memory driver 42, a device and service connector 54, a legacy network manager 56.

The bus adapter driver 52 is a bridge plug and play driver that is associated with instance settings. The network bus driver 50 registers these instance settings (including network (IP) addresses and a list of hardware device identifiers) that the network bus driver 50 passes to the OS when loading, or locating, associated device drivers. Accordingly the network bus driver 50 can switch the NICs and bus adapter driver 52 used to support the network bus, for example in the event of a failure of the currently used NIC. In this manner, plug and play drivers, such as the legacy network manager, distributed memory driver, device and service connector 54, etc. can be loaded as the network bus driver 50 is loaded.

The network bus driver 50 accesses the NIC via the bus adapter driver 52. The bus adapter driver 52 may be a standard off-the-shelf NIC driver, and is loaded as such except that rather than registering with the operating system as a network provider, it registers with the network bus driver 50. Thereafter the bus adapter driver 52 forwards received messages to the network bus driver 50.

The bus adapter driver 52 further performs two functions, hardware abstraction for the NIC 18 and bus contention. The first function makes the bus adapter driver 52 responsible for electrical connection to the particular NIC 18. The second function is a known medium access control layer function shared between all bus adapter drivers 52 (and software of the network interface chips) connected to, the data network 12 to avoid and correct collisions of data.

The bus adapter driver 52 may be configured to receive or ignore all messages transmitted over the data network 12; or it may participate in one or more multicast groups. In addition it may be adapted to change or add a MAC address to the NIC 18, for example to support link aggregation, as is further described below, or to permit definition of multiple software abstractions of the network bus 10, as described above.

The legacy network manager 56 is a native OS driver that connects the bus adapter driver 52 to the network subsystem 59 of the OS in the prior art. In the present embodiment the legacy network manager 56 is retained to facilitate previously existing functionality that relied on the network subsystem. The legacy network manager 56 is connected to the network bus driver 50. Unlike the device drivers 40, it is not associated with a specific hardware device 20. It provides a network subsystem interface, which performs protocol stack processing in a predefined manner. The OS network interface does not provide the flexibility for using different communications protocols for different messages, and invokes a procedure for handling the messages, which becomes a limitation at high messaging rates. Accordingly, one advantage of the instant embodiment of the invention is that numerous direct interfaces are provided between the user mode applications, and a software abstraction layer of the network bus 10. Each device driver 40 is associated with a respective user mode library file that permits installation and configuration of the device driver 40. The device and service connector library 64 publishes a general purpose access interface, all of which circumvents the legacy network manager 56 and the network subsystem 59.

A sub-device number assigned to the legacy network manager 56 is that of the network bus driver 50. The legacy network manager 56 has no specific setting. All setup information comes from the network subsystem 59. Because the legacy network manager 56 is included in the system of the illustrated embodiment, the network itself can also be used for standard network communications that are unrelated to the network bus 10. That is, the data network 12 and the NIC 18 are used as in the prior art and in parallel support the network bus 10. This minimizes the impact of the network bus architecture on existing applications processor nodes 30.

Each software device gateway 44 executes a native process for connecting a local device or service to the network bus 10. The software device gateway 44 may be instantiated as user mode program instructions (Software Device Gateway 0 44") that use the access interface provided by the device and service connector 54, or may be a kernel mode plug and play driver (Software Device Gateway 1 44'). Communications between remote hardware devices 20 and a peripheral or service of the processor node 30 running the software device gateway 44 is enabled by the software device gateway 44.

The device and service connector 54 is a plug and play driver and is associated with a library of user mode program instructions. The library publishes an access interface permitting user mode applications to access the network bus driver 50 using the device and service connector 54. The access interface is functionality that permits any number of devices and services with access to the network bus driver 50. For example the access interface simplifies development of program instructions for instantiating software device gateways (e.g. Software Device Gateway 0) and other special applications (e.g. special application 45).

Device Enumeration

A device enumerator is also provided to facilitate identification of hardware devices 20 that are added to the data network 12, in a manner described below. The device enumerator is embodied as a device enumeration service 58 which is provided by user mode program instructions that use the access interface.

One device and service connector 54 runs on, each network bus, and is connected to the corresponding network bus driver 50. The device and service connector 54 has the same subs-device number as the network bus driver 50. The device and service connector 54 forwards notifications output by the connected services and devices and also sends a notification if the device and service connector 54 must disconnect, to permit the connected service to disconnect.

In alternate embodiments, a device enumerator is provided as kernel mode program instructions adjunct to the network bus driver 50, for example, but in the illustrated embodiment, it is embodied as the device enumeration service 58 provided by a server application consisting of user mode program instructions that use the access interface provided by the device and service connector 54 for messaging over the network bus 10. The device enumeration service 58 is assigned a sub-device number by the device and service connector 54 at connection time. The sub-device number is a concatenation of the device and service connector 54 identifier (which is the same as the network bus driver 50 identifier) and a locally unique 16 bit unsigned integer.

In accordance with one embodiment, the device enumeration service 58 detects newly added hardware devices 20 by sending broadcast messages requesting that all hardware devices 40, including those accessing the network bus 10 through software device gateways 54, return respective auto-identification messages that include device information. The device enumeration service 58 is prompted to begin the enumeration process, for example, at the request of the user mode application, or upon startup. These broadcast messages contain an identifier of the device enumeration service 58, the NIC's (IP) address and implementation-specific information, as required.

When the device enumerator service 58 receives an auto-identification message (either in response to a request, or initially sent by the hardware device upon connection) that is not associated with an enumerated device, a new hardware device 20 is declared. The device enumerator notifies the plug and play functionality of the addition, which then creates an associated base device object for the hardware device 20. The base device implements a network bus driver-programming interface, for example, as described below in relation to FIG. 4.

If the data network 12 (like most IP-based packet networks) does not provide guaranteed delivery of messages, validation and retransmission procedures are applied to communications between the device drivers 40, as required. If the risk of compounded errors associated with a single packet is unacceptable, additional mechanisms (checksums encryption, or higher-level protocols) known in the art can be leveraged. To account for the possibility of lost identification requests, the device enumeration service 58 sends the broadcast messages multiple times (typically three times), with a predefined delay between each send.

Replies to these identification requests are not broadcast, but rather are sent only to the NIC 18 (of the processor node 30 executing the device enumeration service 58) and received at the network bus driver 50, where they are directed to the device and service connector 54, which conveys a content of each message to the device enumeration service 58. It should be noted that each hardware device 20, and each software device gateway connected to the network bus 10 responds to the identification request, but that a processor node 30 does not itself respond. The device information includes a network identifier of the responding hardware device 20, the hardware device identifier, and any other implementation-specific information, as required. The hardware device identifier is a binary string used by the OS and indicates a device type of the responding hardware device 20.

If the device enumerator 58 discovers a new hardware device 20, it notifies a plug and play management function, providing the binary device identification string. In some embodiments, the device enumeration service 58 supports a filter in the form of a list of hardware devices 20 and/or network (IP) addresses and/or device types to ignore when detecting devices.

Auto-Description on Connection

In accordance with certain embodiments, hardware devices 20, publish their capabilities on connection. This is done, for example, in a message following the hardware device's connection, or in response to a request for further auto-description. Upon connection, the hardware device 20 discloses its capabilities in a prescribed format. While in some embodiments this self-description process is not required, it is a preferred aspect of embodiments wherein it is desirable to permit addition of new nodes 14 with a minimum of revision of the existing processor nodes 30.

One format that can be employed is extensible markup language (XML), which is a language that can be used to specify an hardware device's capabilities. Unique hardware device features may be defined to permit specification of settings of the hardware device, and environmental and operating conditions, etc. to all members of the distributed architecture. XML is also easily extended to permit the network bus 10 to support new hardware device types, for example using a generic device driver augmented with feature specifications respecting the particular hardware device 20.

Figure 4:
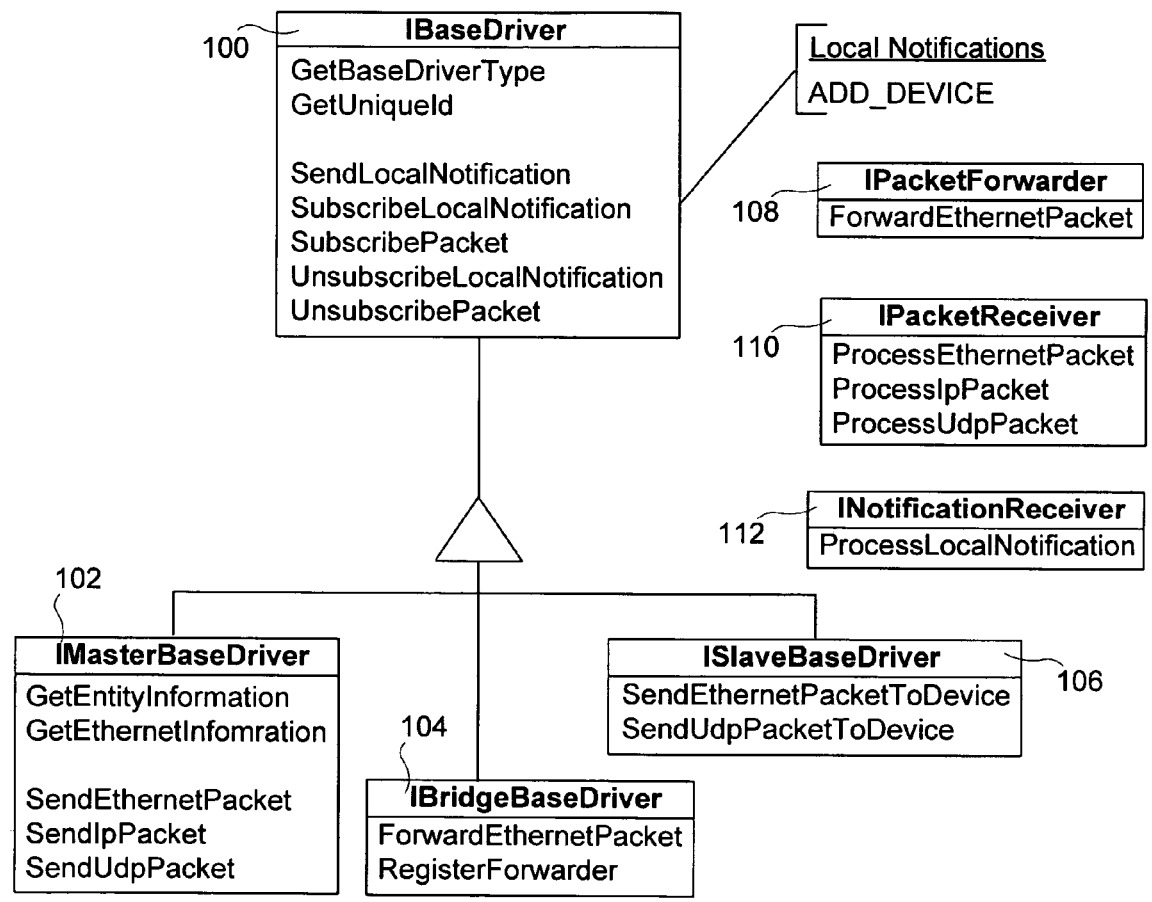
FIG. 4 is a schematic class structure diagram of objects of a network bus driver, in accordance with an embodiment of the invention.

Beginning with FIG. 4, the remainder of the figures illustrating the invention are made assuming that the data network 12 conforms with an Ethernet protocol, and accordingly that the NICs are Ethernet cards, the hardware devices 20 are Ethernet devices, and the network bus driver 50 is an Ethernet bus driver; although this is not necessary for the application of the invention.

FIG. 4 is a schematic class structure diagram of an Ethernet bus driver, in accordance with an embodiment of the network bus driver 50. The objects invoked by the Ethernet bus driver include base driver interfaces IBaseDriver 100 which are created for respective plug and play drivers. The IBaseDriver 100 includes a plurality of attributes, such as a BaseDriverType which specifies whether an instance of an interface is for a master, a slave, or a bridge plug and play driver. A UniqueId attribute corresponds to the sub-device number of the plug and play driver.

The Ethernet device driver preferably accommodates the "hot swappable" nature of every Ethernet device. The Ethernet bus driver helps in this task by notifying other plug and play drivers of Ethernet device connection, and disconnection, and of communication errors. The methods of the IBaseDriver 100 permit the plug and play drivers to send local notifications to the Ethernet bus driver (such as an ADD_DEVICE message used to instantiate another IBaseDriver 100), and to the other plug and play drivers of the software abstraction of the Ethernet bus. In this manner the Ethernet device drivers can be added or removed in response to changes in connected nodes of the Ethernet.

The plug and play drivers use a SubscribeLocalNotification method to subscribe to certain kinds of local notifications (according to a type of notification, a sub-device number, etc.), and may unsubscribe using an UnsubscribeLocalNotification method. In a like manner, the plug and play drivers may subscribe and unsubscribe to messages of a given kind (packet type, protocol, sender, etc.) sent over the Ethernet bus using SubscribePacket and UnsubscribePacket methods.

As explained above, there are three types of IBaseDrivers 100, and each is associated with a corresponding interface. The IMasterBaseDriver 102 is an interface for plug and play drivers such as the distributed memory driver 42, legacy network manager 56, device and service connector 54, and any software device gateways 44. IMasterBaseDriver interfaces include EntityInformation and EthernetInformation attributes, and instances of these interfaces provide corresponding plug and play drivers with methods for sending Ethernet packets, sending IP packets, and sending UDP packets over the Ethernet bus. The master type plug and play drivers are therefore able to effect connections over the Ethernet of a plurality of types, as required.

An IBridgeBaseDriver 104 interface provides methods for registering another packet forwarder (such as the bus adapter driver 52, or an aggregator described below), and for forwarding an Ethernet packet received from the Ethernet bus to the plug and play drivers that have subscribed to the packet. The ability to register new packet forwarders enables failover procedures that permit the switching of the Ethernet card while the system is running in a manner that does not impact the local processor node 30 or the distributed system.

An ISlaveBaseDriver 106 interface provides methods that permit device drivers 40 to send Ethernet (or UDP) packets to the (slave) hardware device 20 over the Ethernet bus. ISlaveBaseDriver 106 interfaces only provide for communications with the corresponding slave hardware device 20, whereas the methods of the IMasterBaseDriver 102 permit transmission of messages to any hardware device 20 or multicast group thereof.

The Ethernet bus driver is further adapted to invoke packet forwarder interface, packet receiver interface, and notification receiver interface. An IPacketForwarder interface 108 is created by the bus adapter driver before registration with the Ethernet bus driver. The IPacketForwarder interface 108 defines a method called by the Ethernet bus driver upon receipt of a message at the Ethernet card, identified by the bus adapter driver 52.

An IPacketReceiver interface 110 is instantiated by a plug and play driver prior to subscription to a packet delivery service. The IPacketReceiver interface 110 provides methods for processing Ethernet,. IP, and UDP packets that are addressed to the Ethernet bus driver. The packet processing methods provide the content of the packets to the Ethernet bus driver to be distributed to all subscribers.

An INotificationReceiver interface 112 is instantiated by one of the plug and play drivers immediately before subscribing to a packet delivery service that specifies which packets are to be received by the plug and play driver. The plug and play drivers may instantiate as many IPacketReceiver interfaces 110 and INotificationReceiver interfaces 112 as needed. A respective IPacketReceiver interface 110 is required for each protocol stack used to process a packet that is subscribed to, and one or more INotificationReceiver interfaces 112 are created for each IPacketReceiver interface 110 to support the subscriptions.

Enabling Memory Distribution

The sharing of memory by the processor nodes 30 is part of what enables distributed processing. This is enabled by concurrently running a distributed memory manager on each of the processor nodes 30.

Applications built using the network bus framework are, easier to develop and support than applications developed using prior art systems, because the programmer only needs to understand how to develop multithreaded applications, not distributed applications, in order to create viable distributed applications that run on distributed processors connected to a network bus in accordance with the invention.

For example, if a distributed system graphical user interface (GUI) is limited to a single processor node, only a computational part of an application requires modification for distributed procession, which can be accomplished by taking advantage of the ability of threads to spawn threads from a common thread pool effectively supplied by the processor nodes 30 connected by the network bus 12. Accordingly, this bus architecture does not require application programmers to define the control should shift from one processor node to another, which is a significant advantage over the prior art.

As illustrated in FIG. 3, the processor node 30 is further adapted to invoke and execute processes, both native 60 and distributed. A native process 60 is one that is not distributed. A distributed process is one that can connect to one or more processing units 62, such as Processing Unit 0. As illustrated, native processes may access device drivers 40, and may communicate over the data network 12 using the legacy network manager 56 and network subsystem 59. Typically, distributed processes will not access the legacy network manager 56 or network subsystem 59, but use a distributed memory manager 65, which is described in detail below, with reference to FIGS. 6 and 7.

The distributed memory manager 65 is defined by user mode and kernel mode program instructions for maintaining a memory space, and is assigned a sub-device number by the network bus driver 50 when the distributed memory manager 65 connects to the network bus driver 50 on start up. The sub-device number is concatenated from the network bus driver identifier and a locally-unique 16-bit unsigned integer, and is compatible with Ethernet device identifiers.

The distributed memory manager 65 has three components: the distributed memory driver 42, a distributed memory library 64 and the distributed memory service 66. The distributed memory driver 42 is defined by kernel mode program instructions principally for managing a page table, and passing notifications from kernel mode to user mode, and vice versa. The distributed memory library 64 includes user mode program instructions called by distributed processes, and the distributed memory service 66, for example, permits connections to the network bus driver 50 required to support a shared memory pool.

Figure 5:
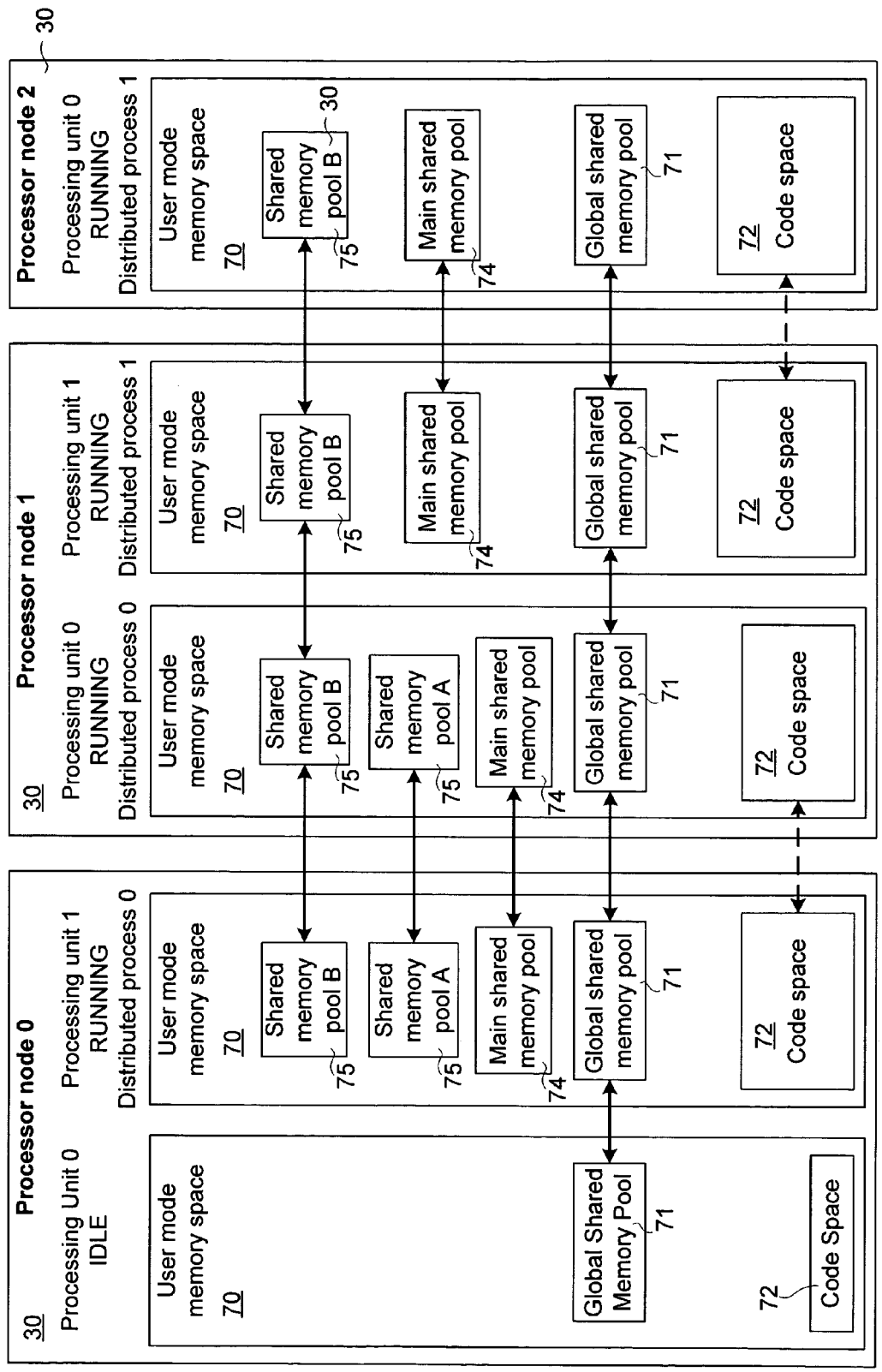
FIG. 5 is a block diagram illustrating shared memory pool usage in accordance with an embodiment of the invention.

FIG. 5 is a block diagram schematically illustrating a manner in which processor nodes 30 share memory pools, and the relationship between the shared memory spaces of processes 68 and processing units 62. Three processor nodes 30 (processor nodes 0,1,2) are shown running two distributed processes 68 (processes 0,1).

Each processing unit 62 includes a user mode memory space 70 which is a virtual addressing space, that includes (an address of) one or more memory pages that contain a global shared memory pool 71. The processing unit 62 also includes private memory spaces and a shared kernel mode memory space which is managed independently. As each processing unit 62 includes pointers to the same memory pages, the content of the global shared memory pool 71 is the same for each of the processing units 62. The global shared memory pool 71 includes a software mechanism for organizing the processing units 62 that are IDLE to permit efficient selection of an IDLE processing unit 62, as required.

If a processing unit 62 is IDLE, like processing unit 0 residing on processor node 0, it has not connected to a distributed process 68, and has no cause to create any additional shared memory pools. A code space 72, which is an addressing space for executable code, user mode library files, etc. of the processing unit 62 is also empty except for the start image program instructions as no user mode application program code has been provided to the processing unit 62.

A processing unit 62 in a RUNNING state has connected to a distributed process 68, and has made a separate copy of the executable code executed by the processing unit 62 in its code space 72. Each processing unit 62 connected to a common distributed process 68 will have a respective copy of the same executable code, but a change to one of these (via a load library/unload library operation) does not induce and automatic change in that of the other copies, because a separate copy is made.

Each processing unit 62 in a RUNNING state also has a main shared memory pool 74 including a page for managing and storing data associated with the distributed process 68 to which it belongs. It is through the main shared memory page that the processing unit 62 can access the distributed process 68 to which it is connected.

As illustrated, the processing unit 62 may create and connect to additional shared memory pools 75 (e.g., shared memory pools A,B), which may be created, for example, to expand a memory address space of the processing unit 62, or to provide sharing of data between different distributed processes 68, for example. Shared memory pool A may have been created to provide a separate memory pool for a certain set of threads, and is shared by all members of the pool's multicast group (including processor nodes 0,1). Shared memory pool B is associated with a different multicast group and includes all processor nodes 30 with processing units 62 connected to either distributed process 0 or process 1.

Some slave hardware devices 20 cannot be controlled by multiple masters concurrently without running the risk of causing the hardware device 20 to fail, unless an efficient access protocol that prevents conflicts is implemented. In the illustrated embodiment, the Ethernet device drivers 40 communicate with other device drivers 40 associated with the same Ethernet device. The device drivers 40 always communicate with the associated Ethernet devices and other participating plug and play drivers using the services provided by the distributed memory manager 65. This is accomplished through the kernel distributed memory space.

In order to effect the sharing of memory required to permit shared control over slave hardware devices, a kernel shared memory pool is effected by mirroring a part of the kernel memory space (i.e. a shared kernel memory space) of each processor unit 30 at each of the other processor units 30. The distributed memory service 66 (FIG. 3) begins at start-up of the processor node 30, by creating a shared kernel memory pool. The device drivers 40 use the kernel shared memory pool to store shared state information and the connection context.

Figure 6:
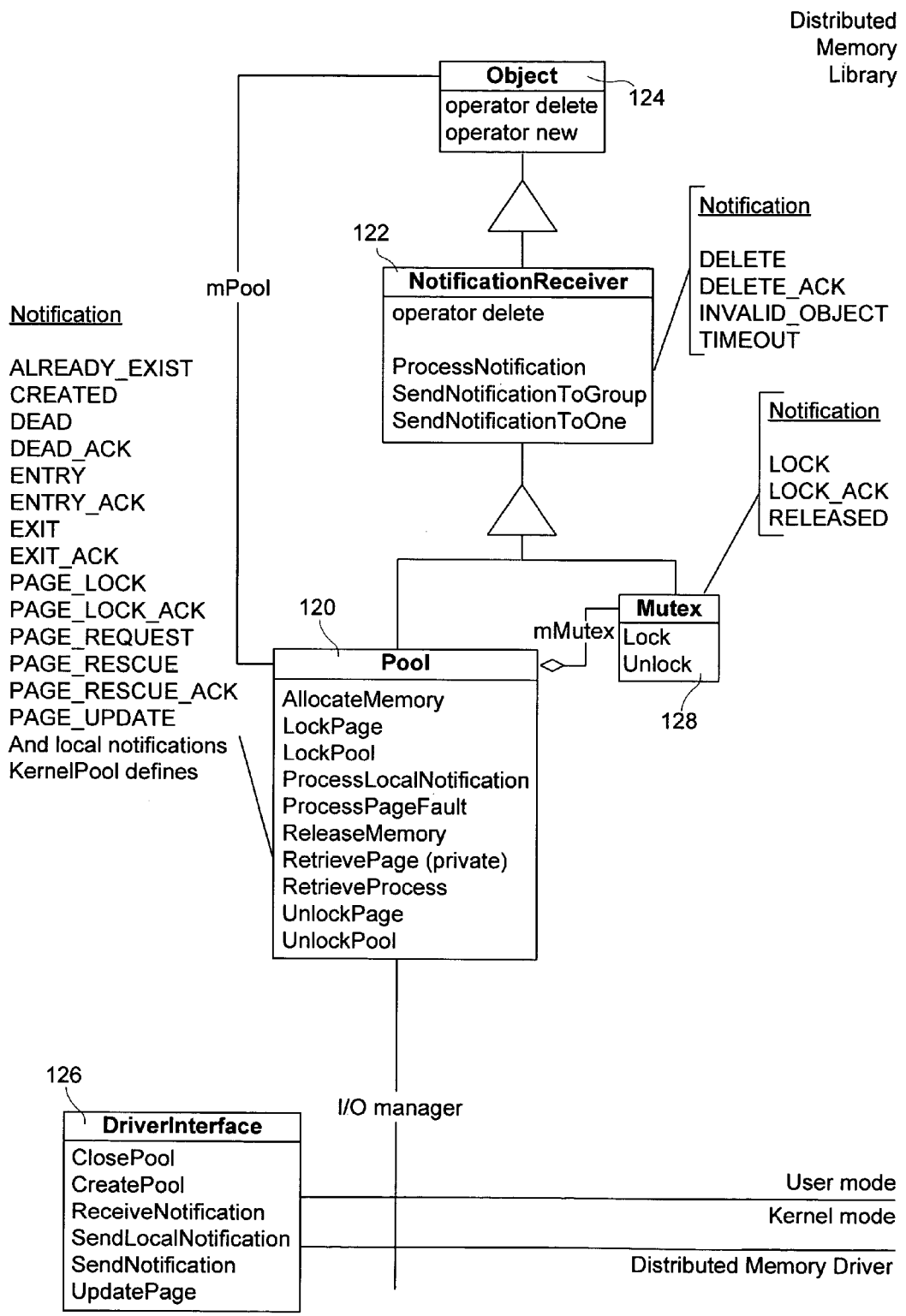
FIGS. 6 and 7 are schematic class structure diagrams of objects of a distributed memory manager that permit a processor node to share memory required to distribute data, processing capabilities, and other resources among processor nodes in accordance with an embodiment of the invention.
Figure 7:
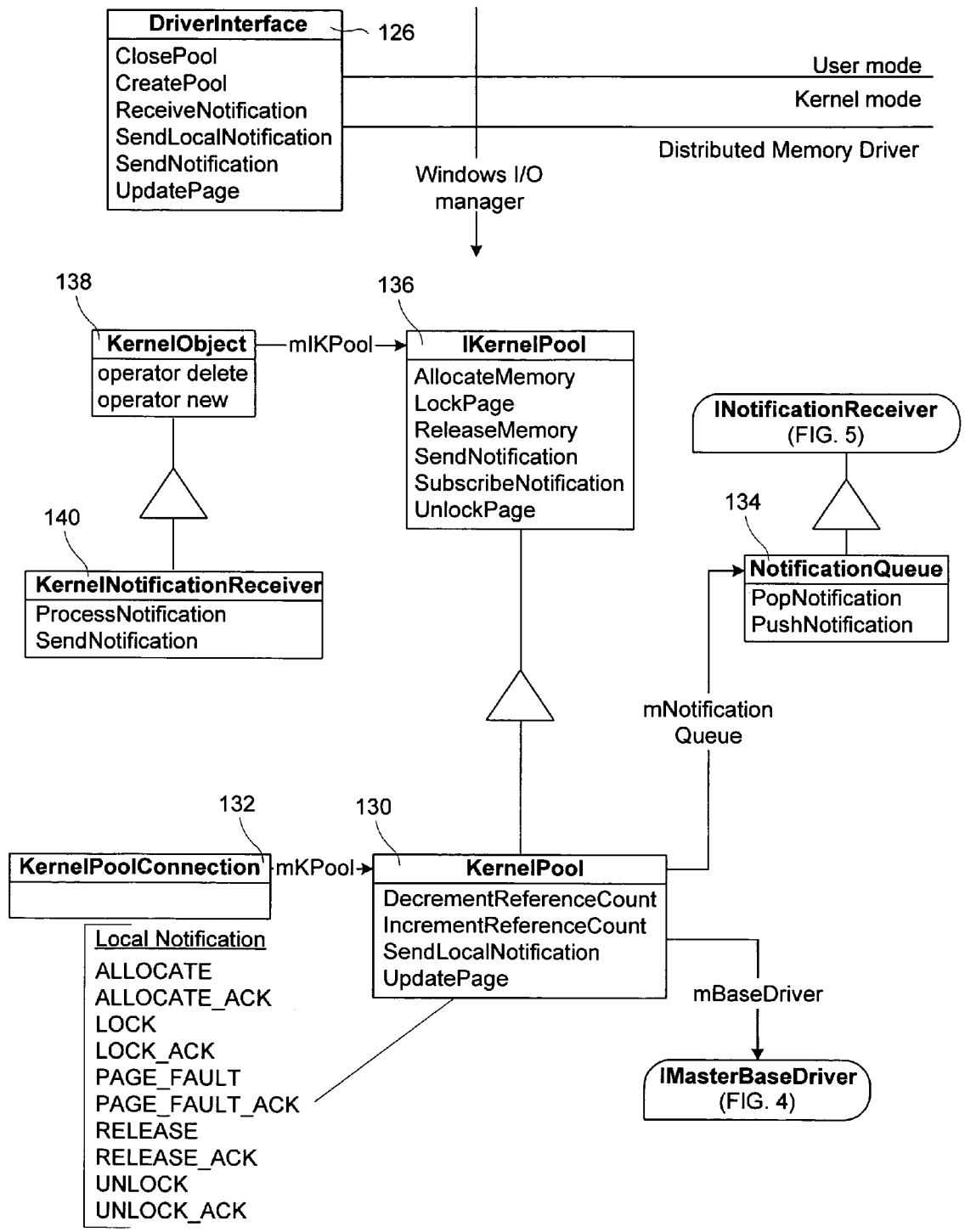

FIGS. 6,7 schematically illustrate a class structure diagram of the distributed memory library 65, in accordance with an embodiment of the invention. A shared memory pool is identified by an identifier of a multicast group with which the distributed memory pool is associated. Accordingly there is at most one shared memory pool per multicast group.

In order to facilitate the development of efficient distributed processing systems, in addition to the distribution of memory, messaging between distributed copies of the same distributed object may be desired. In accordance with the illustrated embodiment, notifications provide this ability. A notification can be sent to one processor node 30 (for example a processor node 30 where a particular processing unit 62 resides) or to all processor nodes 30 sharing the specific memory pool. When all processor nodes 30 must be notified, the notification is sent using the multicast group associated with the memory pool.

In accordance with the illustrated embodiment, notifications sent from a source distributed memory manager 65 to a destination distributed memory manager 65 always include the following data:

the sub-device number of the destination distributed memory manager 65 (if the notification is addressed to only one processor node 30);

the corresponding shared memory pool identifier;

the sub-device number of the source distributed memory manager 65;

a receiver object address, identifying the object within the shared memory pool;

a notification identifier for indexing the notification;

notification payload containing the content of the notification; and a checksum or equivalent error detection algorithm for verifying integrity of the notification.

If, upon receipt of a notification, the destination distributed memory manager 65 finds that a notification fails the integrity test (e.g. the checksum fails), the notification is discarded. Accordingly, notifications may not be delivered in this way, or when packets are discarded by network routers, for example. The hardware devices may accordingly implement timeout management and acknowledgement protocols well known in the art, as required.

The distributed memory manager 65 provides notifications on announcement (i.e. at the beginning of a distributed process), and notifications when the distributed memory manager 65 stops. When the distributed memory manager 65 stops, each processing unit 62, and the distributed memory service 66, must disconnect.

Each notification is associated with a specific (destination) object in the shared memory pool. The notification message includes the memory address of the destination object. Each shared memory pool contains a Pool object 120, the class structure of which is shown in FIG. 6. The Pool 120 is a root object containing information needed to manage the shared memory pool. A special fixed object address is reserved for the Pool object 120 at each of the distributed memory managers. This special fixed address is necessary since the address range of the main shared memory pool is not known before connection.

Figure 8:
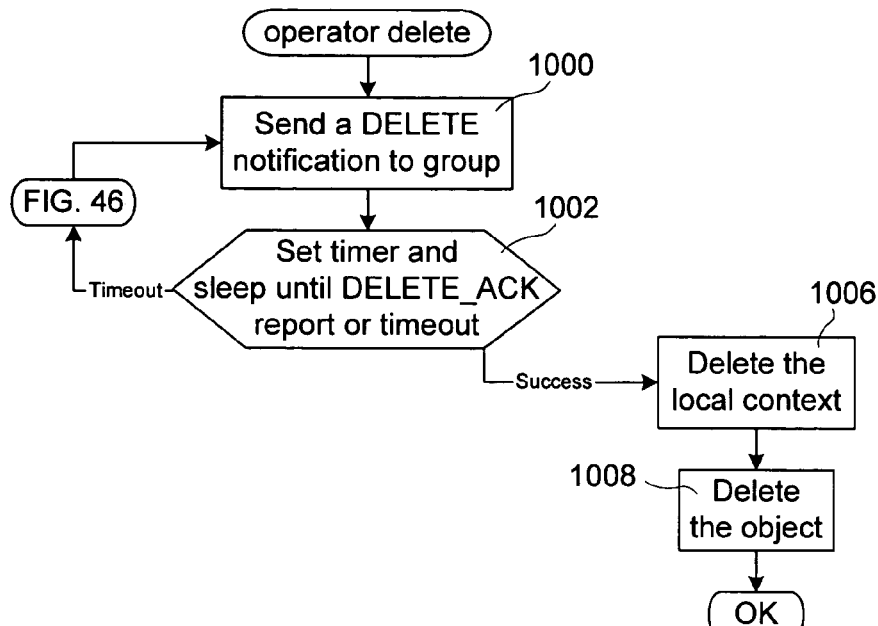
FIG. 8 is a flow chart illustrating principal steps involved in a delete operator of a NotificationReceiver object in accordance with an embodiment of the invention.
Figure 9:
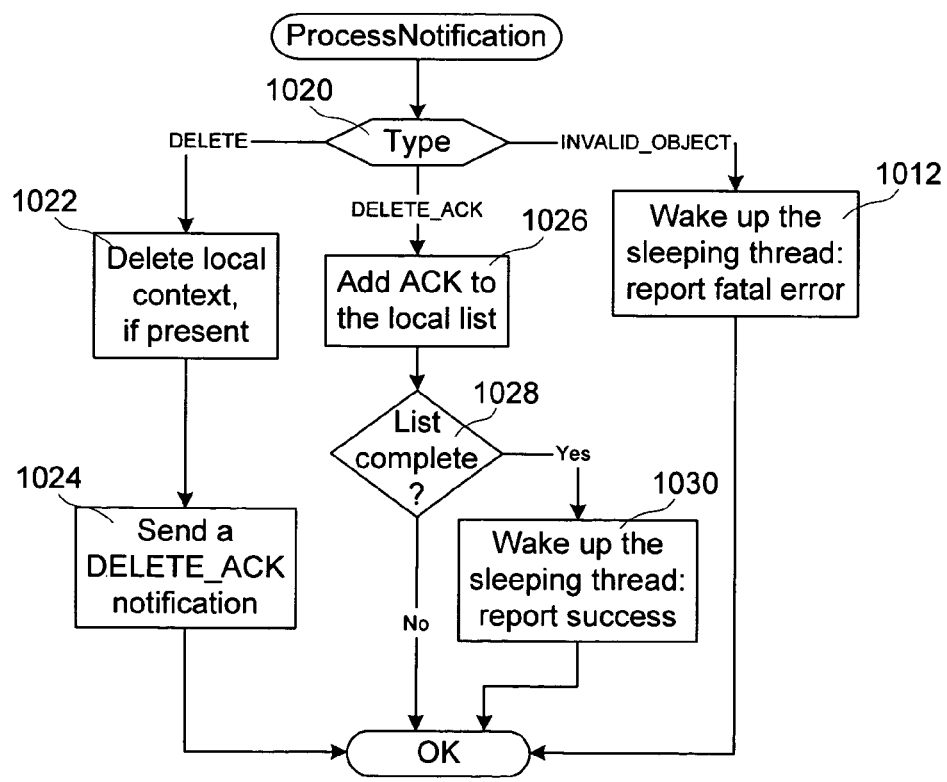
FIG. 9 is a flow chart illustrating principal steps involved in handling notifications at a NotificationReceiver object in accordance with an embodiment of the invention.

The Pool 120 is a NotificationReceiver object 122, and as such includes an operator for deleting itself, and two SendNotification methods (i.e. SendNotificationToGroup and SendNotificationToOne methods). As shown in FIG. 6, the NotificationReceiver 122 is an object 124 and inherits the delete operator from the object 124. Similarly the Pool 120 object inherits new and delete operators. Each NotificationReceiver 122 has methods for sending notifications to either a particular Ethernet device, or to a predefined multicast group, and further a method for processing a notification. The notifications common to all NotificationReceivers include notifications of the following types: DELETE, DELETE_ACK, and INVALID_OBJECT. FIGS. 8 and 9 illustrate the processing of notifications of these kinds and schematically shows the delete operator.

The Pool 120 object defines methods for allocating and releasing memory, locking and unlocking pages or the pool, for processing page faults, and for retrieving private pages. The processing of notifications of the following types: ALREADY_EXIST, CREATED, DEAD, DEAD_ACK, ENTRY, ENTRY_ACK, EXIT, EXIT_ACK, PAGE_LOCK, PAGE_LOCK_ACK, PAGE_REQUEST, PAGE_RESCUE, PAGE_RESCUE_ACK, PAGE_UPDATE, and the local notifications received from KernelPool objects 130 shown in FIG. 7, via the DriverInterface 126 of the distributed memory manager 65, as well as the methods of the Pool object 120, are schematically shown in FIGS. 11-18,24,25,47.

A Mutex object 128 is also a NotificationReceiver 122, and a member of Mutex (mMutex) belongs to the Pool 120. This means that the Mutex can lock and unlock the Pool object 120. The Mutex 128 includes methods for locking and unlocking data structures defined by user mode applications on one or more of the pages, and a ProcessNotification method for receiving LOCK, LOCK_ACK, and RELEASED notifications, as is described below in relation to FIGS. 19-21.

The illustrated embodiment of the distributed memory driver is provisioned with software objects to define Kernel pools. A KernelPool object 130 is a member of the IMasterBaseDriver interface 102 created for the distributed memory driver 42. The KernelPool object 130 includes a SendLocalNotification method for sending local notifications to the other plug and play drivers connected to the software abstraction of the Ethernet bus, including ALLOCATE, LOCK, PAGE_FAULT, RELEASE and UNLOCK notifications, and respective ACKs for each) Methods are also provided for incrementing and decrementing a reference count, which maintains an counter of the number of instances of the distributed memory manager 65 that are concurrently running, as each of these is effectively connected to the KernelPool 130. The KernelPool 130 further has a method for handling page update requests from the other plug and play drivers. The KernelPool 130 also has a KernelPoolConnection 132 which is an object that permits device drivers to connect to the KernelPpool for allocating and releasing memory, and locking and unlocking pages. The KernelPoolConnection 132 is created by the KernelPool, and retains a pointer to the KernelPool.

The KernelPool object 130 is associated with a NotificationQueue 134 which permits the queuing of local notifications received from the other plug and play drivers along with notifications received from the Ethernet bus driver. Each NotificationQueue 134 effects a first-in first-out (FIFO) buffer for managing notifications addressed to a respective Pool 120 of a processing unit. The NotificationQueue 134 is an INotificationReceiver 112 and as such receives the local notifications.

The KernelPool object 130 is an IKernelPool interface 136, and as such inherits methods for allocating and releasing memory of the kernel distributed memory space, and locking and unlocking pages on behalf of respective plug and play drivers, and sending notifications, and subscribing to notifications on behalf of respective plug and play drivers. The methods for allocating and releasing memory, and locking and unlocking pages permit the use of the DriverInterface 126 to pass the corresponding local notifications up to the respective Pool object 120 where they are subsequently processed. The methods for subscribing to and sending notifications permit a peripheral device (through its software device gateway 44) to exchange notifications with remote distributed memory managers.

A KernelObject 138 is a primitive of the kernel mode objects, and is instantiated by the IKernelPool interface, but retains a pointer (mIKPool) to its creator. A KernelNotificationReceiver object 140 is similar to the NotificationReceiver object 122 of the user mode.

FIG. 8 schematically illustrates principal steps applied by invoking the delete operator at an instance of a NotificationReceiver 122. In preparation for sending a notification the thread will clear the local list of ACK identifiers, which indicates the members of the group that have acknowledged the notification, and zeros a retry count that is used to index the number of attempts which is used, for example, for timeout handling. The clearing of the local list and zeroing of the retry count are fairly obvious preparatory steps that have not been included in the flowcharts in order to simplify presentation, but are to be inferred in the flow charts where they are relevant.

In step 1000, the distributed memory manager 65 sends a DELETE notification to the multicast group associated with the object. A thread running the delete operator then sets a timeout timer (for a predetermined time that may be related to the expected round trip messaging time of the Ethernet, and expected processing time of the notifications) and goes to sleep (step 1002).

The thread may be awoken either by a DELETE_ACK notification report (i.e. a report issued by a thread running a ProcessNotification method upon receipt of a DELETE_ACK notification), or by a timeout of the timer. If the timeout expires before a report is registered, timeout management handling is applied, before the thread returns to step 1000. An example of timeout management handling is described below with reference to FIG. 46.

If a ProcessNotification method returns a (success) report, all of the members have acknowledged the DELETE (i.e. step 1028 of FIG. 9), in which case the distributed memory manager 65 deletes the local context of the NotificationReceiver object 122 (step 1006), and then deletes the NotificationReceiver 122 itself (step 1008).

FIG. 9 schematically illustrates principal steps involved in processing notifications in accordance with the current embodiment. When a NotificationReceiver 122, Pool object 120 or a Mutex 128 object of the distributed memory manager 65 receives a notification, a pool management thread calls the ProcessNotification method. Depending on a type of the notification (step 1020) different notification handling is applied. If the notification is of a DELETE type, the local context of the addressed object is deleted (step 1022), and the notification is acknowledged by sending a unicast DELETE_ACK type notification to the sending processor node 1024. The deletion of the local context is naturally skipped if there is no local context for the object, or if the DELETE is a retransmission.

If the notification is of a DELETE_ACK type, the processor node 30 receiving the acknowledgement (ACK) is the one that sent the DELETE notification. Accordingly the ACK is added to a local list (step 1026). The local list is then used (step 1028) to determine if all of the processor nodes 30 in the multicast group associated with the addressed object have issued corresponding DELETE_ACK notifications. If all of the processor nodes 30 of the group have acknowledged the deletion, the processor node 30 and the notification wakes up a sleeping thread (executing the delete operator of FIG. 9), indicating that the deletion of the object has succeeded (step 1030). Otherwise the object waits for a next DELETE_ACK notification, and the ProcessNotification is complete.

Finally, if the notification is of an INVALID_OBJECT type, the responding processor node 30 could not associate a previous notification sent from the NotificationReceiver with the addressed object, and accordingly the sleeping thread (whatever method it was executing) is awoken to generate a report of a fatal error (step 1012). A fatal error prompts the process running the sleeping thread to abort, terminating all threads and releasing all processing units. It will be noted that while this is a logical possibility for any thread that goes to sleep awaiting a ProcessNotification report, the remainder of the examples in this application will not include such fatal error report handling.

Pool Creation

Figure 10:
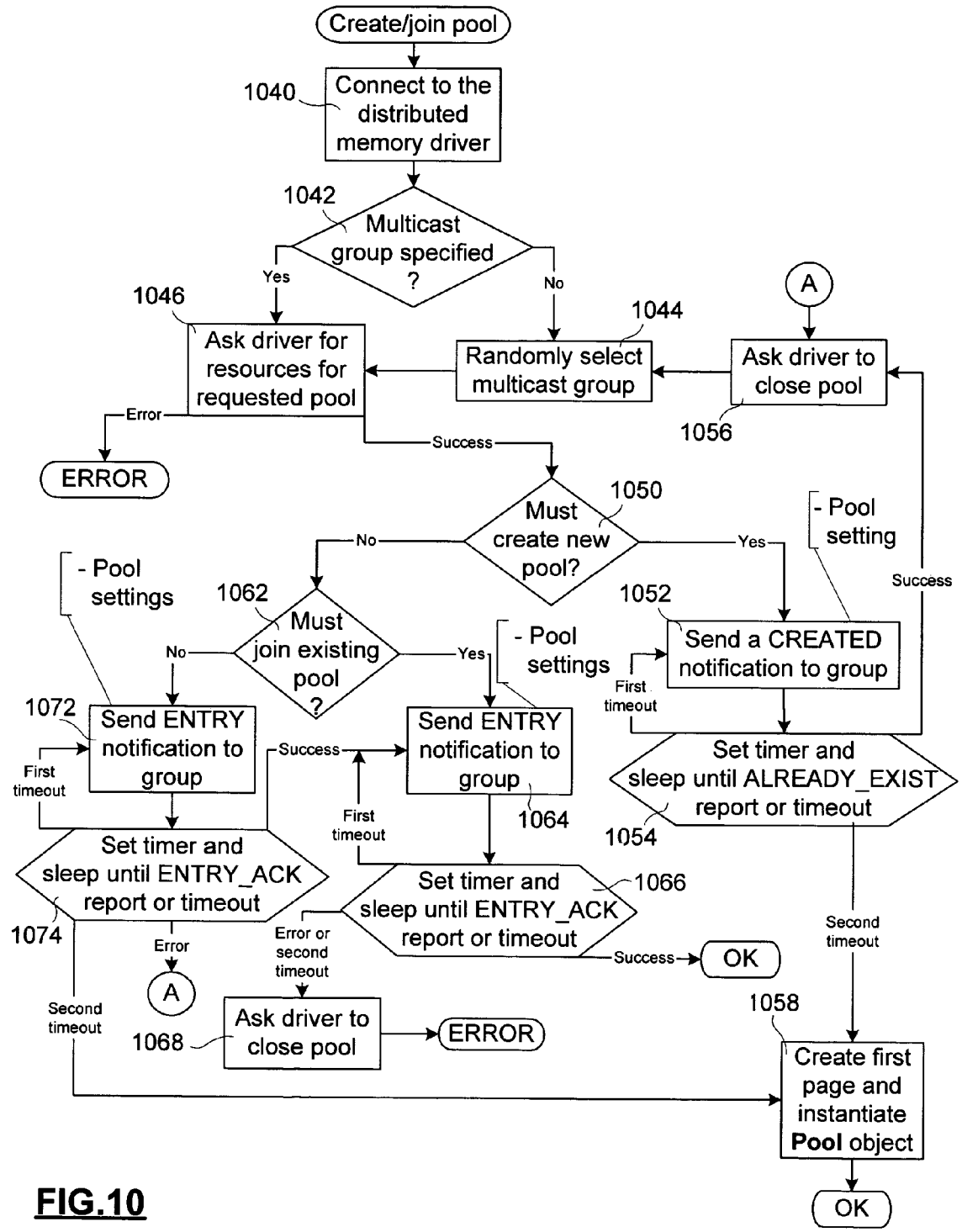
FIG. 10 is a flow chart illustrating principal steps involved in a processing unit creating or joining a pool in accordance with an embodiment of the invention.
Figure 11:
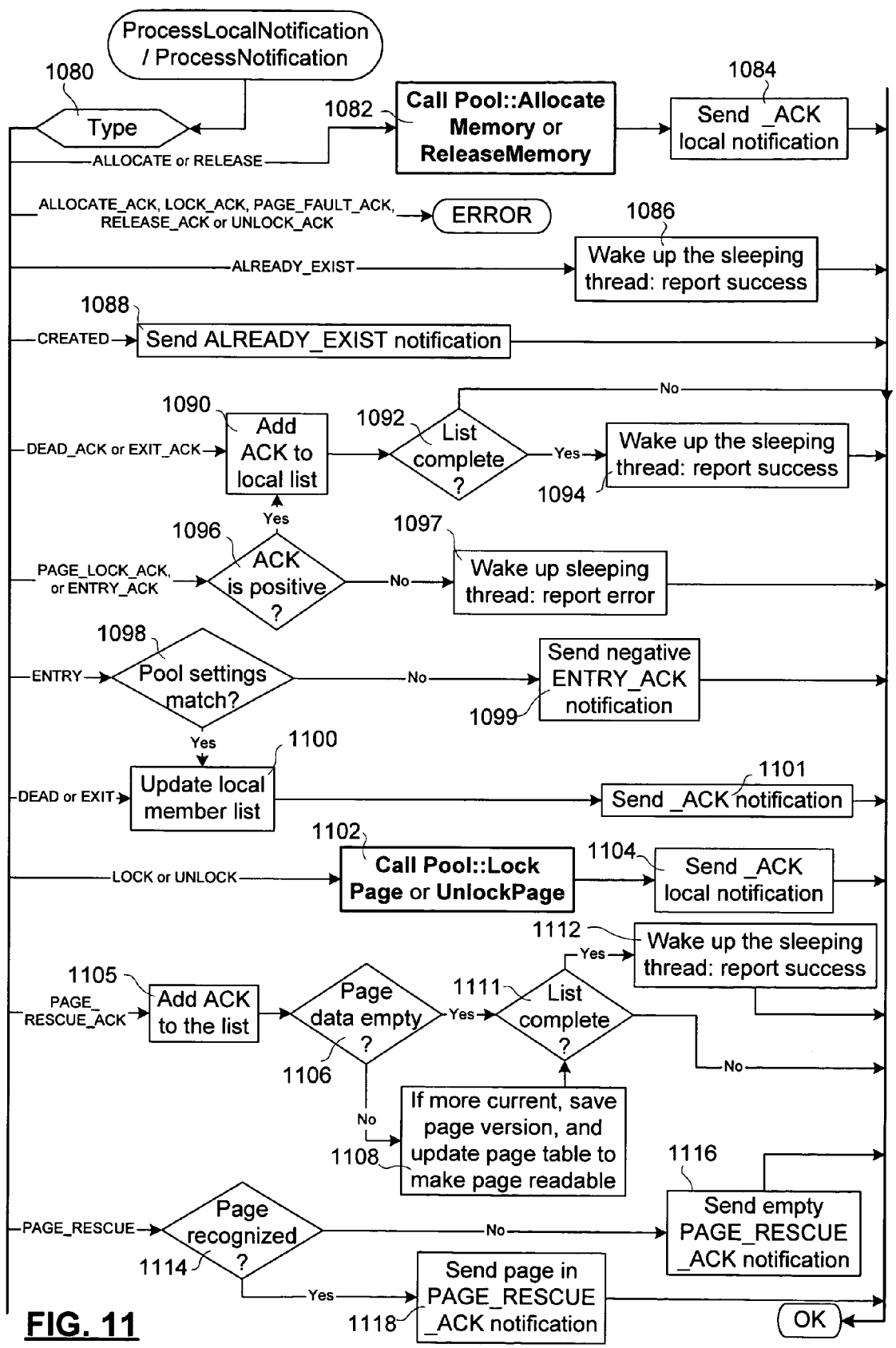
FIG. 11 is a flow chart illustrating principal steps involved in handling certain notifications and local notifications at a Pool object in accordance with an embodiment of the invention.

FIG. 10 schematically illustrates the principal steps involved in creating or joining a shared memory pool in accordance with the current embodiment. In step 1040, a thread of a user mode application using the distributed memory library connects to the distributed memory driver 42. The shared memory pool may be a main shared memory pool 74 associated with a distributed process 68, or may be an additional shared memory pool 75 not associated with any particular distributed process, but providing shared memory between distributed processes. If the user mode application is attempting to join an existing shared memory pool (identified by a specific multicast group), the multicast group is specified to the distributed memory driver 42 (step 1042). If the application is attempting to create a new multicast group, the multicast group may or may not be specified. If the multicast group is not specified, one of a predefined set of multicast groups is randomly selected (step 1044).

The thread of the user mode application connects to the distributed memory driver (step 1040) via DriverInterface 126 program instructions (shown in FIGS. 6 and 7). The DriverInterface 126 defines a set of functions accepted by the I/O manager of the operating system, and includes a ClosePool function, a CreatePool function, and functions for sending local notifications, receiving and sending notifications, and updating pages. The thread issues the CreatePool function command to the distributed memory driver 42 (step 1046) to reserve local resources for a shared memory pool including a range of memory addresses for an address space (including the user memory space 70) of the shared memory pool, a sub-device number for the Pool, etc., in accordance with parameters specified by the application to prepare for the instantiation of the Pool 120. If the distributed memory driver 42 reports an error when attempting to reserve the resources, the attempt fails, and the thread reports an error.

If the distributed memory driver 42 successfully allocates resources to the new pool, it is determined in step 1050 whether or not the application requires a new Pool object. An application creating an object may require that the Pool be a new object because there is no shared memory pool with sufficient available address space to join, or because a main shared memory pool is required, for example.

If the shared memory pool must be new, a SendNotification function of the Pool object (which has yet to be instantiated) is invoked to send a CREATED notification to the members of the multicast group (step 1052). The CREATED notification is sent to determine whether the multicast group is already associated with an existing shared memory pool, or the multicast group is available for the user mode application's purposes. The CREATED notification includes relevant pool settings to permit identification of the particular shared memory pool, which has been created, but which has not yet been provided with its main Pool object.

Once the CREATED notification is sent, the thread sets a timer, and goes to sleep (step 1054). If any member of the group returns an ALREADY_EXIST notification, then the multicast group is already in use by another distributed process, and a ProcessNotification thread reports success to awake the sleeping thread. The thread consequently requests the ClosePool function over a connection to the DriverInterface 126 to effect the release of the reserved resources (step 1056), and the process returns to step 1044 to randomly select another group.

If the timer times out before any ALREADY_EXIST notification is received, the native thread repeats steps 1052, 1054. If the timer times out again and no ALREADY_EXIST notification is received, it is assumed that the multicast group is not being used, and accordingly the Pool object is instantiated, a first page of the Pool is created (step 1058), and the attempt to create a new Pool succeeds.

If, in step 1050 it is found that a new pool is not required, in step 1062, it is determined whether or not the application specified a particular multicast group to be joined. If a shared memory pool of a particular group is to be joined, the SendNotification method is invoked to send an ENTRY notification to the members of the group (step 1064). The thread then sets the timer and goes to sleep (step 1066). If the timer times out a first time, the steps of sending the ENTRY notification and going to sleep are repeated. If the timer times out a second time, or an error report awakes the sleeping thread, the ClosePool function is issued to the distributed memory driver (step 1068), which releases the resources for the shared memory pool, and the attempt to join has failed.

If a report of success from a ProcessNotification method is received before the timer expires (the second time), positive ENTRY_ACK notifications have been received from all of the members of the group which already has a Pool object, and the join attempt succeeds.

If it is found in step 1062 that the application has not specified that any particular group be joined, the group was selected randomly, and the current members of the group are not known to the distributed memory manager 65. In step 1072 the SendNotificationToGroup method is invoked to send an ENTRY notification to the group, the notification includes pool settings, so that the members of the group can verify that the pool settings are correct (See FIG. 11).

The thread then sets the timer and waits for a first ENTRY_ACK notification (step 1074). If a first ENTRY_ACK notification is received, it identifies the members of the group and the process returns to step 1064 to verify that all members are notified of the entry of the member into the shared memory pool. If the thread is awoken by a first timeout, the steps 1072 and 1074 are repeated. If the timeout recurs, the distributed memory manager 65 is presumed to be the first and only current member of the group, and accordingly the Pool object is instantiated, the first page is created (step 1058), and the attempt to join or create is successful. If the thread is awoken to an error report the thread advances to step 1056.

Pool Notifications

When either a notification or a local notification is received that identifies a Pool, the ProcessNotification method or the ProcessLocalNotification method of the Pool object is called. Depending on a type of the received notification (determined in step 1080), the notification is handled according to one of the processes shown in FIGS. 11,15-17 are performed.

If the local notification is of either an ALLOCATE type or a RELEASE type, the method invokes the corresponding AllocateMemory, or ReleaseMemory method (step 1082), which prompts the application of the distributed memory service 66 for managing the kernel memory space, to effect (if possible) a change in the usage of the kernel mode memory space at the request of the corresponding plug and play driver. At the successful completion of the AllocateMemory/ReleaseMemory method, the SendLocalNotification method of the corresponding KernelPool is invoked to send the ALLOCATE_MEMORY_ACK or the RELEASE_MEMORY_ACK (step 1084). The allocation and release of memory is requested by one of the plug and play drivers to request part of the shared kernel memory space.

The ALLOCATE and RELEASE local notifications are sent to the distributed memory driver by a plug and play driver that uses the kernel memory space to share context information regarding respective Ethernet devices. More specifically, the requesting plug and play driver calls the AllocateMemory or ReleaseMemory method of the IKernelPool object, which formulates the ALLOCATE/RELEASE local notification, pushes the local notification into the NotificationQueue 134, and waits for an acknowledgement. The ALLOCATE/RELEASE remains in the NotificationQueue 134 until the local notification is popped by the user mode Pool. When the local notification is popped, it prompts the execution of the AllocateMemory or the ReleaseMemory method of the Pool (step 1082).

The ALLOCATE_MEMORY_ACK and the RELEASE_MEMORY_ACK -notifications are only used for managing kernel mode memory spaces. Other similar methods are used by plug and play drivers to lock and unlock pages. The ALLOCATE_MEMORY_ACK, RELEASE_MEMORY_ACK as well as the LOCK_ACK, PAGE_FAULT_ACK and UNLOCK_ACK message types are reserved for local notifications. Accordingly, if one of these types of messages or any other unexpected notification types are received, they are received in error and disregarded without any action taken in response.

If the notification is of an ALREADY_EXIST type, the sleeping-thread is awoken (step 1086) with a success report (indicating that the thread must attempt to create another pool as shown in FIG. 10). It is also clear from the foregoing discussion of FIG. 10 that if the notification is of a CREATED type, the Pool object is already created for the multicast group, and accordingly the ALREADY_EXIST notification is issued (step 1088) in reply.

In order to notify the distributed instances of the shared memory pool, numerous different types of notifications are defined. When a Pool is joined or created, as shown in FIG. 10, CREATED and ENTRY messages are sent, the latter being acknowledged. Before a processing unit severs a connection to the Pool, it issues an EXIT notification to the group and waits for EXIT_ACKs in reply. However, in certain cases the EXIT may not be sent before the connection is severed or the processing unit fails. In such a case it is up to any remaining member of the group to identify the failed ("dead") member. When a member of the group's processing unit of the Pool is determined to be dead, the determining member issues a DEAD notification to the other members of the multicast group of the Pool. These DEAD notifications are acknowledged with DEAD_ACKs by the other remaining members, as shown in the timeout handling of FIG. 46.

Upon receipt of one of a DEAD_ACK or an EXIT_ACK, the ProcessNotification method adds the respective ACK to a local list of ACKs (step 1090) relating to the Pool (stored in a private part of the shared memory space of the Pool). It is subsequently determined (step 1092) whether the local list now includes ACKs from all of the members of the multicast group of the Pool. If the list is complete, in step 1094, the waiting thread is awoken to the report of a success. In either case the processing of the notification is successfully completed.

Upon receipt of a PAGE_LOCK_ACK (see in FIG. 15) or an ENTRY_ACK (step 1096), it is determined whether the ACK is positive or negative. If the ACK is positive, the process advances to step 1090. Otherwise, in step 1097, the waiting thread is awoken to a report of an error.

Upon receipt of an ENTRY notification, it is determined whether pool settings included in the ENTRY notification match with those of the Pool locally. If the pool settings do not match, the thread processing the notification sends a negative ENTRY_ACK notification in reply (step 1099). Otherwise the pool settings match, and a local member list that identifies the members connected to the Pool, is updated to add the joining member (step 1100) before returning a positive ENTRY_ACK notification in reply (step 1101). If the NotificationReceiver process is processing a DEAD or EXIT notification, it applies steps 1100, and 1101 as shown, but the updating of the local member list involves deleting the identified member(s).

The plug and play drivers issue LOCK or UNLOCK local notifications in order to write shared state information and the connection context on pages of the shared kernel memory space. Such notifications are passed via the distributed memory driver 42 to a user mode of the distributed memory manager 65, which effects the locking or unlocking of the page (step 1102), and issues a corresponding local notification ACK (via the distributed memory driver 42), in response (step 1104).

The ProcessNotification handling of PAGE_REQUEST notifications is described further below with reference to FIG. 15. The handling PAGE_LOCK notifications follows the process described below in relation to FIG. 17. The ProcessLocalNotification handling of PAGE_FAULT type local notifications are described further below with reference to FIGS. 18 and 19, respectively.

Handling a PAGE_RESCUE_ACK type notification involves adding the ACK to the local list (step 1105), and inspecting content of the ACT to determine whether the page data is empty (step 1106). If the page data is not empty, an old copy of the page is included in the message. This copy is saved (step 1108) if it is more recent than a currently stored version of the page so when the list is complete the most recent version of the page is stored and identified as readable, to complete the page rescue operation shown as a part of the RetrievePage method of the Pool (see FIG. 14). Regardless of whether the PAGE_RESCUE_ACK is empty, the thread processing the PAGE_RESCUE_ACK determines whether the local list is now complete (step 1111). If the list is not complete, the thread reports success, otherwise the thread wakes the sleeping thread to report the success of the PAGE_RESCUE, and the saved version of the page is identified (step 1112).

If the notification is of a PAGE_RESCUE type, the ProcessNotification handling involves determining whether a local copy of the page identified in the PAGE_RESCUE is recognized (step 1114), and returns a PAGE_RESCUE_ACK notification. A page will not be recognized by a member if the page was locked when the member joins, and the page is not the subject of a page update before a PAGE_RESCUE notification is received member (step 1116), and accordingly the member issues a PAGE_RESCUE_ACK notification (indicating that the message was received, and that the member is still operational), but that the PAGE_RESCUE_ACK notification does not contain a copy of the page. All of the other members issue the most recent version of the page available in the PAGE_RESCUE_ACK notification (step 1118), i.e. the page that it has recently amended, or the page that was most recently received from a PAGE_UPDATE notification, as will be further described below with reference to FIG. 15.

Page Access Control

Figure 12:
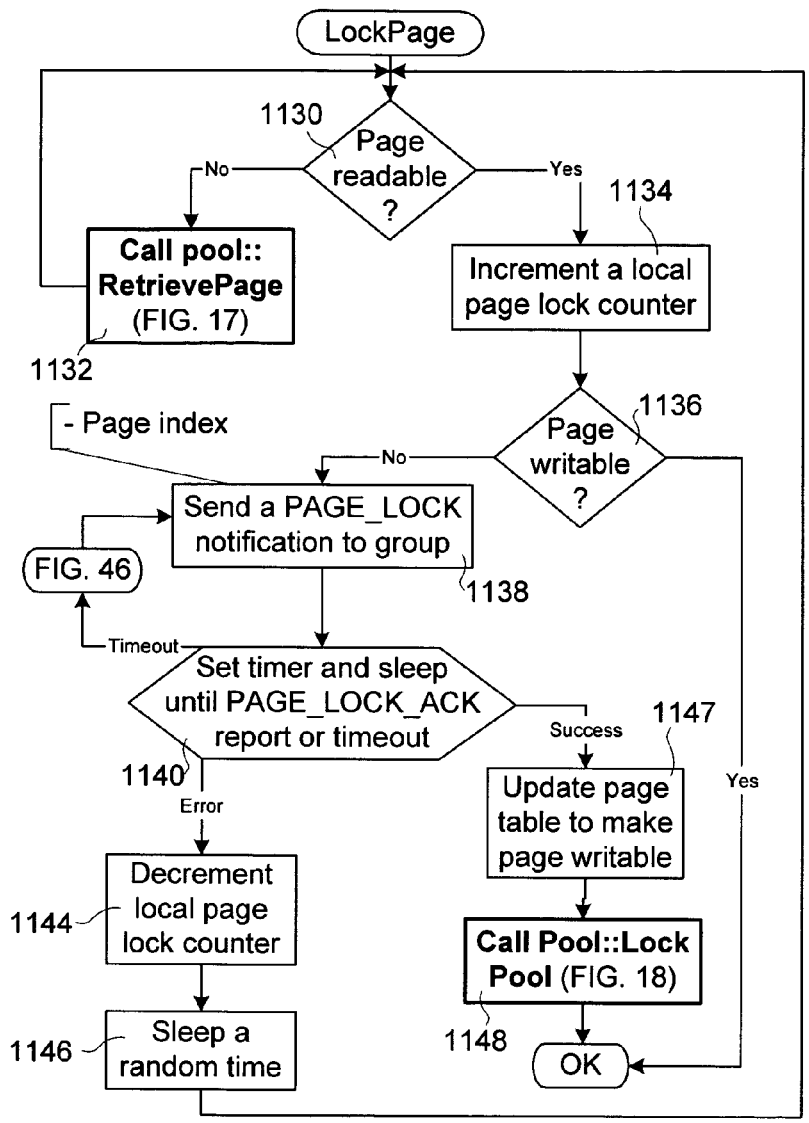
FIGS. 12 and 13 are flow charts illustrating principal steps involved LockPage and UnlockPage methods of the Pool for controlling access to distributed memory page in accordance with an embodiment of the invention.
Figure 13:
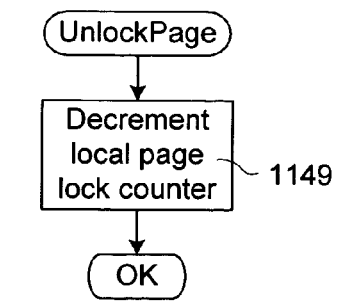

Most current OSs manage kernel memory spaces on a page basis, and this is how the shared kernel memory spaces of the shared memory address spaces are managed. By default, all pages can be read (but not written to) by any thread. When a thread tries to read/write to a page, the distributed memory manager 65 uses the OS's memory management unit to verify if the request is allowed. If the page is writable, the write attempt is effected immediately. If the page is not writable, a processing unit may request a page lock to prevent other threads from accessing the page concurrently, to prevent inconsistent sets of page data being used throughout the network. Methods for attempting to lock and unlock a page are shown in FIGS. 12 and 13. If a page is initially readable, and the page is requested for a write operation, a page lock is first requested and obtained. If the page is not readable, the distributed memory manager 65 must retrieve the page first, which may require a rescue of the page if an operation that locked the page has failed. Once the page is locked, the local distributed memory manager 65 makes the page writable and restarts the sleeping thread.

FIG. 12 illustrates principal steps involved in locking a page of shared memory in accordance with one embodiment. As is well known in the art, consistency of data is controlled by most current OSs using page locking techniques, which in accordance with the present embodiment, can be leveraged to control access to distributed memory pages. Accordingly, in step 1130, it is determined whether the page is readable. If the page is not readable, one of the other members has locked it, and the thread invokes a RetrievePage method of the Pool object (see FIG. 14) to obtain an up-to-date copy (or at least the best salvageable version) of the required page (step 1132), and the process returns to step 1130. When the page is readable, a local page lock counter is incremented (step 1134). The local page lock counter is associated with the memory page at the local processor node 30, and indicates how many threads are using the page.

Figure 46:
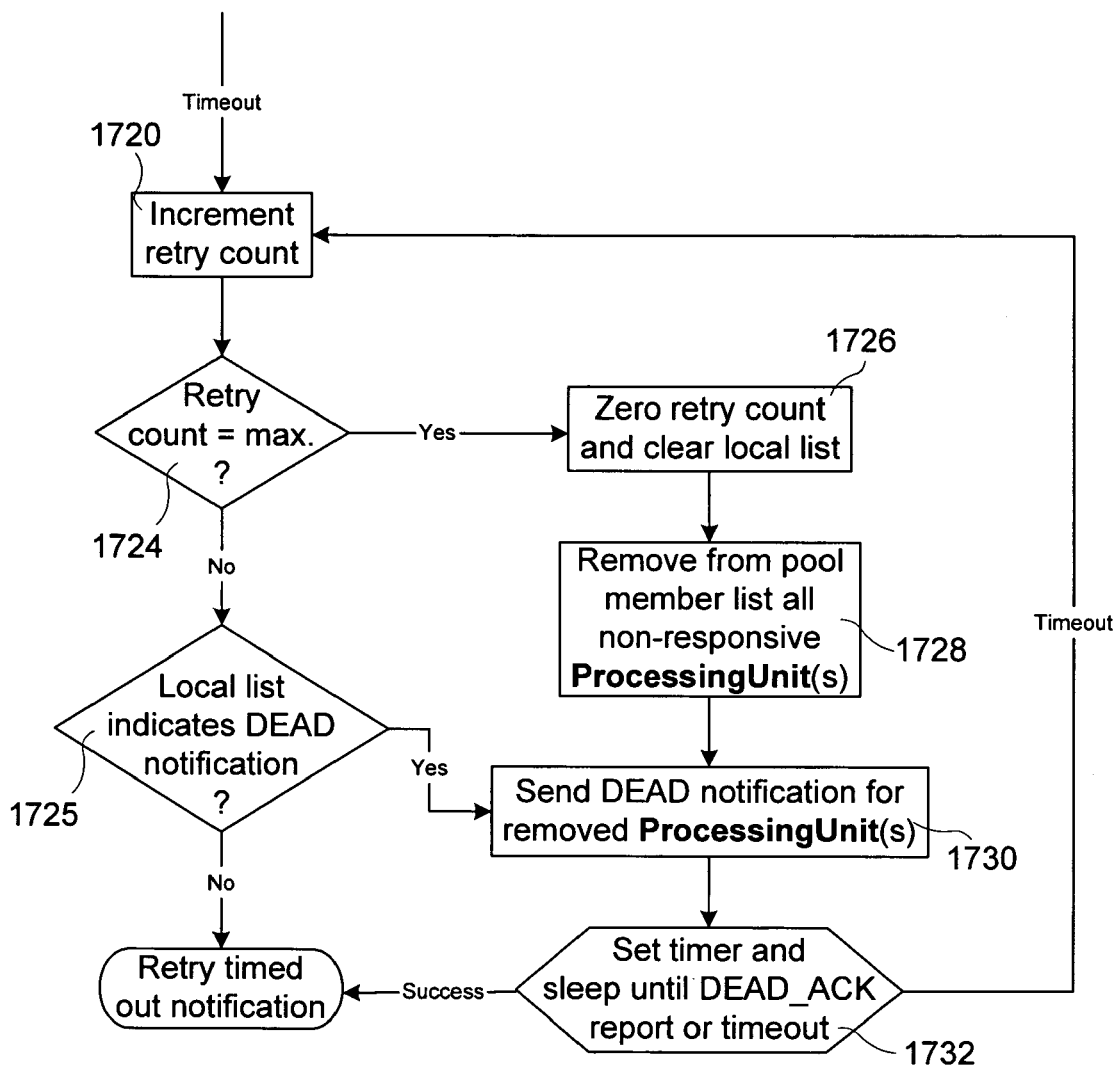
FIG. 46 is a flow chart illustrating principal steps involved in timeout handling to identify dead ProcessingUnits in accordance with an embodiment of the invention.

Once the local page lock counter is incremented, it is determined (step 1136) whether the memory page is writable. If the page is writable, the page is already (effectively) locked by the Pool locally, and the thread running the lock page method returns a success. Otherwise, in step 1138, the thread issues a PAGE_LOCK notification to the Pool's multicast group, to notify the members that the page is write-locked and therefore cannot be read. The PAGE_LOCK notification includes a page index that uniquely identifies the page. FIG. 17 shows how a PAGE_LOCK notification is handled by the other members of the group. In step 1140, the thread sets a timer and goes to sleep. If the thread is awoken by the timeout, timeout handling is applied as shown in FIG. 46, following which the thread returns to step 1138.

If the thread is awoken to the report of an error (because a negative PAGE_LOCK_ACK was received), the thread decrements the local page lock counter (step 1144), sleeps a random time (step 1146), and awakes to return to step 1130. Subsequent to step 1146, the local page lock counter is null (unless another thread has locally requested the page concurrently), because if the page is not writable, the local page lock counter was previously null and the incrementing and decrementing cancel each other.

The randomized delay is useful for preventing repeated concurrent lock attempts for a single page. As will be appreciated by those skilled in the art, if two (or more) threads on two different processor nodes 30 require the same page at a same time, both increment the local page lock counters and accordingly (as will be clear from the flowchart of FIG. 17) both will deny the other access to the page. If the two threads immediately repeat the request for the same page neither will ever obtain the page. Accordingly, both members decrement the local page lock counter, select a random backoff time, and wait until the expiry of this time before returning to respective steps 1130. The thread that selects the longer time will receive the PAGE_LOCK notification from the other member before returning to step 1130, and because the local page lock counter is decremented to zero, will defer to the thread that selected the shorter time. Other page access contention techniques using priorities etc. can be used in other embodiments.

If the thread is awoken to a report of a successful page lock, the page is updated locally to make the page writable (step 1147). The thread then invokes the LockPool method of the Pool object (step 1148) to prevent the deletion of the Pool, when all of the pages are no longer locked, which would be problematic if the page contained updated data that is only locally available. This prevents the loss of data that is otherwise risked because a page does not indicate whether it has been modified since a last PAGE_UPDATE was sent. The LockPage thread then completes, reporting success.

FIG. 13 illustrates principal steps involved in unlocking a page in accordance with the current embodiment. When the page is unlocked, the local page lock counter is decremented (step 1149), but the other members of the group are not notified of the change, and the page remains writable for local threads. This prevents the unnecessary processing and signaling associated with iteratively locking and unlocking a page when no remote thread had any use for the page in the interim. The page remains writable at the local distributed memory manager 65, until another distributed memory manager 65 requests the page effecting the LockPage method remotely.

Figure 14:
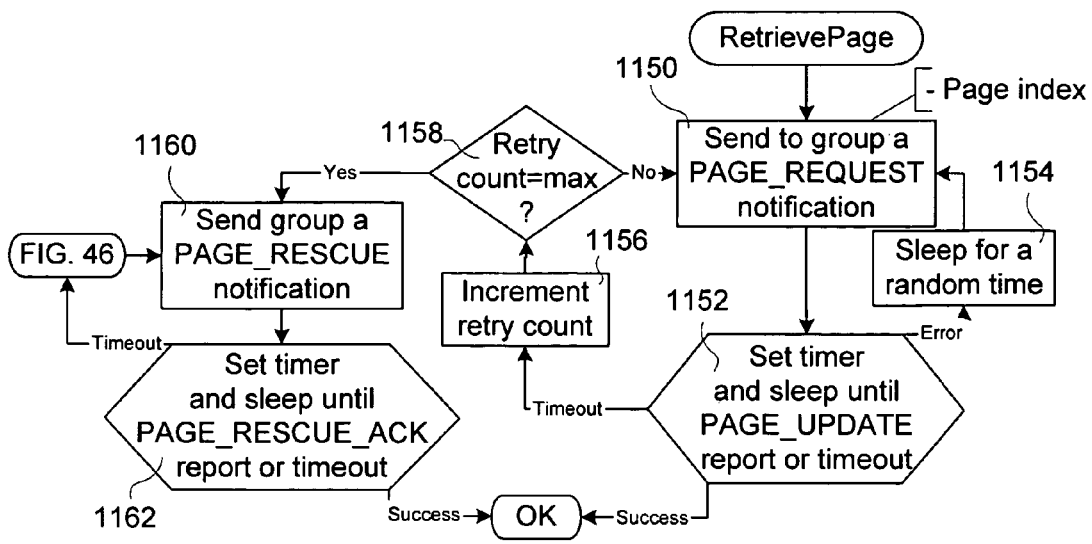
FIG. 14 is a flow chart illustrating principal steps involved in retrieving a distributed memory page in accordance with an embodiment of the invention.

FIG. 14 is a flow chart illustrating principal steps involved in the execution of a RetrievePage method in accordance with the present embodiment. In step 1150, the thread executing the RetrievePage method invokes the SendNotificationTo-Group method to send a PAGE_REQUEST notification, including the page index of the requested page. The SendNotification method completes, and the thread executing the RetrievePage method sets a timer and goes to sleep (step 1152).

At any point in time a page may be either of two stable states: in the default state (readable but not writable), or may be locked by one of the members, in which case it is writable by the member, but neither readable nor writable by the other members. As each member has it's own state of the page, during transitions the state maintained by the different members is not consistent if a PAGE_UPDATE is not delivered to a current member, or a PAGE_LOCK is not recognized by a current member. The PAGE_LOCK notifications are acknowledged by each of the members of the group, and members joining the group will not have a copy of a non-readable page, and so inconsistency of the second kind is unlikely.

If the page is in the default state, all members should have the page identified as readable, but any member that did not receive the last PAGE_UPDATE will not know that the page is in this state, and accordingly may issue a RetrievePage. In this case, all of the members that did correctly receive the last PAGE_UPDATE (and the member that sent it) will have an up-to-date (readable) copy of the page and all members will issue the PAGE_UPDATE to the Pool that sent the PAGE_REQUEST, but each of these will contain exactly the same page.

If the page is in a locked state (not readable or writable) only one PAGE_UPDATE notification will be received (from the member of the multicast group with the up-to-date copy of the page). Only a member with a lock on the page can return a negative PAGE_UPDATE notification. A negative PAGE_UPDATE notification indicates that a remote thread is modifying the desired page, and accordingly the thread executing the RetrievePage method is forced to wait. In accordance with the present embodiment, the thread sets a timer for a random time (step 1154) and returns to step 1150 when a timeout occurs. It should be noted that the selection of a random time reduces a likelihood of competing requests repeatedly being issued at substantially the same time.

If the member that previously locked the page returns a positive PAGE_UPDATE notification in step 1152, the thread ends reporting a success, and the up-to-date copy of the page is now accessible.

If the PAGE_REQUEST notification did not arrive at the processor node 30 where the member resides, or the PAGE_UPDATE notification does not arrive at the distributed memory manager 65, no response to the PAGE_REQUEST is received. In such an eventuality a retry counter is incremented (step 1156), and in step 1158 it is determined whether the retry counter has reached a maximum value. If no, the thread returns to step 1150. If the maximum value is reached in step 1158, the thread effects page rescue procedures, which are necessary to prevent the unending retransmission of the PAGE_REQUEST notifications, for example if the member processing unit has terminated in an ungraceful manner.

The page rescue procedures involve multicasting a PAGE_RESCUE notification to the group (step 1160), and waiting for PAGE_RESCUE_ACK notifications in reply (step 1162). If the timer times out, the timeout handling is applied as per the steps of FIG. 46, after which the process returns to step 1160. If all current group members return corresponding PAGE_RESCUE_ACK notifications before the timeout, the ACK with the most current content is now readable, and is taken to be the up-to-date copy of the page. The page with the most current content may be identified using a page serial number included in the PAGE_RESCUE_ACK (and the PAGE_UPDATE from which it was originally received).

Figure 15:
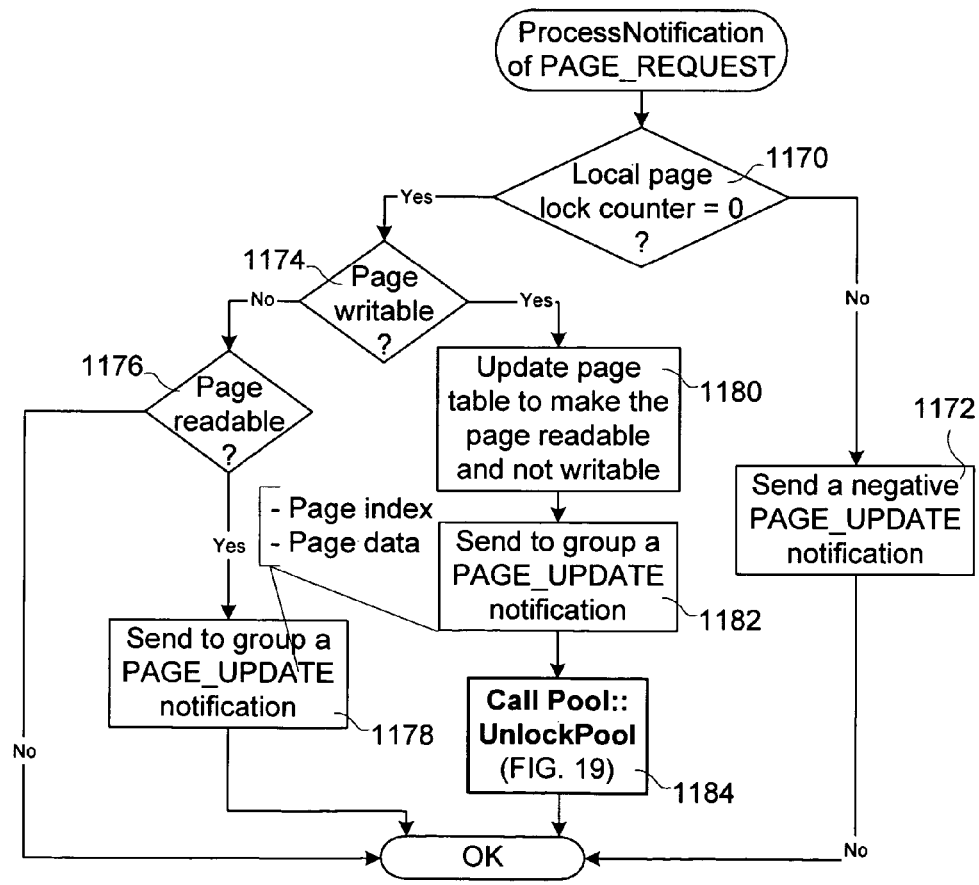
FIG. 15 is a flow chart illustrating principal steps involved in processing a notification sent to retrieve a page in accordance with an embodiment of the invention.

FIG. 15 illustrates principal steps involved in ProcessNotification handling of a PAGE_REQUEST notification in accordance with the illustrated embodiment. In step 1170 it is determined whether the local page lock counter is null. If the local page lock counter is 1 or higher, a thread may currently be modifying the page, and the page cannot be yielded. Accordingly, the member receiving the PAGE_REQUEST sends a negative PAGE_UPDATE notification (step 1172) to the member that sent the PAGE_REQUEST. The negative PAGE_UPDATE notification does not include a copy of the page.

If the local page lock counter is null, it is determined whether the page is writable, in step 1174. If the page is not writable, it is determined (step 1176) whether according to the receiving member, the page is readable. If the page is readable, the receiving member has an up-to-date copy of the page, and accordingly a positive PAGE_UPDATE notification is sent in reply to the members of the group (step 1178), ending the processing of the PAGE_REQUEST notification.

In the illustrated embodiment, the readable page is multicast, so that all of the members independently verify the consistency of the page, and so that members that have newly joined the multicast group are provided with the up-to-date copy of the page. It will be appreciated by those skilled in the art that in other embodiments this response may be unicast so that only the member that sent the PAGE_REQUEST will verify the consistency of the values on copies of the page, and newly added members will have to wait until the next PAGE_UPDATE is sent. This type of implementation decision represents a trade-off between network traffic and notification processing load against the value of newly added members receiving the copy of the readable page.

If the page is not readable at the receiving member, the PAGE_REQUEST notification is discarded as the receiving member does not have an up-to-date copy of the page. In this manner, all of the members with up-to-date copies of the requested page will reply to a PAGE_REQUEST notification, if a LOCK_PAGE notification could have been sent instead, and only the member that most recently locked the page will reply otherwise. In either case the first PAGE_UPDATE notification determines the content of the page or that the page is not available.

If, in step 1174 it is determined that the page is writable, the receiving member updates the page table to make the page no longer writable, but readable (step 1180), and multicasts to the group a positive PAGE_UPDATE notification (step 1182) which includes an up-to-date copy of the page. Each member that receives the up-to-date copy records the page, which may have been changed when the page was writable by another member. This dissemination of the updated page facilitates the page rescue process and permits the page to return to the readable default at all member locations.

It should be noted that if a member that sent the PAGE_REQUEST only requires a page for read purposes, a PAGE_REQUEST is all that is sent. However if a page is required for writing purposes, the further steps of locking the page are required, as per FIG. 11. Once the positive PAGE_UPDATE notification is multicast, an UnlockPool method is invoked by the receiving member (step 1184).

Figure 16:
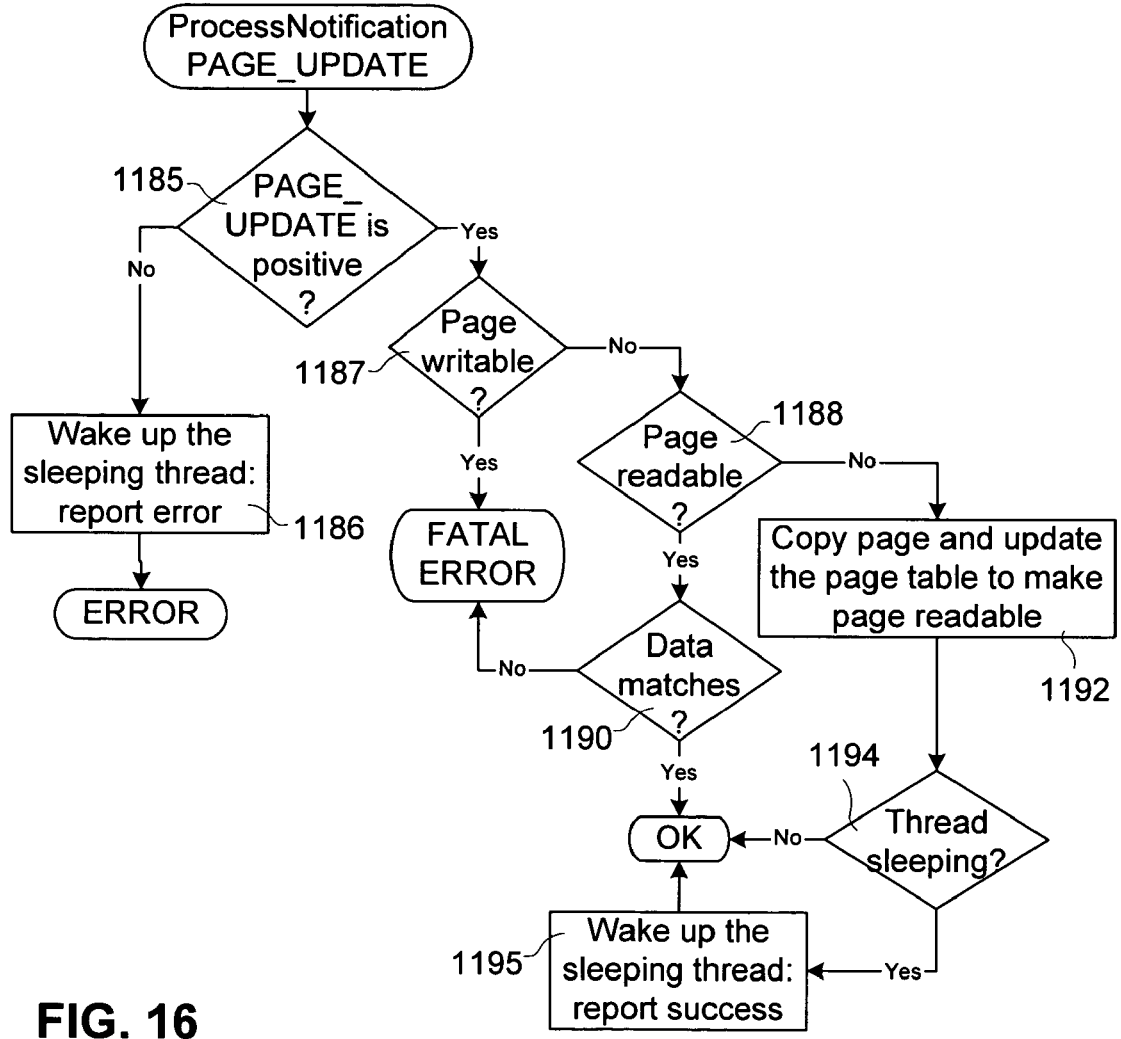
FIG. 16 is a flow chart illustrating principal steps involved in handling a PAGE_UPDATE notification at a Pool object in accordance with an embodiment of the invention.

FIG. 16 is a flow chart schematically illustrating the ProcessNotification handling of a PAGE_UPDATE type notification, in a manner that provides for consistency checking of the page. It is first determined (step 1185) whether the PAGE_UPDATE is positive or negative. The PAGE_UPDATE is negative if 1) the recipient of the PAGE_UPDATE issued the page request, and 2) the sender of the PAGE_UPDATE still has the page locked. Accordingly, the ProcessNotification thread wakes the sleeping thread (running the RetrievePage method), reporting the failed attempt to retrieve the page (step 1186).

If the PAGE_UPDATE is positive, the recipient may or may not be the member that issued the PAGE_REQUEST, and it may or may not be the first of the PAGE_UPDATE notifications received in response to the PAGE_REQUEST. In accordance with the illustrated embodiment, it is determined whether the page is writable (step 1187). If the page is writable, there is a fatal error, as the distributed memory manager 65 sending the PAGE_UPDATE notification should have previously obtained the page for writing purposes and accordingly has (presumably) altered the content of the page, but independently the receiver of the PAGE_UPDATE notification has taken the page to be writable, and has presumably updated the page, which means that neither page is current and it is not clear how to resolve the inconsistency. The possibility of incomplete or incorrect information having been read from and acted upon, or written to the page is detected and a fatal error is reported.

Similarly the page should not be marked as readable, unless the PAGE_REQUEST was sent with reference to a readable page, in which case the page should be identical to that issued in a previous PAGE_UPDATE. If in (step 1188) it is found that the page is readable, it is determined (step 1190) whether the data on the readable page matches the content of the page included in the PAGE_UPDATE notification. If the pages match, then the PAGE_UPDATE notification may be the result of multiple PAGE_UPDATE notifications issued in response to a PAGE_REQUEST sent with reference to a readable page, as previously explained, and no error has occurred. Accordingly, if the pages match, the handling of the PAGE_UPDATE is complete. If the pages do not match, a discrepancy is detected that could have led to the incorrect use of stale data from the readable page (which should not have been readable, if the sending party is correct in sending the PAGE_UPDATE). As it cannot be determined whether the page was accessed since the page was or should have been locked, and further it cannot be determined whether any access was relevant to the changed data, a fatal error is reported.

If the page is neither readable nor writable, the PAGE_UPDATE is the first issued in respect of the page with the current up-to-date page data, and the up-to-date copy of the page is stored, and the page table is updated to make the page readable (step 1192). In step 1194, it is determined whether the receiver is the member that issued the PAGE_REQUEST to which the received PAGE_UPDATE is a response. If the member sent the corresponding PAGE_REQUEST, there will be a corresponding thread running a RequestPage method, and this thread is awoken to the report of a success (step 1195) before the ProcessNotification thread completes successfully. If there is no corresponding RequestPage method, the page is stored to facilitate future page rescue operations on the page, bringing the processing of the notification to its successful conclusion.

FIG. 17 is a flow chart illustrating principal steps involved in the ProcessNotification handling of a PAGE_LOCK notification. In step 1200, it is determined whether the local page lock counter for the page is null. If no, or if the page identified by a page index of the PAGE_LOCK notification is currently writable (step 1204), a negative PAGE_LOCK_ACK notification is sent in reply to the PAGE_LOCK notification (step 1202). The negative PAGE_LOCK_ACK notification includes an identifier of the page (page index).

The rule adopted to ensure consistency of the page data used by the members of the multicast group is that no two members can modify a page concurrently. Accordingly if a receiver has incremented its page lock counter, either prior to obtaining a lock on the page (as in step 1134 of FIG. 16), when a request for the same page is received, the receiver asserts a lock on the page by denying the PAGE_LOCK and sending the negative ACK. If for any reason after the receiver has obtained a lock on the page but before the page is unlocked globally (i.e. when the PAGE_UNLOCK is sent), the sending member has erroneously identified the page as readable, for otherwise it would have sent a PAGE_REQUEST instead of the PAGE_LOCK. As all members (at the time of locking) acknowledged the previous PAGE_LOCK, a PAGE_LOCK is not required for a writable page unless there is a failure of notification processing at one of the two members. Even if the sending member was not connected when the initial PAGE_LOCK was sent, the sending member would not be able to read the locked page and accordingly would not send a PAGE_LOCK. Content of the page is presumed to be stale when the page is locked. But whenever a writable or locked page is identified in a PAGE_LOCK, the receiving member denies the PAGE_LOCK.

If the local page lock counter is 0, and the page is not writable, it is determined (step 1206) whether the page is readable. If the page is readable, the page table is updated (step 1210) to make the page unavailable (neither readable nor writable), and in either case the thread sends a positive PAGE_LOCK_ACK notification in reply (step 1208). The PAGE_LOCK is sent because the sending member believed it to be readable. The page should be readable at the receiver as well, unless the PAGE_LOCK is a retransmission. In anticipation of the page lock by the sender, the receiver ensures that the page is neither readable nor writable as the page will be modified by the sender, so the content of the page cannot be relied upon. It is for this reason that the page is marked as unavailable for both read and write operations.

Page Faults

A page fault is detected by an OS when a thread attempts to read a page that is not available, or to write to a page that is locally write locked. Page faults may be detected during the user mode application execution, and are handled locally to prompt the user mode application to effect the page lock, as described above. However when a plug and play driver executing in the kernel mode attempts to access a page in the kernel mode shared memory space that is not accessible, the distributed memory service needs to be notified of the condition.

Upon detection of a PAGE_FAULT, the plug and play driver issues a PAGE_FAULT local notification to the distributed memory driver 42, which pushes the local notification into the queue. When the memory manager library retrieves the notification (using the DriverInterface 128), it will invoke the ProcessPageFault method of the Pool (step 1216). The distributed memory driver 42 acknowledges the PAGE_FAULT local notification in step 1218 once the ProcessPageFault method completes, and the processing of the local notification is complete.

Principal steps of the ProcessPageFault method are schematically illustrated in FIG. 19. In step 1220 a type of the page fault is identified. As previously stated, the page faults may be either of a read or a write type. If the page fault is of a read type, the Pool method for retrieving a page is called (step 1222), and the processing shown in FIG. 14 is effected, completing the processing of the ProcessPageFault method. The thread running the ProcessLocalNotification of the PAGE_FAULT notification is therefore awakened with the indication of success, prompting the transmission of the acknowledgement of (step 1142, FIG. 17).

If the page fault is of a write type, the ProcessPageFault method applies the LockPage and then the UnlockPage methods in succession (steps 1224, 1226). By locking the page the page becomes writable, and by unlocking the page the local page lock counter is decremented so that other distributed memory managers can thereafter obtain access to the page by requesting it. Given that there is no predefined criterion for identifying when to unlock the page once it is locked, the page is unlocked immediately. When the page becomes unlocked, the page remains writable by the local threads, until such time as the page is requested by another member of the group.

Mutex Locking

It is frequently a requirement for programming of distributed applications that mutually exclusive (Mutex) locks be applied to data structures in order to ensure that consistent data is maintained by all members of the group, by permitting only one member to update a page at a time, and by ensuring that while a member is updating an object, no other member relies on the content of the data. It should be noted that while the data structures are stored on the memory pages, there is no correspondence between the locking of pages and the unlocking of pages.

Mutex locks permit the program developer to define Mutex objects 128 belonging to the Pool 120. The Mutex objects 128 permit the program developer to regroup logically related (non-overlapping) sets of data (the data structures) located on the pages. Each Pool 120 (of both the main shared memory pools 74 and the additional shared memory pools 75) can be associated with respective Mutex objects 128, and accordingly a Mutex object 128 can belong to a single processing unit, or can be shared by a number of processing units.

The flow chart shown in FIG. 20 schematically shows steps involved in locking a data structure in accordance with the Lock method of the Mutex object 128. In step 1280 a local mutex count of the Mutex 128 is incremented. It is then determined (step 1282) whether the local mutex count was null. If the local mutex count is now greater than 1, the Mutex 128 object is already locked, in which case the Lock method is complete.

If the local mutex lock counter is now 1, the local mutex count was previously zero, and no prior lock on the Mutex object was established. Accordingly the Mutex object's SendNotificationToGroup method is invoked to issue a LOCK notification to the multicast group of the Pool object 120 (step 1284), and the thread running the Lock method sets a timer, and goes to sleep (step 1286). If the thread is awoken by timeout, the timeout handling shown in FIG. 46 is applied before returning to step 1284. If the thread is awoken by a ProcessNotification with a report of success, the Mutex lock has been acknowledged by all of the current members of the group, and the method completes successfully.

If the thread awakes to the report of an error, one of the members of the group has refused the Mutex lock., and the thread decrements the local mutex count (step 1288), effectively clearing the local mutex count. The thread then randomly selects a backoff time and goes to sleep (step 1290), in order to avoid a lock-step collision of Lock notifications, as previously described. If the thread is awoken by a timeout, or if the thread is awoken by a ProcessNotification successfully reporting a RELEASED notification, the thread returns to step 1280.

FIG. 21 is a flow chart illustrating principal steps involved in the Unlock method of the Mutex object 128 in accordance with the illustrated embodiment of the invention. In step 1300 the local mutex count is decremented. If the mutex lock is maintained by other threads of user mode applications, the local mutex count would have been incremented by those other distributed processes, and the local mutex count would now be a number greater than 0 (step 1302), in which case the method is complete. Otherwise the local mutex count is 0, and the thread running the Unlock method sends a RELEASED notification to the group (step 1304). The RELEASED notification is not acknowledged in accordance with the illustrated embodiment.

FIG. 22 schematically illustrates the handling of notifications according to the ProcessNotification method of the Mutex 128. In step 1310, a type of the received notification is determined. If the notification is of a LOCK type, the thread running the ProcessNotification determines whether the local mutex count is null (step 1312), indicating that the data-structure identified in the LOCK notification is not locally read-locked. If the local mutex count is null, the thread invokes the SendNotificationToOne method to return a positive LOCK_ACK notification (step 1314), and if the local mutex count is greater than 0 a negative LOCK_ACK notification is sent (step 1316).

If the notification is of a LOCK_ACK type, it is first determined whether the notification is positive or negative (step 1318). If the ACK is negative, in step 1320, the thread wakes up the thread running the LOCK method (FIG. 20), to report an error. If the ACK is positive, the ACK is added to the local list (step 1322), and it is determined whether the local list is now complete (step 1324). If the list is not complete, the ProcessNotification has not yet completed. If the list is complete the thread running the ProcessNotification wakes the thread running the LOCK method to report success (step 1326).

If the notification is of a RELEASED type, ProcessNotification handling involves determining whether there is any thread waiting for the release of the Mutex object (step 1326). If there is no thread sleeping in accordance with step 1290 of FIG. 20, the ProcessNotification method completes successfully. Otherwise the thread is awoken to the report of success (step 1328).

ProcessingUnit Objects

Figure 23:
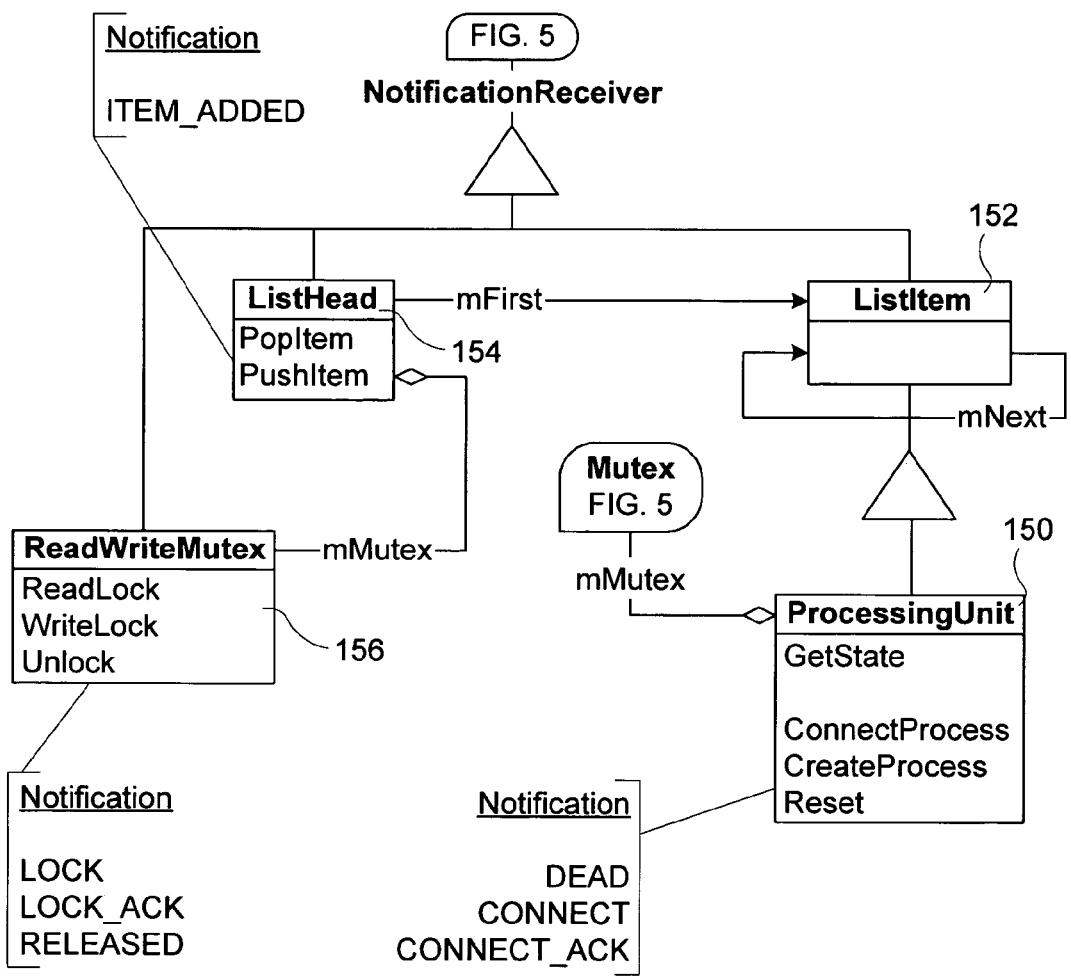
FIG. 23 is a schematic class structure diagram of a ProcessingUnit object that supports distributed processes in accordance with an embodiment of the invention.

FIG. 23 schematically illustrates a class structure diagram of a ProcessingUnit object 150 in accordance with the current embodiment of the invention. Each processing unit is begun by launching a start image executable file. The processing unit is provided with a sub-device number issued by the distributed memory manager 65 when the processing unit initially connects to the distributed memory manager 65.

Each processing unit has address space where it keeps its own copy of its executable code; the code space 72. In each copy, identical functions are located at the same virtual address so that each copy of the code space 72 has the same content at the same virtual address. Each processing unit of the distributed process is started using the same executable image. Each processing unit further has its own private data addressing space (not shown in FIG. 5). This private data addressing space contains a local thread stack and a private heap as well as the local list of ACKs relating to the ProcessingUnit. Each processing unit is associated with a ProcessingUnit object 150 in the user mode memory space 70 identified as the global shared memory pool 71.

The ProcessingUnit object 150 is a ListItem 152, which in turn is a NotificationReceiver 122, as shown in FIG. 6, inheriting the corresponding methods and attributes. Every ProcessingUnit is created in a global shared memory pool 71 that all distributed processes can access. The ProcessingUnit belongs to a member of Mutex, and so can be locked and unlocked by the Mutex. The ProcessingUnit 150 includes methods for connecting to a process, creating a process, and for resetting itself to go from a RUNNING state to an IDLE state. The ProcessingUnit 150 also includes a ProcessNotification method for exchanging CONNECTION and CONNECTION_ACK messages as required to support the ConnectProcess methods. The ProcessingUnit 150 also has a State attribute that is either RUNNING, DISCONNECTING or IDLE. When the ProcessingUnit 150 is RUNNING, it is not in a ListHead 154.

The ListHead object 154 is an object that manages the list mutex. ListItem and ListHead objects are structures provided by operating systems, and commonly included in programming language libraries that may be instantiated to provide queue management for any number of items.

In accordance with the current embodiment of the invention, the ListHead 154 contains ProcessingUnits 150 that are in the IDLE state (an IDLE processing unit list), and a ReadWriteMutex object 156 belongs to the ListHead 154. The ListHead object 154 is stored in the global distributed memory space of a ProcessingUnit 150. The ListHead 154 provides methods for pushing, and popping items of the IDLE processing unit list and for exchanging notifications and other ITEM_ADDED notifications with the ListHead objects 154 of the ProcessingUnit at different processor nodes 30.

Figure 34:
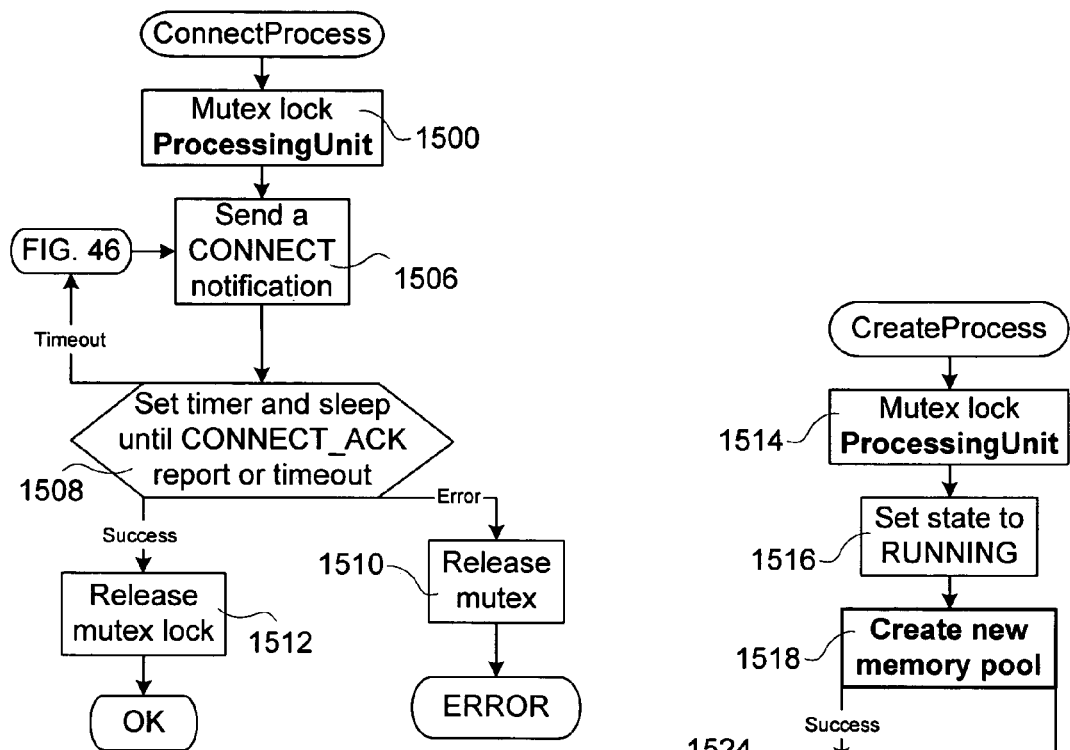
FIG. 34 is a flow chart illustrating principal steps involved in a ConnectProcess method of the ProcessingUnit that permits an enlisted ProcessingUnit to connect to a Process, in accordance with an embodiment of the invention.
Figure 35:
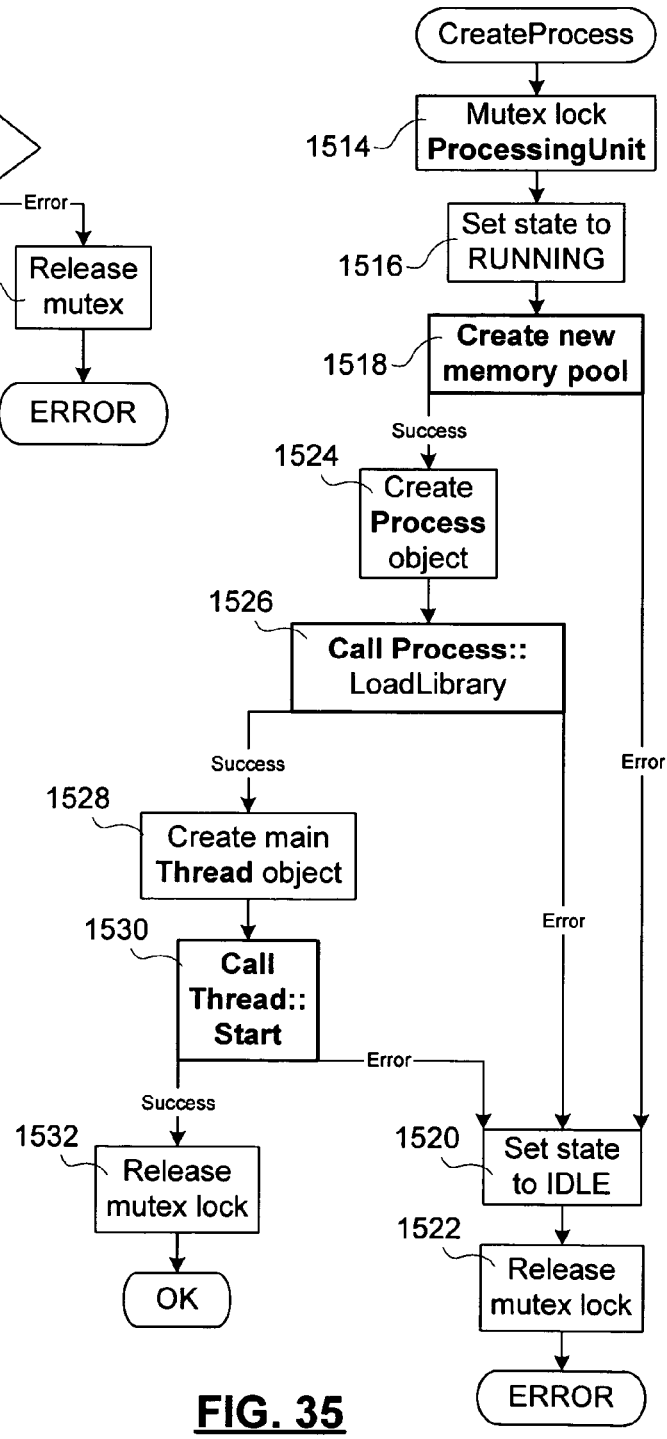
FIG. 35 is a flow chart illustrating principal steps involved in a CreateProcess method of the ProcessingUnit that permits the creation of a distributed process in accordance with an embodiment of the invention.

The ListHead maintains the IDLE processing unit list in a manner that facilitates the selection of an IDLE processing unit to enlist by distributed processes, if one is available. Depending on implementation, the distributed processes can use thread information to efficiently choose an IDLE processing unit from the global shared memory pool 72. Such information may be a CPU usage of the processor node 30, an assigned priority of the processing unit, available physical memory of the processor node 30, available hardware resources or other criteria defined by the user mode application. FIGS. 34 and 35 show how ProcessingUnits connect to or create distributed processes.

A ReadWriteMutex object 156 is an object that controls read and write locks on shared objects (which are defined in the same manner as Mutex objects). In contrast with the mutex 128 which locks data structures preventing the reading or writing of data on the data structures, the ReadWriteMutex provides a method for read locking, or for write locking. A write ReadWriteMutex lock is equivalent to a mutex lock, and in some embodiments only one of the two is defined.

In the same manner as the Mutex is defined as a part of the Pool, but can equally be instantiated by any other user mode application-defined data structure, and perform the same locking function with respect to that other data structure, the ReadWriteMutex of the ListHead is shown to introduce the ReadWriteMutex but the ReadWriteMutex object can be instantiated for other data structures as well.

Redundancy

When building high availability systems, the presented architecture permits starting processing units in pairs running on separate processor nodes 30. One more State is defined called STANDBY. The paired processing units are the same part of the same Process. Their code space is kept consistent and both participate in management of shared memory.

The RUNNING processing unit operates normally. The processing unit on standby monitors the RUNNING processing unit by setting its bus adapter driver 52 to receive all notifications sent to the RUNNING processor node 30, but does not send ACKs.

All notifications defined herein sent to system level objects (Pool, Thread, Process etc.) of the RUNNING processing unit are received by the STANDBY ProcessingUnit. However it will be appreciated by those skilled in the art that notifications defined by developers of user mode applications will not be monitored in this manner, because there is no logic for handling these notifications. Accordingly user-defined notifications may be ignored by the STANDBY processing unit.

If the running unit fails to acknowledge a notification as expected, the STANDBY ProcessingUnit can switch to a RUNNING state, and restart all threads known to be running on the previously RUNNING ProcessingUnit.

In such high availability embodiments, the application developer ensures that each thread running on such a standby ProcessingUnit can be restarted, for example by tracking various copies of the structures that are marked and resuming thread processing with the copy available before the processing unit failed.

When redundancy is used, the RUNNING ProcessingUnit runs a special thread that parses the page table, and sends a PAGE_UPDATE notification to the group (or alternatively only to the STANDBY ProcessingUnit) whenever it finds an unlocked modified page. This way a risk of losing shared data is minimized. This special thread can be run even if redundancy is not activated to decrease the likelihood of lost data when a processor node 30 fails, and may be particularly useful when the rate of change of membership in the multicast groups is high.

Pool Locking

Figure 24:
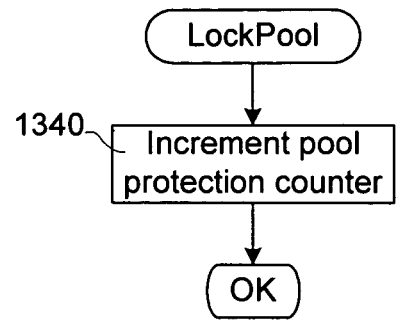
FIGS. 24 and 25 are flow charts illustrating principal steps involved in LockPool and UnlockPool methods of the Pool used to prevent loss of new data stored on modified pages that are no longer locked, in accordance with an embodiment of the invention.

FIG. 24 is a flow chart illustrating principal steps involved in a LockPool method of the Pool object 120, in accordance with the current embodiment of the invention. In step 1340 a local pool protection counter is incremented to prevent the pages of the Pool from being removed while the page contains data that has not been shared with the other members of the group. The LockPool method then ends in success.

Figure 25:
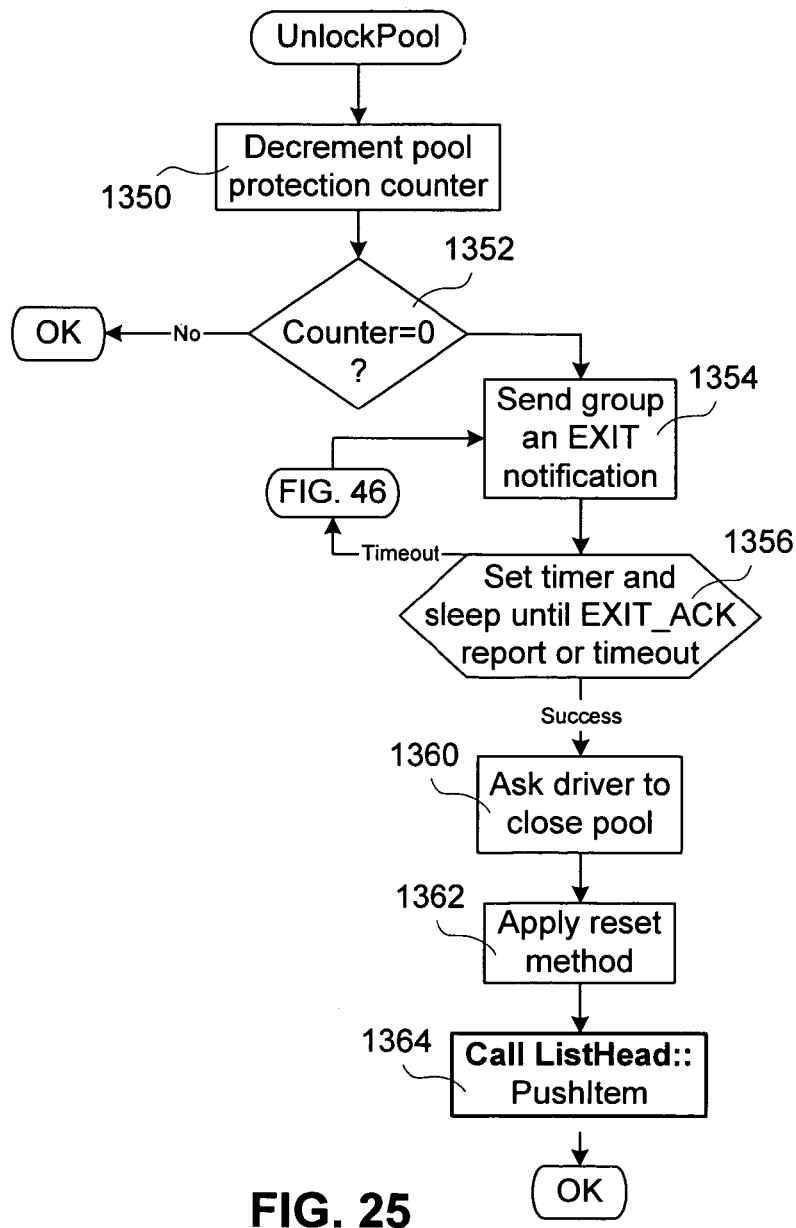

FIG. 25 is a flow chart illustrating principal steps involved in a thread executing the UnlockPool method. In step 1350 the pool protection counter is decremented. It is then determined whether the counter has been decremented to 0 (step 1352). If the counter is not 0, the thread has successfully completed the UnlockPool method.

If the pool protection counter is decremented to 0 in step 1350, there is no longer any reason for the Pool to be retained. Accordingly, in step 1354 the thread invokes a method for sending a notification of the EXIT type to the group. The thread (step 1356) sets a timer and sleeps until the timer expires (in which case the timeout process of FIG. 46 are applied before returning to step 1354), or a report from a ProcessNotification thread is received. If EXIT_ACKs are received from all of the current members of the group before the timeout, the Pool object is closed (step 1360), the processing unit state is set to IDLE (step 1362) by invoking the Reset method of the ProcessingUnit, and the ProcessingUnit is added to the IDLE processing unit list by invoking the PushItem method (see FIG. 27) of the ListHead object.

ListHead

FIG. 26 is a flow chart illustrating principal steps involved in a PopItem method of the ListHead object 154. In step 1380, the ReadWriteMutex object of the ListHead is locked to prevent any other member from writing to the ListHead during the pop, by invoking the WriteLock method of the ReadWriteMutex object 156 (see FIG. 29). In step 1382, it is determined whether the IDLE processing unit list is empty. If the IDLE processing unit list is not empty, a first item (i.e. an IDLE ProcessingUnit 150) is removed from the list (step 1384). In step 1386, the write lock is removed by application of the Unlock method of the Mutex object shown in FIG. 30.

If the list is found to be empty in step 1382, the Unlock method of the Mutex object is invoked to release the write lock (step 1388). Next a timer is set, and the thread running the PopItem method waits for an ITEM_ADDED notification, or for the timer to timeout (step 1390). In either case, the thread returns to step 1380.

FIG. 27 is a flow chart illustrating principal steps involved in a PushItem method of the ListHead object 154, in accordance with the illustrated embodiment. In step 1400 the WriteLock method is invoked. Upon successful completion of the WriteLock method, the item (the IDLE ProcessingUnit) is added to the IDLE processing unit list (step 1402). The write lock is released using the Unlock method (step 1404), and an ITEM_ADDED notification is sent to the group (step 1406) to indicate to any threads waiting for an item to pop (as in step 1390 of FIG. 26), that one is now available.

As shown in FIG. 28, upon receipt of a notification from a remote process, in step 1420, the thread identifies a type of the notification (which is an ITEM_ADDED type, or a type inherited by the NotificationReceiver 122, in which case it is handled in the manner described above in relation to FIG. 7). Upon receipt of an ITEM_ADDED notification, the thread determines whether a thread running the PopItem method is sleeping (step 1422). If no such thread is found, the process is complete. Otherwise the ITEM_ADDED notification prompts the thread that is processing the notification to wake up each thread running the PopItem method reporting a success (step 1422).

Read and Write Locking

While the Mutex locking mechanism described above provides sufficient control of data structures in certain embodiments, in other embodiments, it may be desirable to permit read locking as well as write locking. The Mutex locking mechanism is a write lock. Read locks may be required to prevent other members from writing over the data structure but without preventing other members from reading the data structure. Many distributed application routines require one consistent set of values be used throughout the routine. If the values change during execution of the routine the result of the routine may be inaccurate, or the routine may crash. While a write lock could be used, this would preclude other members from reading the object which may not be desirable. Accordingly, the illustrated embodiment further provides ReadLock and WriteLock methods.

FIG. 29 is a flow chart illustrating principal steps involved in the ReadLock or WriteLock methods of the ReadWriteMutex object 156. In step 1430 a read local lock counter, or a write local lock counter is incremented, depending on whether the method invoked is the ReadLock or WriteLock. If the incremented lock count is greater than 1 (step 1432), there is a previous read/write lock on the data structure (in this example, the ListHead) from the ReadWriteMutex object, and there is no need to notify the members of the group of a change in the status of the ReadWriteMutex object. The thread therefore successfully completes the method.

If the incremented lock count is 1 (step 1432), it was previously null, and the thread effecting the ReadLock/WriteLock method must notify the other members of the group of a change in the status by issuing a LOCK notification, by invoking the SendNotificationToGroup method inherited from the NotificationReceiver 122 (step 1434). The thread then sets a timer and sleeps (step 1436) until awoken by the timeout, or a thread running a ProcessNotification routine. If a timeout wakes the thread, timeout handling is applied as shown in FIG. 46. If the thread is awoken by a report of success, the method completes successfully. If a negative LOCK ACK notification is received, one of the other members of the group has denied the read or write lock (see FIG. 31), and accordingly the thread decrements the appropriate (read or write) local lock counter (step 1438), and sets a timer for a random back off interval (step 1440). If the timer times out, or a RELEASE notification is received, the method returns to step 1430.

FIG. 30 is a flow chart illustrating principal steps involved in unlocking a ReadWriteMutex object. In step 1450, the appropriate local lock count is decremented. If the resulting value of the local lock count is greater than 0, the Unlock method has successfully completed. If the local lock count subsequent to decrement, is 0 (step 1452), the member must release the lock, and accordingly a RELEASE notification is multicast to the group (step 1454). In accordance with the illustrated embodiment the RELEASE notification is not acknowledged.

FIG. 31 is a flow chart illustrating principal steps involved in ProcessNotification handling of notifications by the ReadWriteMutex method. In step 1460 a type of the notification is ascertained. If the notification is of a LOCK type, in step 1462, it is determined whether the local write lock counter is null. If the local write lock counter is not null, the thread processing the notification sends a negative LOCK_ACK notification (step 1464), indicating that the ReadWriteMutex mutex's data structure (e.g. the ListHead) is already locked, and cannot be locked again.

Otherwise, the local write lock counter is null, and it is determined in step 1466 whether the LOCK notification requests a read lock, or a write lock. If a read lock is requested, the request is satisfiable and accordingly the thread sends a unicast reply to the sending member indicating a positive LOCK_ACK (step 1468). If a write lock is requested, the thread determines whether the local read lock counter is 0 (step 1470). If the read lock is counter null, no thread currently requires the mutex's data structure, and so the thread sends a positive LOCK_ACK in step 1468. Otherwise the acknowledgement of the write lock would interrupt the read lock of the local user mode application, and must be refused using the messaging step 1464.

Upon receipt of a LOCK_ACK notification, it is determined (step 1472) whether the ACK is positive or negative. If the ACK is negative, the thread wakes the sleeping thread that executes the ReadLock or WriteLock, indicating an error (step 1474). If the ACK is positive it is added to the local list (step 1476), and it is determined if the local list now contains an ACK from each member (step 1478). If the local list is still incomplete, the method returns a success. If the local list is now complete, the thread wakes up the sleeping thread indicating success (step 1480), before completing successfully.

Upon receipt of a RELEASE notification, it is determined whether a corresponding thread is sleeping, as per step 1440 of FIG. 29, with respect to the same ReadWriteMutex. If no other thread is sleeping, the method has completed successfully. Otherwise, the sleeping thread is awoken reporting success (step 1482).

Process and Thread Objects

Figure 32:
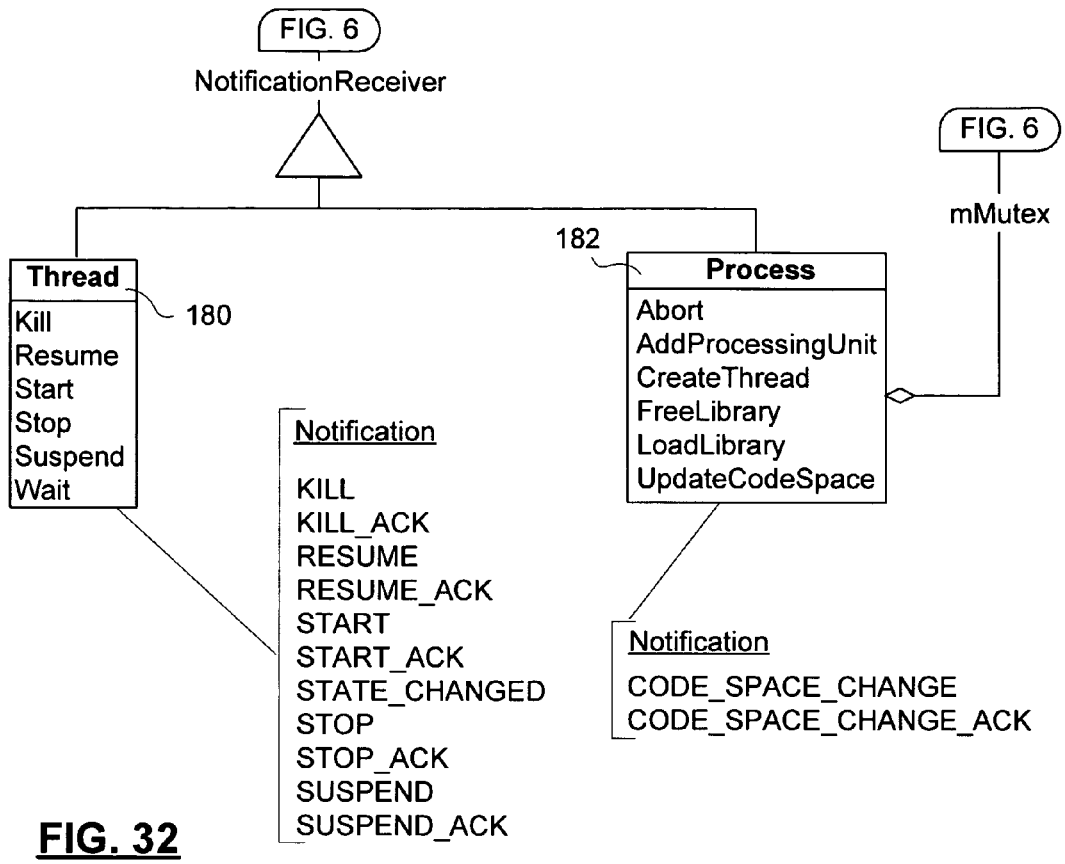
FIG. 32 is a schematic class structure diagram of a Process and Thread objects illustrating principal notifications and methods to support distributed processes in accordance with an embodiment of the invention.

FIG. 32 schematically illustrates a class structure diagram of Thread 180 and Process 182 objects, both of which are NotificationReceiver objects 122, as defined in FIG. 6. Each thread is associated with a respective Thread object, just as a respective Process object is provided for each distributed process.

The Thread 180 objects include methods for killing, starting, stopping, suspending and waiting (e.g. for a child thread to end) in the execution of the method it invokes. The Thread 180 further includes a ProcessNotification method for enabling remote threads to exchange KILL, KILL_ACK, RESUME, RESUME_ACK, START, START_ACK, STATE_CHANGED, STOP, STOP_ACK, SUSPEND, and SUSPEND_ACK notifications in accordance with the methods of the Thread. The methods of the Thread 180 permit any instance of the ProcessingUnit 150 to which the Thread belongs to start and stop the thread, to suspend and resume the thread, and to kill the Thread, and further permits the Thread to be forced to wait for a Thread to end, for example in accordance with a wait method. The starting and stopping of threads permits threads to perform ongoing processes that may be stopped or started by other threads. The suspending and resuming operations are useful for debugging distributed application code, as is well known in the art. A final method of the Thread permits the Thread to notify (multicast to group) the termination of the thread upon completion, by sending a STATE_CHANGED notification.

The distributed processes are associated with respective Process objects 182 created in the main shared memory pool 74. The Process 182 belongs to a member of Mutex, and so can be locked and unlocked by the Mutex. The Process object 182 has methods for creating thread objects, enlisting an IDLE processing unit to be added to the Process, and for maintaining consistency between content of the respective code spaces of the Process's ProcessingUnits by loading and freeing user mode library files of the code spaces. The Process 182 also has a method for aborting itself. Abort is a method invoked by a process when a fatal error is encountered. The abort method prompts the killing of each of the associated threads and the disconnection of the ProcessingUnits from the Process. An UpdateCodeSpace method permits the loading and freeing of the user mode library files in accordance with an operation list, which indexes the complete ordered set of load and unload operations that have taken place at the distributed process's code space. The method for processing notifications inherited from the NotificationReceiver is further adapted to process CODE_SPACE_CHANGE and CODE_SPACE_CHANGE_ACK notifications.

Figure 33:
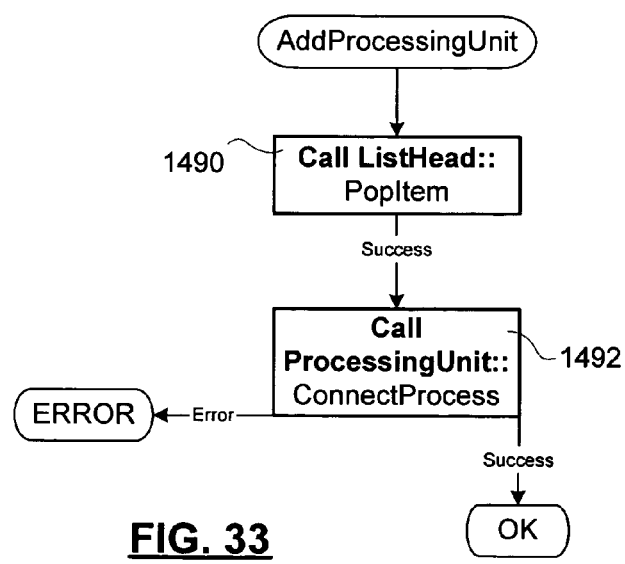
FIG. 33 is a flow chart illustrating principal steps involved in an AddProcessingUnit method that permits a Process to enlist a ProcessingUnit, in accordance with an embodiment of the invention.

FIG. 33 is a flow chart illustrating principal steps involved in the AddProcessingUnit method of the Process 182. In step 1490, the thread executing the AddProcessingUnit method invokes the PopItem method of the ListHead 154 shown in FIG. 26. When the PopItem method succeeds, in step 1492, the thread calls the ConnectProcess method of the ProcessingUnit 150 that the pop returned. The ConnectProcess is a part of the selected ProcessingUnit that is available to all members of the group (i.e. stored in the main shared memory pool). The ConnectProcess is executed locally at the Process's effective site (i.e. by a Processor Node 30 executing the relevant part of the distributed process, in this case the Process's AddProcessingUnit method), and is used to effect the connection of the selected ProcessingUnit to the Process. If the ConnectProcess returns an error, the AddProcessingUnit method fails, and otherwise the AddProcessingUnit method completes successfully.

FIG. 34 is a flow chart illustrating principal steps involved in the ConnectProcess method of the ProcessingUnit 150, which is applied by a distributed process at its effective site, to connect the ProcessingUnit to the Process in step 1500, a mutex lock is placed on the ProcessingUnit by the member of the Mutex tied to the ProcessingUnit, in order to prevent any other process from requesting the ProcessingUnit concurrently.

The thread at the effective site of the distributed process running the ConnectProcess method of the selected IDLE ProcessingUnit (but potentially remote from the processor node 30 of the selected ProcessingUnit), in step 1506, issues a CONNECT notification to the selected ProcessingUnit at the processor node 30 of the selected ProcessingUnit. As typically is the case, the CONNECT is sent from the effective site of the Process to the processor node 30 of the selected ProcessingUnit using the SendNotificationToOne method inherited from the NotificationReceiver. In this way the public part of the processing unit (which is available at each processing unit via the global distributed memory pool 71), permits the Process to connect to selected ProcessingUnit.

The thread then sets a timer, and goes to sleep (step 1508). If the thread is awoken by the timer timing out, the timeout handling shown in FIG. 46 is applied, before returning to step 1506. If a positive CONNECT_ACK is received, the thread releases the mutex lock on the ProcessingUnit, and returns success. If a negative CONNECT_ACK is received, the thread advances to step 1504.

FIG. 35 is a flow chart illustrating principal steps involved in the CreateProcess method of the ProcessingUnit 150, in accordance with the illustrated embodiment. A thread executing user mode application program instructions may invoke the CreateProcess method of an IDLE ProcessingUnit in order to create another distributed process. In step 1514 a mutex lock is placed on the ProcessingUnit using a method shown in FIG. 20, in order to prevent any other thread from accessing the ProcessingUnit. The state of the ProcessingUnit is set to RUNNING (step 1516), and the process for attempting to create a new shared memory pool shown in FIG. 9 is applied (step 1518). If the attempt to create a new memory pool fails, the state of the ProcessingUnit is returned to IDLE (step 1520), and the mutex lock on the ProcessingUnit is released (step 1522) bringing the method to its completion. The thread returns an error.

Once a Pool object is instantiated for the main distributed memory pool of the processing unit, a Process object is created (step 1524) using a Constructor method of the Process object, in a manner well known in the art. The Process object is now created and the ProcessingUnit belongs to the Process, but there is nothing for the distributed process to execute. Accordingly in step 1526, the LoadLibrary method of the Process object is invoked. The LoadLibrary method loads, into the code space 72 of the locked ProcessingUnit, a shared object (in Linux) or a data linked library file (in Windows), or an equivalent software layer element of another operating system used to implement the invention. The LoadLibrary method includes executable code for effecting the execution of the part of the user mode application prompted the construction of the distributed process. If the LoadLibrary method fails, the thread advances to step 1520. Otherwise a main Thread is created for the Process (step 1528) using the CreateThread method of the Process, and the Start method of the Thread is invoked (step 1530). The Start method is further described below with reference to FIG. 27. If the start method ends in failure, the thread advances to step 1520, and otherwise the mutex lock on the ProcessingUnit is released (step 1532), and the thread ends in success.

Figure 36:
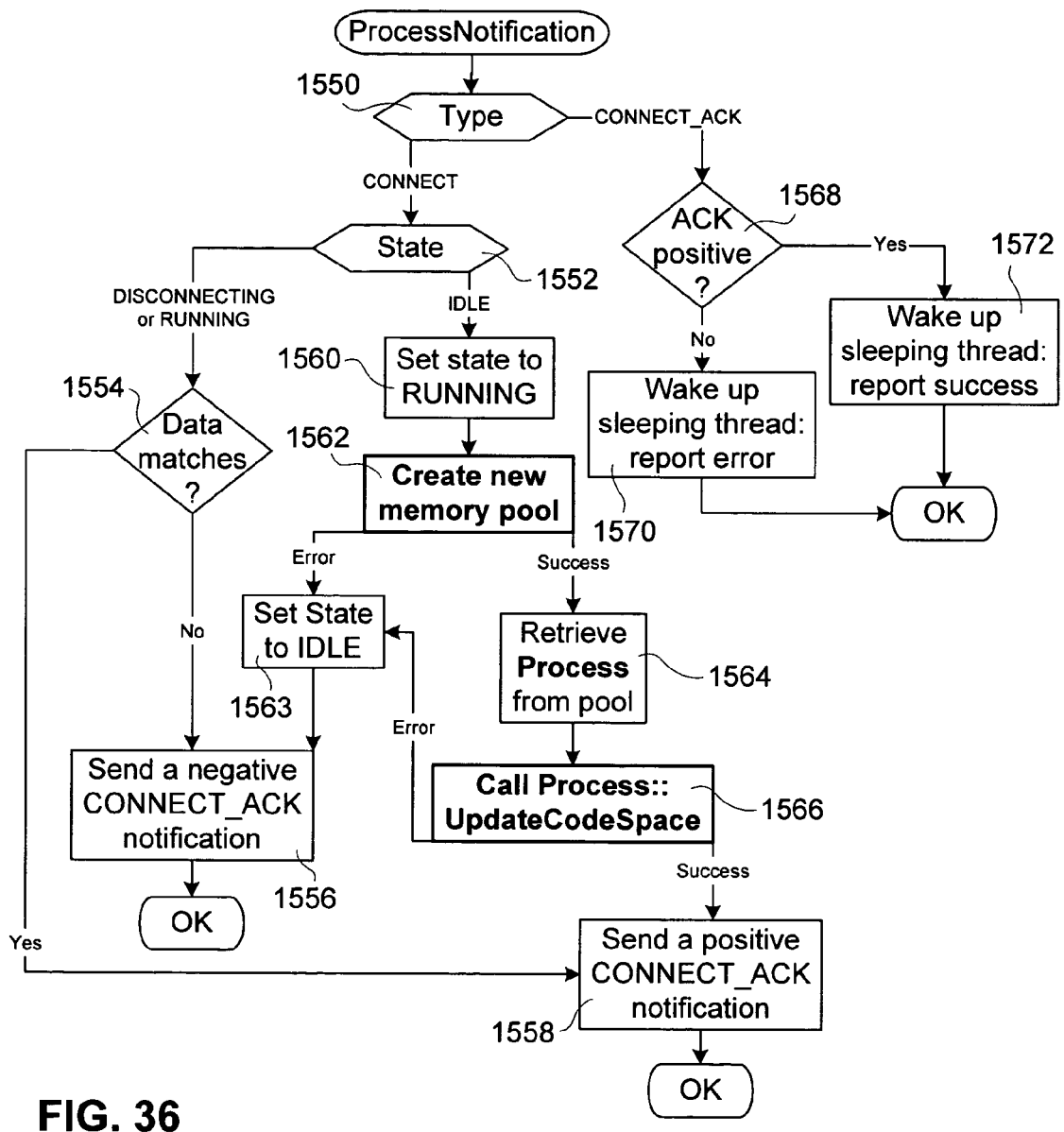
FIG. 36 is a flow chart illustrating principal steps involved in notification handling at the ProcessingUnit in accordance with an embodiment of the invention.

FIG. 36 is a flow chart illustrating the principal steps involved in a ProcessNotification method of the ProcessingUnit. If the notification is of a CONNECT type (step 1550), the ProcessNotification thread is local to the processing unit, and in step 1552, the State of the ProcessingUnit is determined using the GetState method. If the ProcessingUnit is in the DISCONNECTING or RUNNING state, it is determined (step 1554) whether the CONNECT is requesting the ProcessingUnit to connect to the Process it is already connected to, which would happen, for example, if a previous CONNECT_ACK was sent but not received at the Process's effective site. If the Process of the CONNECT notification does not match with that of the Process object to which the ProcessingUnit is connected, the CONNECT is not correct, and the thread returns a negative CONNECT_ACK in reply to the CONNECT (step 1556). If the data matches, the ProcessNotification thread invokes the SendNotificationToOne method of the ProcessingUnit to (re)send a CONNECT_ACK notification in reply to the CONNECT, the CONNECT_ACK being positive. The thread then completes successfully.

If in step 1552 it is found that the ProcessingUnit is in an IDLE state, the thread sets the state to RUNNING (step 1560) and the create Pool process shown in FIG. 9 is performed to attempt to create a new shared memory pool. If the attempt fails (step 1562), the State of the ProcessingUnit is returned to IDLE (step 1563), and the thread advances to step 1556. Otherwise, in step 1564, the Process is retrieved using the RetrieveProcess method of the Pool object. Insodoing the connection between the Process and the ProcessingUnit is established.

The UpdateCodeSpace method of the Process is subsequently invoked (step 1566) to update the code space of the ProcessingUnit, to be the same as the codes spaces of the other ProcessingUnits of the Process to which the ProcessingUnit has connected. If the update code space method is successfully completed, the thread advances to step 1558, otherwise it advances to step 1556.

If the notification received is a CONNECT_ACK, it is received at the effective site of the Process, and the thread determines (step 1568) whether the CONNECT_ACK is a positive or a negative ACK. If the ACK is positive, the thread reports success to the waiting thread (step 1572), and if the ACK is negative, the thread reports error to the waiting thread (step 1570), before ending successfully.

Figure 37:
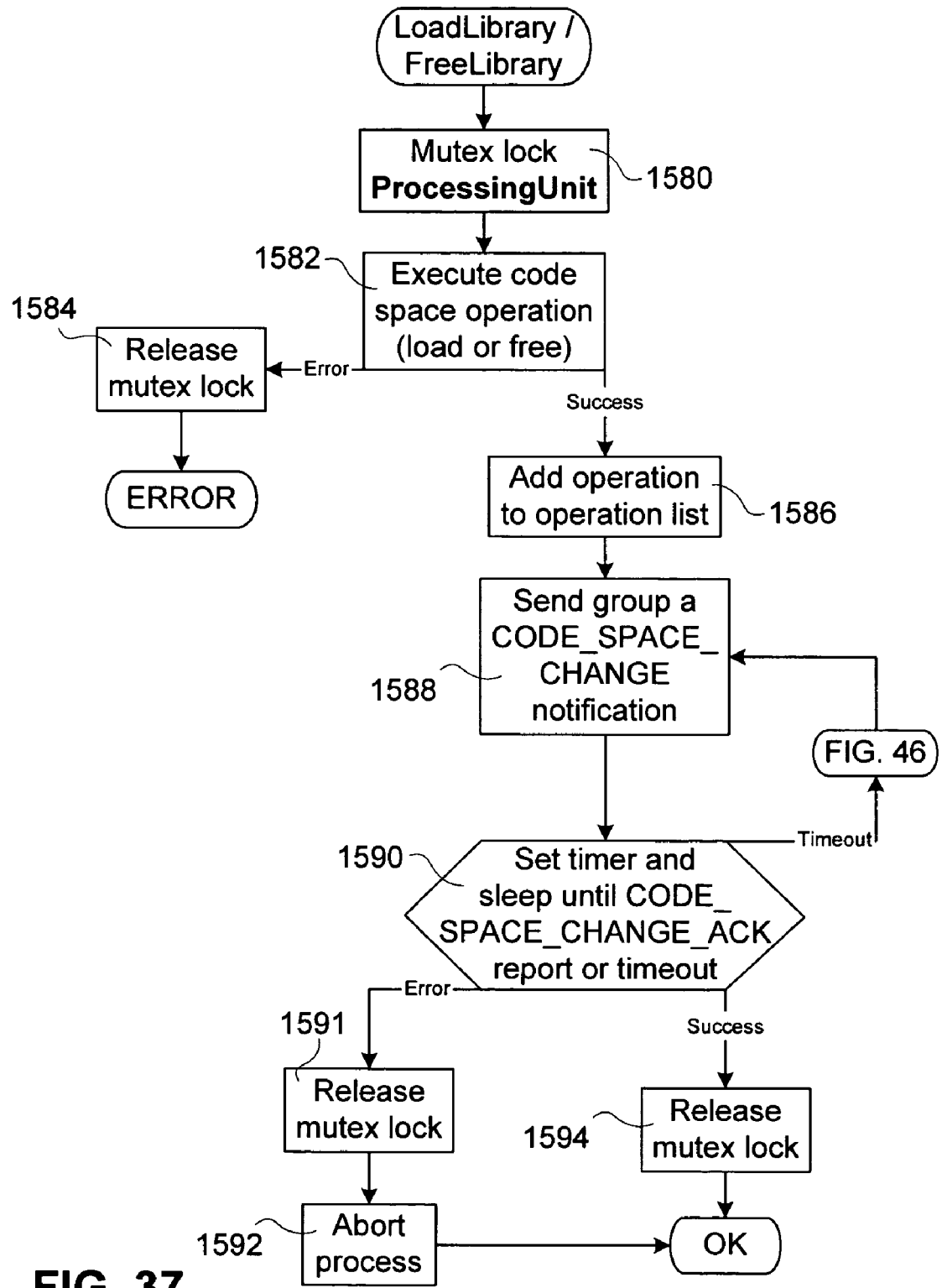
FIG. 37 is a flow chart illustrating principal steps involved in loading and unloading user mode library files by a Process in a way that permits reliable addressing of content of the shared memory pool, in accordance with an embodiment of the invention.

FIG. 37 is a flow chart illustrating principal steps involved in changing a content of the code space of a processing unit. It will be appreciated by those skilled in the art that a user mode application running a Process may require the loading of user mode library files (shared objects, dynamically linked library (DLL) files, etc.). In accordance with the illustrated embodiment, the loading and unloading of user mode library files is performed in a way that permits the tracking of the order in which such files are loaded and freed from the Process's shared memory space (code space). In this way, the content of each address of the code space is reliable at all of the ProcessingUnits. In step 1580, the ProcessingUnit of the Process is mutex locked (see FIG. 20). The corresponding load or release of memory into/from the code space is then effected (step 1582) using an OS memory manager in a manner well known in the art. If the load or release is unsuccessful, the mutex lock is released (step 1584), and the LoadLibrary or FreeLibrary fails.

If the load/free operation is successful, the thread adds the load/free operation to the operation list of the Process (step 1586). The operation list permits the Process to indirectly specify content of each bit in the code space to any ProcessingUnit 150 configured by the same OS, so that addresses of the code spaces of the processing units of the same distributed process are addressable.

In step 1588, the thread invokes the SendNotificationToGroup method of the Process object, to issue a CODE_SPACE_CHANGE notification. The thread then sets a timer, and goes to sleep (step 1590). If a negative CODE_SPACE_CHANGE_ACK is received, one of the other members of the group has failed to apply the change. Consequently, the mutex lock is released (step 1591), and the distributed process aborts step 1592. If the thread is awoken by the timer timing out, the timeout handling shown in FIG. 46 is applied before the thread returns to step 1588. If each of the members of the group responds with a positive CODE_SPACE_CHANGE_ACK notification before the timeout, the mutex unlocks the ProcessingUnit (step 1594) and the method ends in success.

Figure 38:
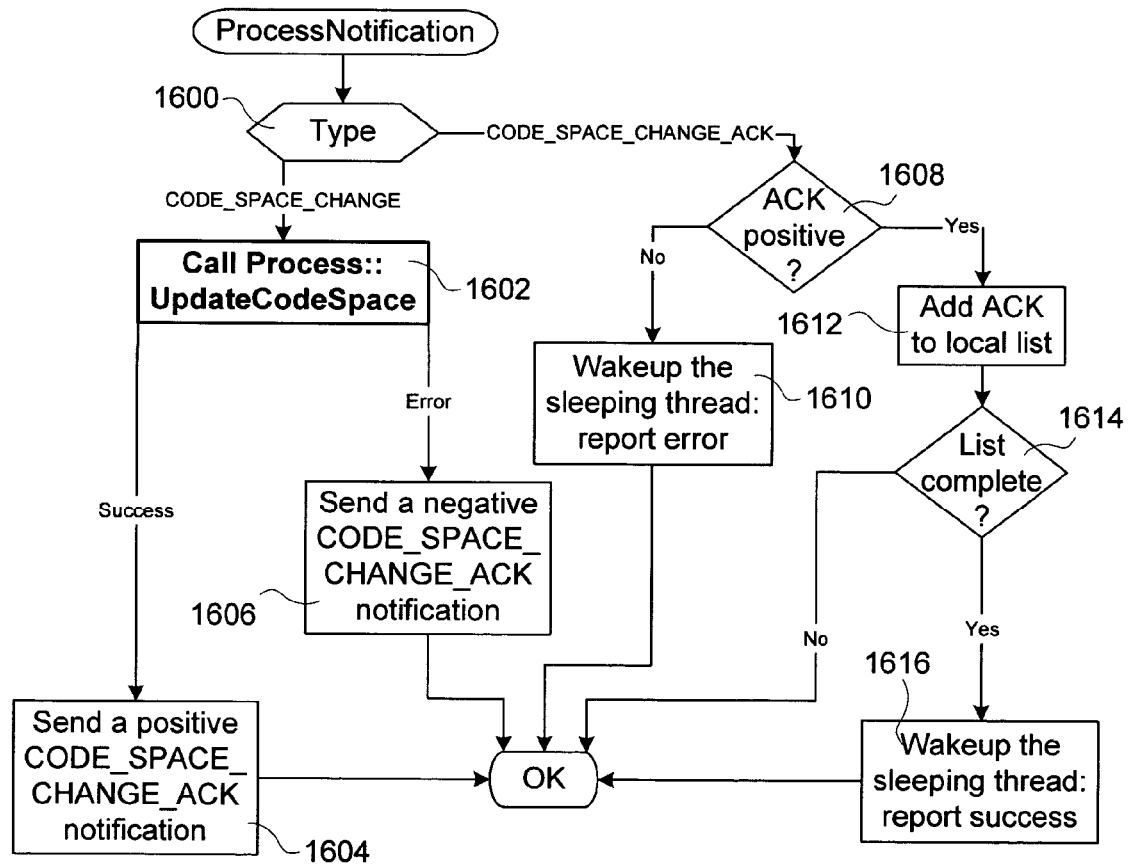
FIG. 38 is a flow chart illustrating principal steps involved in notification handling at the Process in accordance with an embodiment of the invention.

FIG. 38 is a flow chart illustrating principal steps involved in processing a notification at a Process object 182, if the notification is not one of those of the already illustrated NotificationReceiver object. In step 1600, a type of the received notification is determined. If the notification is of a CODE_SPACE_CHANGE type, the thread running the ProcessNotification method calls the UpdateCodeSpace method of the Process to direct the Process to locally effect the necessary LoadLibrary and FreeLibrary operations needed to bring the code space of the identified ProcessingUnit into agreement with that of the issuing Process object (step 1602). The issuing Process is the object of the distributed process at a remote member of the group where the LoadLibrary or FreeLibrary method has just been invoked.

If the UpdateCodeSpce method succeeds, the thread effects the sending of a CODE_SPACE_CHANGE_ACK notification of a positive status using the SendNotificationToOne method (step 1604). Otherwise the UpdateCodeSpce method fails, and the thread sends a negative CODE_SPACE_CHANGE_ACK notification in reply (step 1606).

If a CODE_SPACE_CHANGE_ACK type notification is received, it is determined in step 1608 whether the ACK is positive, or negative. If the ACK is negative, the thread wakes the sleeping thread, reporting an error (step 1610). If the ACK is positive, the ACK is added to the local list (step 1612), and it is determined (step 1614) whether the list is thereby completed. If the list is not complete, the processing of the notification returns success. Otherwise, in step 1616) the waiting thread (that is running the LoadLibrary or FreeLibrary method) is awoken with a report of success, and the method ends.

Remote Thread Operations

Figure 39:
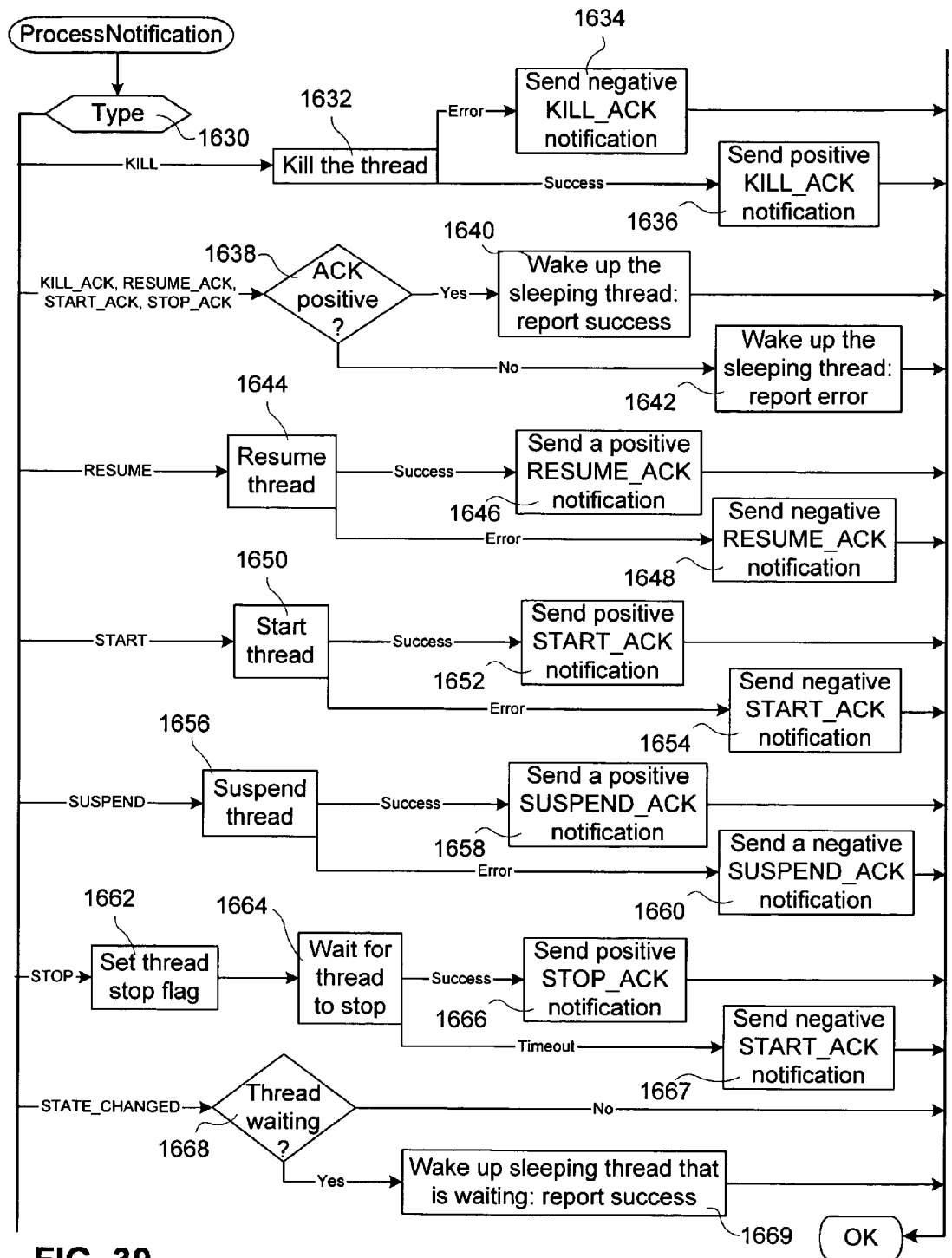
FIGS. 39-45 are flow charts illustrating principal steps involved in methods of the Thread object and processing Thread object notifications that permit remote management of Threads, in accordance with an embodiment of the invention.

FIG. 39 is a flow chart illustrating principal steps involved in processing a notification received at a Thread object 180. In step 1630, a type of the notification is determined. If the notification is of a KILL type, the Kill method is invoked to end the processing of the corresponding thread immediately (step 1632). If the Kill method does not successfully complete, in step 1634, the thread running the ProcessNotification returns a negative KILL_ACK notification. If the kill method is performed successfully, the thread advances to step 1636, at which point a positive KILL_ACK is returned.

If the notification is an ACK (i.e. a KILL_ACK, RESUME_ACK, START_ACK, or STOP_ACK), it is determined (step 1638) whether the ACK is positive or negative. If the ACK is positive, the corresponding waiting thread is awoken, and success is reported (step 1640), and if negative, the corresponding waiting thread is awoken to the report of an error (step 1642).

If the notification is of a RESUME, or a START, or a SUSPEND type, the thread (of the Thread addressed in the notification) was previously suspended, or not started, or running is resumed (step 1644), or started (step 1650), or suspended (step 1656) by using native OS thread management services. If the resume/start/suspend operation successfully completes a positive RESUME_ACK/START_ACK/SUSPEND_ACK notification is sent (step 1646/1652/1658), and if the resume/start/suspend operation fails, a negative RESUME_ACK/START_ACK/SUSPEND_ACK notification is sent (step 1654/1600/1668).

The Suspend and Resume methods are used for step-wise debugging user mode applications. The Start and Stop are used to begin and end the thread's execution of program instructions. The Stop permits the ending of a thread in a consistent manner. The thread will continue processing until a consistent state is achieved, and then ends the processing of the program instructions.

Upon receipt of a STOP notification, the ProcessNotification thread sets a thread stop flag (step 1662), and sets a timer for waiting for the thread to stop (step 1664). If the thread stops before the timer times out, a positive STOP_ACK notification is sent in reply to the stop (step 1666). Otherwise, the STOP_ACK notification is negative (step 1667).

The thread processing a STATE_CHANGED notification determines (step 1668) whether there is local thread executing a Wait method waiting for the thread (identified in the STATE_CHANGED notification) to complete. The STATE_CHANGED notification is an unacknowledged message that is multicast to the group by a Thread when the corresponding thread has completed the executable program instructions and has no Wait methods sleeping. If there are no threads waiting on the Thread that issued the STATE_CHANGED notification, the ProcessNotification completes successfully. Otherwise the Thread that is sleeping is awoken to a report of success (step 1669).

FIGS. 40-45 illustrate the analogous methods applied to kill, resume, stop or suspend a Thread that is running on a distant processor. It will be appreciated by those skilled in the art that providing distributed processes with means for controlling (stopping, starting, suspending and resuming) member Threads is desirable for avoiding bottlenecks in the control of Thread objects, and for expediting certain distributed operations.

In analogous steps 1670, 1680, 1690 and 1700, the (local copy of) user mode application program instructions performed by a thread at a first member of a group determines that a second thread of a ProcessingUnit of the Process needs to be killed, resumed, stopped or suspended, and consequently sends a corresponding notification by invoking the SendNotificationToOne method of the Thread associated with the second thread to send the notification of the required type. It will be noted that the second thread may be the thread itself, may be local to the thread, or may be remotely running on another processor node 30.

The thread then sets a timer and waits for corresponding ACKs (steps 1672,1682,1692,1702). If the thread just sent a KILL to itself, the ProcessNotification thread that handles the KILL_ACK will drop it. If the timeout of the timer wakes the thread, the thread applies timeout handling according to the method shown in FIG. 46, and returns to a corresponding step 1670, 1680, 1690 or 1700. If the thread is awoken to an error report, the method ends in failure, and if awoken to a report of success, the method ends successfully.

Figure 44:
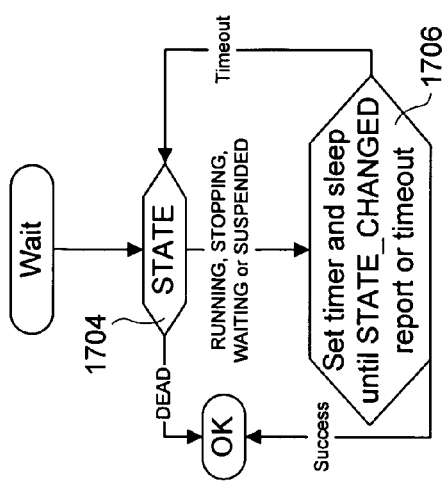

FIG. 44 illustrates principal steps involved in a thread locally executing the Wait method of the corresponding Thread objects. The Wait method is invoked to force the thread to wait until a second thread issues a STATE_CHANGED notification, the second thread being different from the first, but being of the same distributed process. In step 1704 a state of the Thread object representing the second thread is determined by inspection of the main shared memory pool 74 of the distributed process of the first thread. If the second thread is DEAD, the Wait completes successfully. Otherwise, in step 1706, the thread running the Wait method sets a timer and goes to sleep. If the thread running the Wait method awakes to a report of success, the Wait method is complete. Otherwise a timeout awakes the Wait thread, and the Wait thread returns to step 1704.

Figure 45:
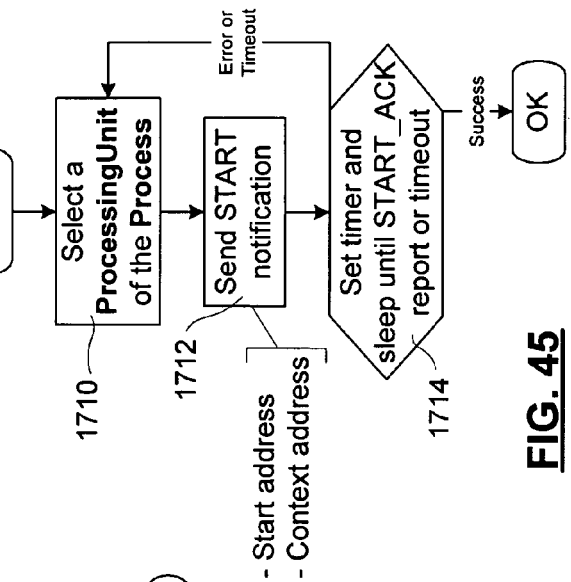
Figure 42:
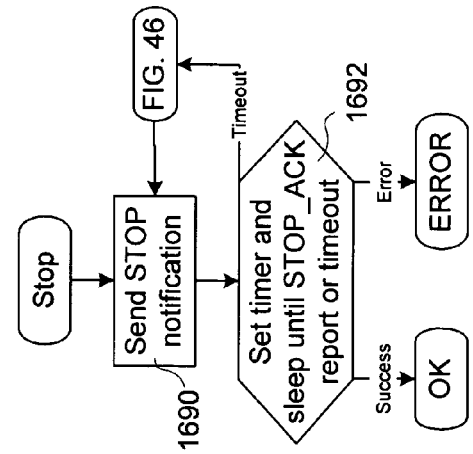
Figure 43:
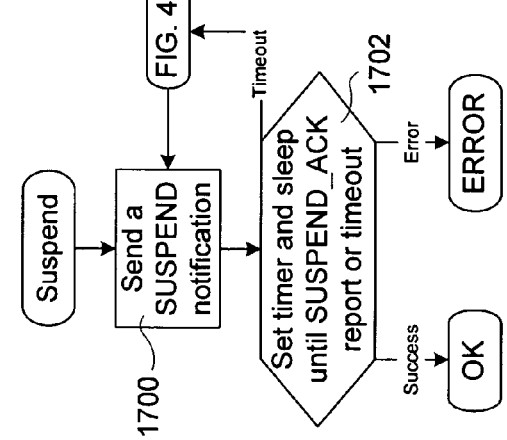
Figure 40:
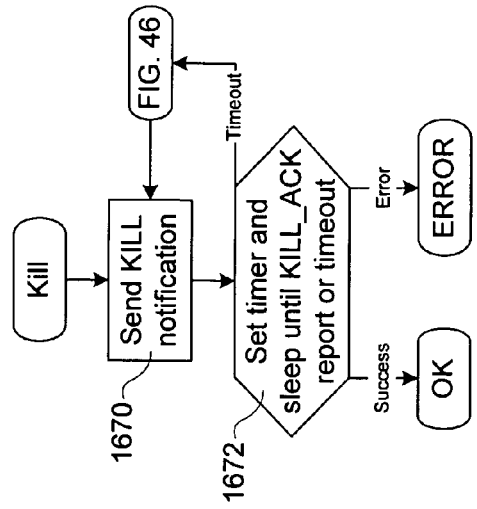
Figure 41:
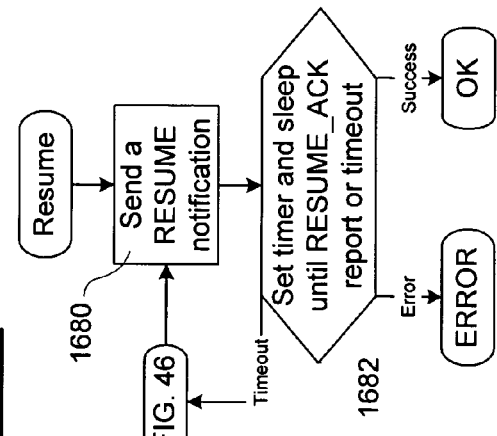

Principal steps involved in starting a thread remotely are illustrated in FIG. 45. The thread that is started already has a Thread object in the main shared memory pool 74 (defined by the CreateThread method of the distributed process), but is not running on any of the ProcessingUnits, and has no program instructions to execute. At the outset a start address of the code space at which the program instructions of the thread is defined, and context data which supplies arguments etc. necessary to effect the program instructions, is assembled.

To start a Thread, a first thread of a distributed process selects one of its ProcessingUnits (step 1710) to effect the thread. Typically a first ProcessingUnit (connected to the distributed process) that is not currently executing any methods is chosen. The first thread effects the sending of a START notification to the Thread at the selected ProcessingUnit (step 1712), by invoking the SendNotificationToOne method of the Thread object that is locally accessible through the main shared memory pool. The START notification includes start address of code space program instructions that the started thread will execute, and an address of the context in the code space of the ProcessingUnit 150. The thread running the Start method then sets a timer, and goes to sleep (step 1714). If receipt of a positive START_ACK is reported before the timeout, the Thread started successfully, and the method completes successfully. Otherwise a report of error, or a timeout wakes the first thread, and the first thread returns to step 1710.

FIG. 46 is a flow chart illustrating principal steps in timeout handling in accordance with the illustrated embodiment of the invention. In step 1720, a thread running one of the methods that involves waiting for a response from one or more members of the group increments a retry counter. It will be noted that prior to sending a first notification, the thread had zeroed this counter and, if the notification was multicast, also emptied a local list of ACKs. In step 1724, it is determined whether the retry counter has reached a maximum value. If the maximum value is not reached, it is determined whether the notification that timed out was a DEAD notification. If not, the thread returns to reissue the notification that timed out, and otherwise the thread advances to step 1730.

If the retry counter has reached its maximum value, the retry counter is zeroed and the local list of ACKs is cleared (step 1726). The thread then removes a ProcessingUnit from the pool member list that did not respond to the notification any of the times it was issued (step 1726). More precisely all members of the pool member list for which there is no ACK in the local list are determined to be dead and removed from the pool member list.

In order to indicate to the remaining members that the removed ProcessingUnit(s) is/are non-responsive, a DEAD notification is multicast (step 1730). The thread then sets a timer and goes to sleep (step 1732). Either all the remaining members of the group respond to the DEAD notification resulting in a success report, or the timer expires first. If the success report is received, the thread returns to retry the notification that had previously timed out the maximum number of times. The success report restores confidence in the pool member list.

If the thread awakes to a timeout the thread returns to step 1720, but if the retry counter is not maximum, in step 1724 the thread will return to step 1730 because the notification will be determined to be a DEAD notification, in step 1725. If a member of the group does not reply to any of the DEAD notifications, the thread reiterates the steps of removing the ProcessingUnit from the pool member list until there are no members of the pool member list that do not respond, as indicated in a success report of step 1732.

Aggregation

Figure 47:
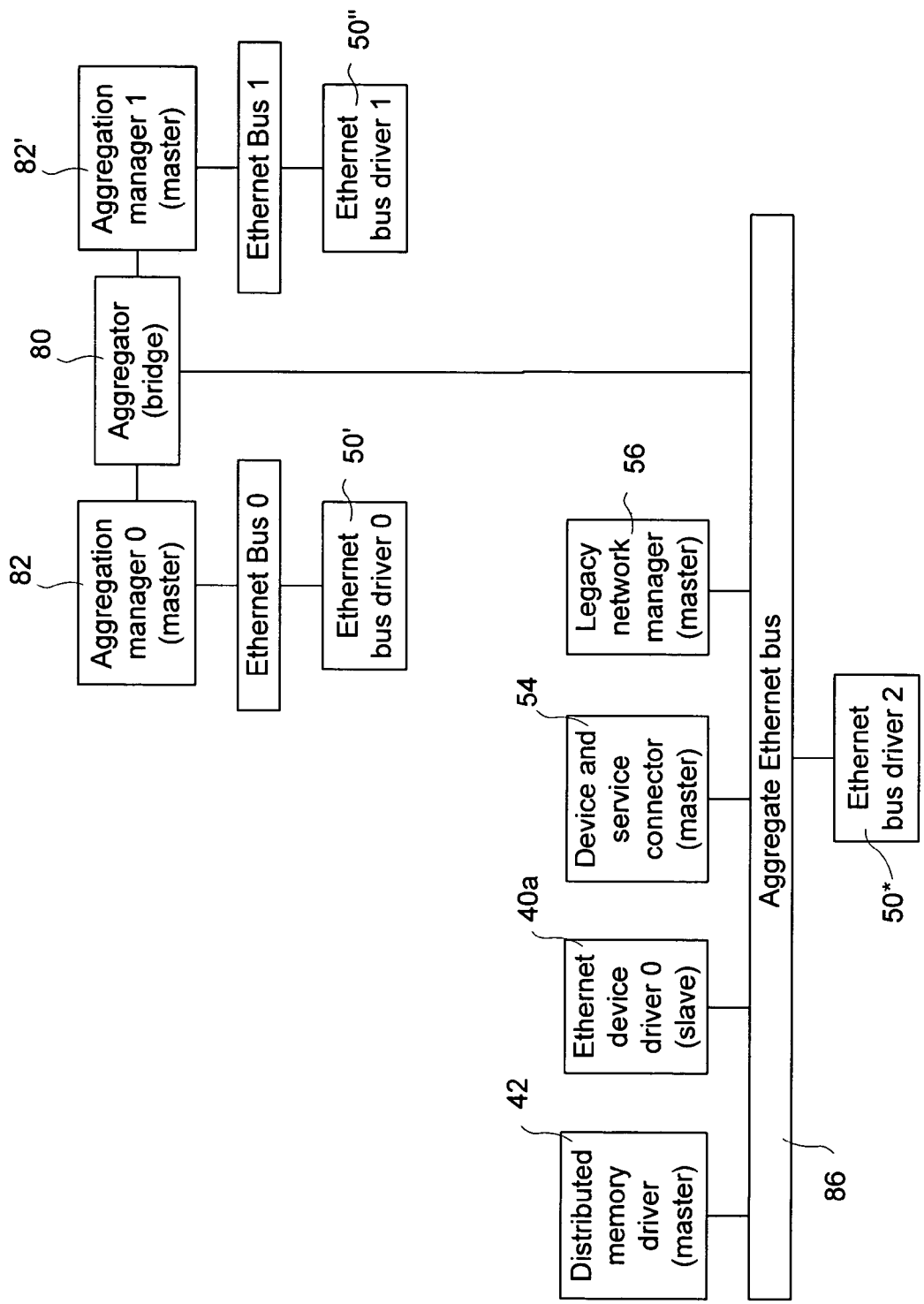
FIG. 47 is a block diagram illustrating principal software functional blocks involved in an embodiment of the invention where a plurality of Ethernet buses are aggregated to support a single Ethernet bus in accordance with an embodiment of the invention.

FIG. 47 is a block diagram illustrating principal functional blocks of an embodiment of the architecture of the invention when link aggregation is used. Link aggregation permits multiple network connections to be used as a single, higher bandwidth network bus, for example for load sharing, load balancing, and/or redundancy (to allow recovery from a device or link failure without human intervention). To accommodate link aggregation, an aggregator 80 and at least two aggregation managers 82 are provided. The aggregator 80 is a bridge type plug and play driver (with an IBridgeBaseDriver interface) for an aggregate Ethernet bus 86. Rather than acting as a network bus adapter 52, the aggregator 80 serves as an interface between the aggregate Ethernet bus 86, and all Ethernet buses (two shown in the illustration), permitting the exchange of packets between the aggregate Ethernet bus 86, with the other Ethernet buses. Each of the Ethernet buses includes a respective Ethernet bus adapter driver for coupling to a respective Ethernet card (not illustrated), and a respective Ethernet bus driver 50' and 50".

Each aggregation manager 82 (two shown) is a master type plug and play driver of a respective Ethernet bus, which subscribes to all packets, and passes all packets from the Ethernet bus to the aggregator 80. The aggregator 80 sends all of the packets from either of the Ethernet buses to the Ethernet bus driver 50*. In the opposite direction, the aggregator 80 selects the aggregation manager 82 to which the packet is directed. In this way the aggregate Ethernet bus 86 is provided with a bandwidth of the combined Ethernet buses which it accesses through the aggregation managers 82. The number of aggregation manager 82 instances to be created may be defined when the aggregator 80 is loaded.

Each aggregator manager 82 is a master plug and play driver of a respective Ethernet bus, and may or may not be the only plug and play driver (other than the adapter bus driver). Any other plug and play driver coupled to a respective one of the Ethernet buses is unable to exchange notifications over the other Ethernet buses.

In accordance with the present embodiment, the aggregator 80 and aggregation manager(s) 82 may conform to the Institute of Electrical and Electronics Engineers (IEEE) standard 802.3-2002, or a later version, for example. The settings defined by IEEE Standard 802.3-2002 may all be supported by including respective functionality in the aggregator, aggregation manager, and/or Ethernet bus driver (including a system priority, the system MAC address, the maximum number of aggregator addresses, the aggregator identifier and aggregator operational key settings. The aggregator manager 82 preferably has settings to manage the ports (priority and port number) and the port operational keys.

More specifically, the aggregator 80 accepts connection from an aggregation manager 82, and is responsible for:
controlling aggregation of inbound packets;
forwarding packets received from all Ethernet buses to the aggregated bus' Ethernet bus driver 50*; and
selecting an Ethernet bus for transmitting outbound packets;

in accordance with the identified IEEE standard. The aggregator 80 further provides the sending and receiving packet functionalities to the connected aggregation manager 82.

The aggregator 80 has a setting (registered by the OS in a manner well known in the art) indicating the number of aggregator instances to create at load time.

The aggregation manager 82 passes all packets from the Ethernet bus to the aggregator and from the aggregator to the respective Ethernet Bus.

Using the same architecture for the Ethernet buses over each of the NICs has numerous advantages. First, it is efficient to reuse the Ethernet bus driver and avoid creating new drivers. Second, the aggregation managers 82 get access to respective plug and play functionality so that the aggregation managers can be instantiated and deleted as required. Effectively each Ethernet bus driver performs the same tasks regardless of whether it effects an aggregate Ethernet bus, or one of the other Ethernet buses. Further still using prior art methods for aggregation, which involve providing adapter drivers for each of the NICs, and an aggregator directly coupled to the adapter drivers, a respective aggregation manager must be developed for each NIC type. By recycling the services of the Ethernet bus driver the aggregation managers remain at arms length from the adapter drivers, and the same Ethernet bus driver, and same aggregation managers can be used.

Multi-Bus Bridges

The network bus driver 50 may define a number of instances of the network bus 10 to permit different plug and play devices to communicate with the hardware devices 20 of the data network using separate encryption schemes, for example, or to otherwise partition the plug and play devices of the processor node 30. If so the network bus driver 50 has settings to define the number of network buses 10 to instantiate at load time. Each network bus 10 is logically independent and may use the same bus adapter driver 52 and NIC 18, or each may use different respective bus adapter drivers 52 and corresponding NICs 18.

The bus adapter driver 52 is connected to zero, one or more software abstractions of network buses 10. If a bus adapter driver 52 is connected to two (or more) software abstractions of the network bus 10, then effectively there are two (or more) network bus drivers 50 (or instances thereof), each associated with a respective, disjoint set of the plug and play drivers. In such an embodiment the NIC 18 is adapted to publish two (or more) MAC addresses, and associates one MAC address with each of the network buses. Messages received over the data network 12 are directed to the network bus driver 50 instance of the correct network bus 10 according to the destination MAC address.

In such an embodiment, the distributed memory manager 65 stores a setting that indicates how many instances of the distributed memory service 66 to start: one service instance is created per Ethernet bus. The distributed memory manager 65 maintains instance settings as needed to keep separate the respective Ethernet buses.

Two Ethernet buses can alternatively be interconnected using a bus-to-bus bridge. Depending on a topology of the network subtending the network bus, a bridge between two Ethernet buses may be needed. Further bus-to-bus bridges 90,90' may be useful when it is desired to control the exchange of data, and the use of resources, between different interests (e.g. companies, network service providers etc.). The bus-to-bus bridge provides an effective firewall between two buses 12.

Figure 48:
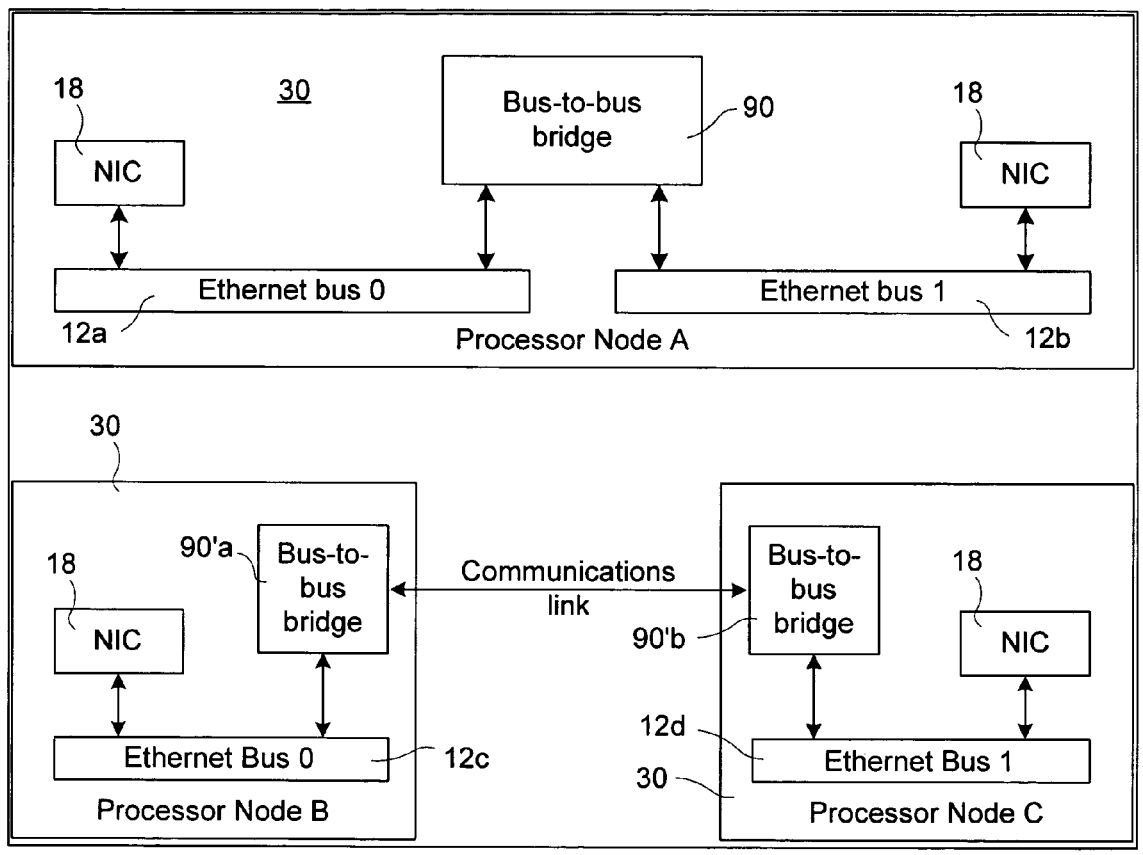
FIG. 48 is a block diagram illustrating principal hardware functional blocks involved in an embodiment of the invention using a bus-to-bus bridges for controlling exchange of packets between two Ethernet buses.

Bus-to-bus bridges 90,90' work similarly to PCI to PCI bridges known in the art, and offer similar capabilities. FIG. 48 is a block diagram of a hardware view of two possible configurations of bus-to-bus bridges 90 and 90' respectively.

The first bus-to-bus bridge 90 is effected within Processor Node A, which accesses two (or more) physical Ethernets 12a,b, via respective Ethernet NICs 18. Typically the Ethernet NICs 18 are part of respective subnets, in a manner known in the art.

The second illustrated configuration includes Processor Nodes B and C which connect two possibly remote Ethernet Buses 12c and 12d, and passes packets using a communication link such as Ethernet links, Internet tunneling protocols (including virtual private networks (VPNs)), ISDN telephone connections, or any other communications means including firewire, USB, Hotlink, optical fiber channel, SONET, etc.

Each bus-to-bus bridge 90'a and 90'b is independently configured, so that management of each Ethernet bus 12c,d can independently provide the other Ethernet bus 12c and 12d with permission to access respective Ethernet devices. This is effected by providing permissions that control passage of notifications between plug and play drivers of the respective Ethernet buses 12a and 12b. In addition, permissions can be defined to allow only a subset of Ethernet device capabilities to be accessible through the bridge. To avoid address and identifier conflicts, the bus may need to translate addresses and identifiers when relaying Ethernet device packets. This configuration procedure also helps to ensure secure connections between distinct Ethernet buses.

The bus to bus bridge 90 can be implemented as a software device gateway 44, either as a service on top of the device and service connector 54 or directly as a plug and play software device gateway driver as described above. This implementation decision may depend on the required performance and communication link constraints. Higher performance can be achieved using a kernel mode plug and play software Ethernet device gateway. Regardless of to the implementation, the network bus driver 50 sees the bridge as a master entity.

Encryption

If required, the implementation can employ cryptographic algorithms to ensure secure communications between the driver and device.

In accordance with some embodiments of the invention, the network bus driver 50 implements a lowest level of security management. This level may use a symmetric cryptographic algorithm and a shared secret key to encrypt all sent packets, for example, in which case the shared secret key is known by all hardware devices 20. As is well known in the art a symmetric cryptographic system applies the same algorithm for encrypting and decrypting data. Typically encryption involves applying a known algorithm using a set of parameters (a key) that specifies the algorithm. The key can be shared in any convenient manner.

In accordance with some embodiments of the invention, the distributed memory manager 65 implements a second level of security. Using a known private key cryptographic system, a secret key is shared between all processing units of the same distributed memory pool. In some embodiments, the secret key is used with a symmetric cryptographic algorithm to both encrypt and decrypt all object notifications sent over the network. When a new processing unit joins a shared memory pool, it receives the pool's secret key from the global part of the corresponding ProcessingUnit in the CONNECT notification, as described above in relation to FIG. 34. The keys may be exchanged using the global shared memory space 74. Alternatively, an asymmetric cryptographic algorithm can be used to exchange secret keys without making them available to other processing units.

The secret key of the user mode and kernel mode systems shared memory pool cannot be exchanged using the global distributed memory space, as the keys are required to encrypt messages used to initially distribute these objects. Accordingly, this secret key may be manually configured or distributed using another secure protocol.

EXAMPLES OF OS IMPLEMENTATIONS

Implementation of the Ethernet bus driver is architecturally different for different operating systems (OSs) due to the different services available from, and structural features of, each OS. A description of the Ethernet bus driver implementation in Windows XP (Windows®) will be presented first, followed by a description of the differences between the Windows and a Linux® implementation.

Windows Implementation

Figure 49:
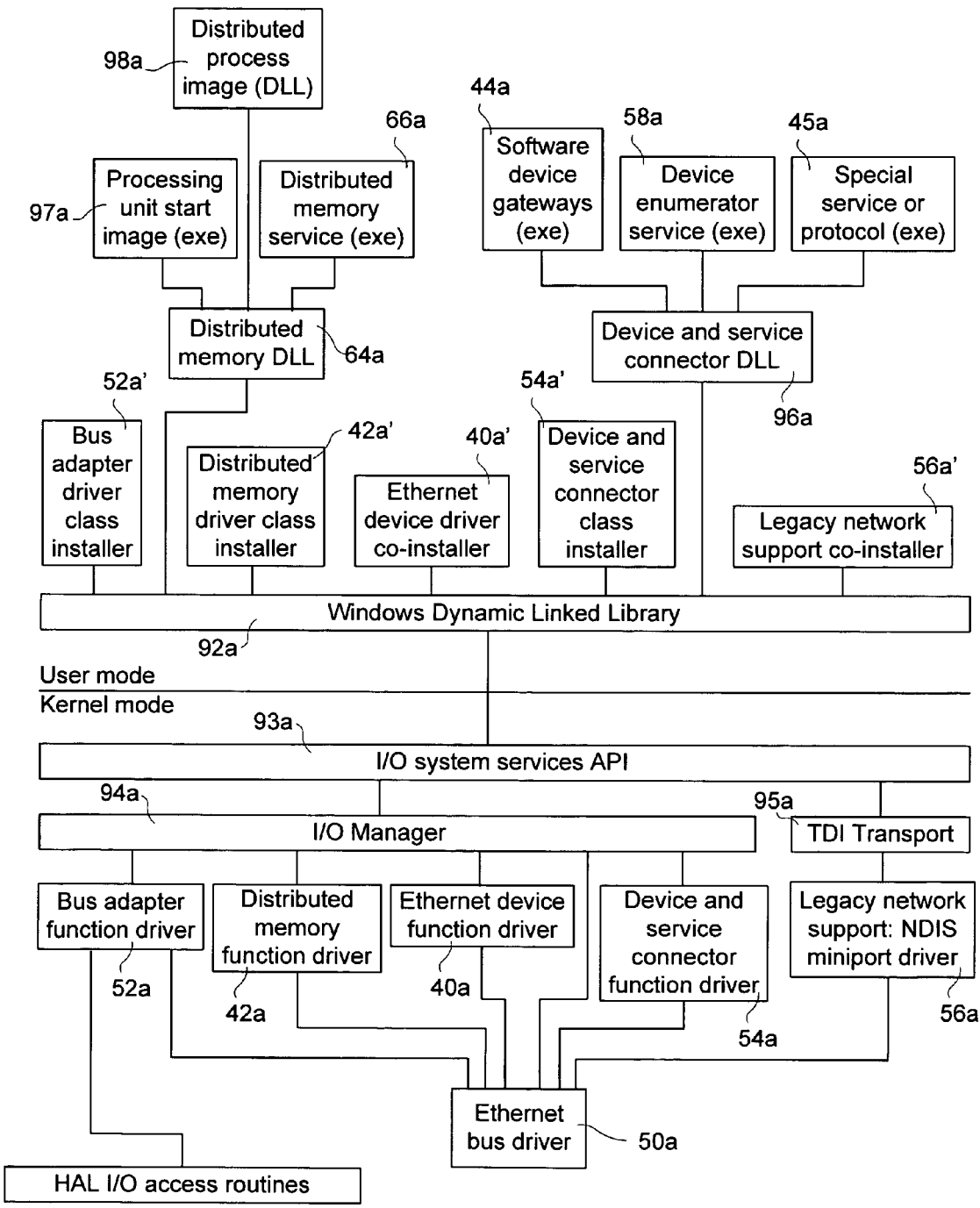
FIG. 49 is a block diagram illustrating principal functional software blocks involved in a Windows implementation of the software architecture.

In the Windows implementation schematically illustrated in FIG. 49, the Ethernet bus driver 50a runs in kernel mode, providing plug and play drivers with access to the remote hardware Ethernet devices through the legacy bus adapter driver, which is embodied as a Windows plug and play functionality driver 52a. The bus adapter function driver 52a communicates with the NIC 18 using hardware abstraction layer (HAL) I/O access routines known in the art.

In some embodiments the bus adapter function driver 52a is a commercially available NIC driver that provides hardware abstraction for the NIC in a well known manner, configured and operating in a known manner except that it is not registered with the operating system on start up, but rather is adapted to connect to the Ethernet bus driver 50a. In operation, the bus adapter driver 52a passes Ethernet packets from the Ethernet network to the Ethernet bus driver 50a, and vice versa. The bus adapter driver publishes a Windows driver model (WDM) driver interface. An application or class installer can connect to it for viewing and editing settings of the NIC 18.

The plug and play drivers include an Ethernet device function driver 40a for each of the Ethernet devices of the Ethernet bus, a device and service connector function driver 54a, a distributed memory function driver 42a, and a legacy network support Network Driver Interface Specification (NDIS) miniport driver 56a. Each plug and play driver handles protocol processing and Ethernet-specific operations, and takes care of Ethernet negotiations etc. so that the overlying software layers are not required to monitor such operations.

Each Ethernet device function driver 40a controls a respective Ethernet device. Many Ethernet device function drivers 40a can be connected on the top of the same Ethernet bus driver 50a. The respective interfaces Ethernet device function drivers provide, and how it is provided depends on the device type (printer, network attached storage, camera or other). Accordingly only the protocol processing required for controlling the respective Ethernet device is used saving considerable CPU usage used for protocol processing in accordance with the prior art.

The Windows DLL 92, accesses the kernel mode Ethernet bus driver and the plug and play drivers through an I/O system services application programming interface (API) 93 and a Windows input/output (I/O) manager 94, both of which being well known in the art. Direct access between the I/O manager and the Ethernet bus driver is also provided so that the plug and play functionality that is provided in the kernel mode by the Windows can communicate with the Ethernet bus driver 50a to effect the instantiation or deletion of plug and play device drivers, as required.

Access to the Ethernet bus driver is also provided via a Network Driver Interface Specification (NDIS)-compatible miniport driver that provides legacy network support through the Transport Driver Interface (TDI) 95 of the Windows XP OS. The Windows plug and play (Plug and play) subsystem loads legacy network support at boot time, as is well known in the art.

The Windows DLL files are called by user mode applications, and are executed in the user mode. Each of the plug and play drivers is associated with respective class installer/co-installer DLL files. Specifically, a bus adapter class installer 52a', a distributed memory driver class installer 42a', an Ethernet device driver co-installer 40a' (for each Ethernet hardware device 20), a device and service connector class installer, and a legacy network support co-installer 56a' are provided in the user mode for changing settings of the corresponding driver, in a manner well known in the art. The class installers may represent multiple objects instantiated at different times, but are only registered once, when the first instance is encountered. The co-installers are launched with the corresponding plug and play device installer. The class installers and co-installers provide an interface for setting parameters for the respective plug and play drivers.

The distributed memory function driver 42a channels memory requests and access from the plug and play drivers to a distributed memory DLL 64a, which in turn passes the requests to a distributed memory service executable 66a, and further permits the exchange of notifications between the distributed memory manager's system level objects (Threads, ProcessingUnits, Processes, Pools, etc.) through the Ethernet bus. The distributed memory manager 65 provides services to enable access to distributed memory across the Ethernet bus, as well as DLL files and executables to manage distributed processes. The distributed memory function driver 42a also handles user mode memory access requests received through the distributed memory library 64a.

The distributed memory function driver 42a is configured to keep a part of the OS's main memory at boot time. It uses these physical pages to store the distributed memory pages used by the local processing units. It works with the Windows memory manager to configure a processor memory management unit.

The distributed memory function driver 42a is implemented as a plug and play Windows Driver Model (WDM) function driver and is loaded over a PDO (the Windows embodiment of a base driver) created by the Ethernet bus driver 50a at load time. The distributed memory function driver 42a publishes a numbered symbolic name. The distributed memory service, ProcessingUnits, and Processes can connect to the distributed memory function driver 42a to access its functionalities, using the numbered symbolic name, and interfaces through the distributed memory library 64a (the current embodiment of the DriverInterface 128).

A device and service connector DLL 95 provides a method for user mode software Ethernet device gateway executables 44a and other special services or protocol executables 45a to access the Ethernet bus driver 50a, permitting the software devices and special services to be implemented as normal applications (i.e. as Windows services) that use to the Ethernet bus. Using the device and service connector DLL 95, applications and services can be built to take advantage of the Ethernet bus without any knowledge of the details of the I/O system services API 93 and other internal OS functions. Examples of such applications include imaging applications, remote storage, and networking protocols. The device and service connector DLL 95 provides the ability to connect new software services to the Ethernet bus driver 50a without having to provide corresponding plug and play drivers, making the service or protocol less costly to support.

Table 1 shows how the device and service connector function driver handles the minor I/O request packets (IRPs) in relation to plug and play management.

TABLE 1

Device and Services Connector FDO functions

| Minor IRPs | Comment |
|---|---|
| CANCEL_REMOVE_DEVICE | Indicate success and pass request to PDO. |
| CANCEL_STOP_DEVICE | |
| DEVICE_USAGE_NOTIFICATION | Not currently supported |
| EJECT | Ignore the request and pass it to PDO. |
| FILTER_RESOURCE_REQUIREMENTS | Not currently supported |
| QUERY_BUS_INFORMATION | |
| QUERY_CAPABILITIES | Ignore the request and pass it to PDO. |
| QUERY_DEVICE_RELATIONS | Support: Removal Relations |
| QUERY_DEVICE_TEXT | Not currently supported |
| QUERY_ID | |
| QUERY_INTERFACE | |
| QUERY_LEGACY_BUS_INFORMATION | |
| QUERY_PLUG AND PLAY_DEVICE_STATE | Ignore the request and pass it to PDO. |
| QUERY_REMOVE_DEVICE | Fail if an application is connected or if an enumeration is in progress. |
| QUERY_RESOURCE_REQUIREMENTS | Not currently supported |
| QUERY_RESOURCE | |
| QUERY_STOP_DEVICE | Fail if an application is connected or if an enumeration is in progress. |
| READ_CONFIG | Not currently supported |
| REMOVE_DEVICE | Always succeed. Delete the FDO. |
| SET_LOCK | Not currently supported |
| START_DEVICE | Supported |
| STOP_DEVICE | Always succeed |
| SURPRISE_REMOVAL | Not currently supported |
| WRITE_CONFIG | |
| IRP_MN_ | Comments |
| POWER_SEQUENCE | Ignore the request and pass it to PDO. |
| QUERY_POWER | |
| SET_POWER | |
| WAIT_WAKE | |

The device enumerator service 58a uses the device and service connector DLL 95 to access the Ethernet bus driver 50a. The device enumerator service 58a is provided as a Windows service, that is loaded by Windows at boot time.

The Ethernet bus driver 50a is implemented as a non plug and play WDM driver. When the device enumerator service 58a detects a new Ethernet hardware device 20 (using the enumeration method described above, for example), it notifies the Ethernet bus driver 50a of the addition. Afterwards, the Ethernet bus driver 50a creates an associated Physical Device Object (PDO) for the hardware device 20, and notifies the Windows plug and play (Plug and play) subsystem. The PDO implements an Ethernet bus driver-programming interface.

The Ethernet bus driver 50a plays two Windows roles. First it is the function driver of the software bus abstraction. Table 2 shows the minor I/O request packets (IRPs) it processes and how it processes them when acting as function driver. The Ethernet bus driver 50a also acts as the Physical Device Object (PDO) on top of which the Ethernet device function drivers 40a connect. When acting as PDO, the driver processes Plug and play requests as presented in Table 3.

TABLE 2

Ethernet bus driver FDO functions

| Minor IRPs | Comment |
|---|---|
| CANCEL_REMOVE_DEVICE | Indicate success and pass request to PDO. |
| CANCEL_STOP_DEVICE | Indicate success and pass request to PDO. |
| DEVICE_USAGE_NOTIFICATION | Not currently supported |
| EJECT | |
| FILTER_RESOURCE_REQUIREMENTS | |
| QUERY_BUS_INFORMATION | |
| QUERY_CAPABILITIES | Add the following capabilities before passing it down: Remove the following capabilities after the lower device completes the request: DeviceD1 DeviceD2 Device D3 LockSupported EjectSupported Removable DockDevice RawDeviceOK SurpriseRemovalOK WarmEjectSupported WakeFromD0 WakeFromD1 WakeFromD2 WakeFromD3 DeviceState array items are all set to D0 |
| QUERY_DEVICE_RELATIONS | Support: BusRelations Pass to lower driver: EjectionRelations RemovalRelations |
| QUERY_DEVICE_TEXT | Not currently supported |
| QUERY_ID | |
| QUERY_INTERFACE | |
| QUERY_LEGACY_BUS_INFORMATION | |
| QUERY_PLUG AND PLAY_DEVICE_STATE | Supported |
| QUERY_REMOVE_DEVICE | Failed if one or more devices are connected. |
| QUERY_RESOURCE_REQUIREMENTS | Not currently supported |
| QUERY_RESOURCE | |
| QUERY_STOP_DEVICE | Failed if one or more devices are connected |
| READ_CONFIG | Not currently supported |
| REMOVE_DEVICE | Always succeed. Delete the FDO. |
| SET_LOCK | Not currently supported |
| START_DEVICE | Supported |
| STOP_DEVICE | Always succeed |
| SURPRISE_REMOVAL | Not currently supported |
| WRITE_CONFIG | |
| POWER_SEQUENCE | Not currently supported |
| QUERY_POWER | Always accepted |
| SET_POWER | Always succeed |
| WAIT_WAKE | Not currently supported |

It will be noted that the function driver object (FDO) handling of the minor IRP types defined by Windows is specified in Table 2 above.

It should also be noted that the Table 3 shows the Ethernet bus driver's handling of the minor IRPs in relation to its role as the primary PDO.

TABLE 3

Ethernet bus driver PDO functions

| Minor IRPs | Comment |
|---|---|
| CANCEL_REMOVE_DEVICE | Complete the request indicating a success. |
| CANCEL_STOP_DEVICE | Complete the request indicating a success. |
| DEVICE_USAGE_NOTIFICATION | Not currently supported |
| EJECT | Complete the request indicating a success. |
| FILTER_RESOURCE_REQUIREMENTS | Not currently supported |
| QUERY_BUS_INFORMATION | Complete the request indicating a success. The following information are returned: the GUID associated with the Ethernet bus; the INTERFACE TYPE of the Ethernet bus controller; the Ethernet bus number; |
| QUERY_CAPABILITIES | Add the following capabilities: EjectSupported Removable UniqueID SurpriseRemovalOK WarmEjectSupported Remove the following capabilities: DeviceD1 DeviceD2 LockSupported DockDevice RawDeviceOK WakeFromD0 WakeFromD1 WakeFromD2 WakeFromD3 DeviceState array items are all set to D0 |
| QUERY_DEVICE_RELATIONS | Support: EjectionRelations RemovalRelations TargetDeviceRelation |
| QUERY_DEVICE_TEXT | Supported |
| QUERY_ID | Supported. The device ID is built from data received from Ethernet Device at enumeration. The instance ID is built with the Ethernet address and the sub device ID. A special Ethernet Device is used for a driver not associated with a hardware device. |
| QUERY_INTERFACE | Not currently supported |
| QUERY_LEGACY_BUS_INFORMATION | |
| QUERY_PLUG AND PLAY_DEVICE_STATE | Supported. The following bits are never set: PLUG AND PLAY_DEVICE_DISABLED PLUG AND PLAY_DEVICE_DONT_DISPLAY_IN_UI PLUG AND PLAY_DEVICE_RESOURCE REQUIREMENTS_CHANGED |
| QUERY_REMOVE_DEVICE | Always succeed |
| QUERY_RESOURCE_REQUIREMENTS | Complete the request without changing IRP. |
| QUERY_RESOURCES | Complete the request without changing IRP. |
| QUERY_STOP_DEVICE | Always succeed |
| READ_CONFIG | Not currently supported |
| REMOVE_DEVICE | Always succeed. Delete the PDO. |
| SET_LOCK | Not currently supported |
| START_DEVICE | Always succeed |
| STOP_DEVICE | |
| SURPRISE_REMOVAL | |
| WRITE_CONFIG | Not currently supported |

TABLE 3-continued

Ethernet bus driver PDO functions

| Minor IRPs | Comment |
|---|---|
| POWER_SEQUENCE | Not currently supported. |
| QUERY_POWER | Accept all changes in system power state. Refuse all changes in device power state. |
| SET_POWER | Always succeed |
| WAIT_WAKE | Not currently supported |

The Ethernet bus driver 50a publishes a numbered symbolic name. An application or a class installer can connect to the Ethernet bus driver 50a using the numbered symbolic name for viewing and editing settings, to prompt Windows to load a plug and play driver, or to retrieve information about loaded plug and play drivers.

The processing unit is embodied as a start image executable file 97. When it is invoked without arguments it becomes an IDLE ProcessingUnit, and accordingly is an item in the ListHead. The programmer can also execute it with the name of a DLL file, in which case, the native process becomes a RUNNING ProcessingUnit. In accordance with the current implementation, a part of the distributed memory manager's functions are provided in the start image executable 97, these functions include:
  connecting to the shared memory space (and optionally specifying dimensions);
  maintaining the ProcessingUnit state;
  processing connection requests; and
  catching page faults and passing them to the native OS using the Windows structured exception, in a manner well known in the art.

All functions of the distributed process are provided by files in a DLL. The DLL complies with the interface defined by the ProcessingUnit start image.

The distributed process can access all system resources, including those that are native to the processor node. The user mode application programmer must maintain a distinction between shared resources (those which can be invoked from any processor node) and the native resources which are only available at a respective processor node 30. If a distributed process connects to a native device driver, the connection cannot be "shared". Connections to Ethernet device drivers and software device gateways are inherently sharable.

A distributed process creates the main process memory pool 74 immediately before the Process object is instantiated for the distributed process. A distributed memory DLL file 95 invoked to create the main process memory pool 74 provides links to distributed process image DLL functions for connecting to the main process memory pool, and for managing it. If needed, the distributed process can create the additional shared memory pools 75 that can be created or taken down depending on program instructions of the user mode application. The main memory pool, however remains until the end of the distributed process's execution. The creation of the additional shared memory pools 75 permits the sharing of data between different distributed processes. Furthermore the ability to create and take down the additional memory pools as needed reduces network communication loads, physical memory utilization, and virtual address space utilization.

If aggregation is used in the Windows XP implementation, the aggregator 80 is implemented as a non-plug and play WDM function driver that publishes a numbered symbolic name. The symbolic name is created using the aggregator's operational key. The aggregation managers 82 use this numbered symbolic name to connect to the aggregator 80. Applications or class installers can also connect to the aggregator 80 using the symbolic name for viewing and editing settings and retrieving status and statistical information. The aggregation manager 82 is implemented as a plug and play WDM function driver, and has a numbered symbolic name as well. Application or class installers can use this interface for viewing and editing settings, and retrieving status and statistics. Preferably the Ethernet bus drivers 50a loads the respective aggregator manager instances on startup.

The aggregator managers configured using the same "aggregator operational key" use this symbolic name to directly connect to the aggregator (or instance thereof).

LINUX

Figure 50:
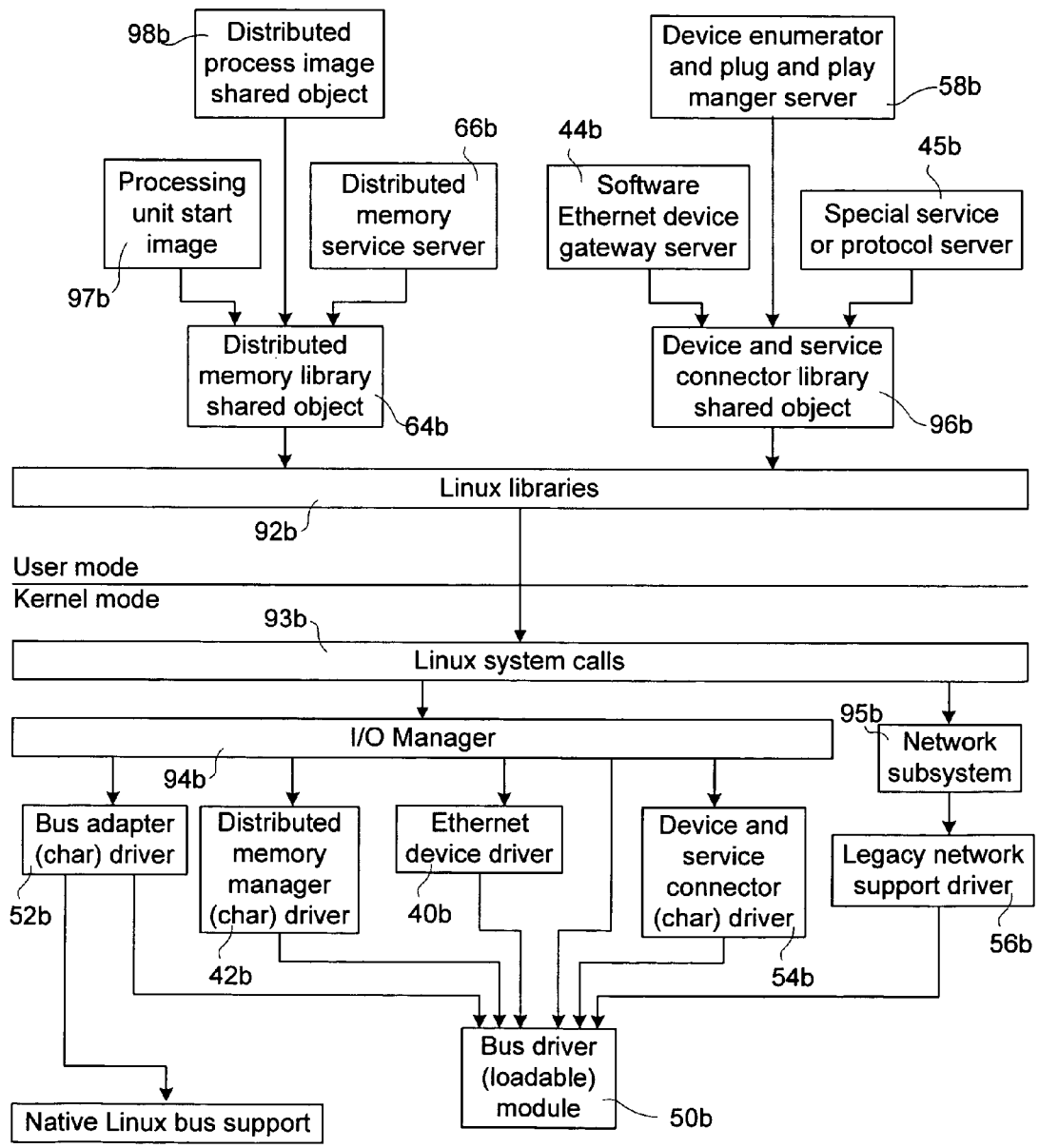
FIG. 50 is a block diagram illustrating principal functional software blocks involved in a Linux implementation of the software architecture.

Having described the operation of the Windows implementation, a comparison with the LINUX implementation is set out below. While Windows natively supports the layered architecture presented in FIG. 49, operating systems such as Linux that do not support layered drivers require a modified architecture. An architecture for these operating systems is presented in FIG. 50. It will be noted that blocks of software functionality shown with corresponding reference numerals suffixed with 'b' rather than 'a' as, in FIG. 49, correspond and their descriptions are not necessarily repeated.

In Linux, the Ethernet bus driver 50b does not manage plug and play, it only provides entities with a way to communicate locally and network wide. All plug and play related tasks and settings are moved to the device enumerator and plug and play manager server 58b.

The bus adapter driver 52b is responsible for controlling the NIC 18, and relaying Ethernet packets between the NIC 18 and the Ethernet bus driver 50b. The bus adapter driver 52b is implemented as a character (char) Linux driver, rather than a network driver. It directly connects to the Ethernet bus driver 50b using the symbolic name exported by the Ethernet bus driver.

The device and service connector is also implemented as a Linux char driver. It provides similar interfaces as that of the Windows implementation.

The device enumerator and plug and play manager server 58b is responsible for enumerating devices and for loading needed loadable modules when devices are detected or when requested by configuration information. The Linux server provides plug and play support that facilitates changes to the connected members of the Ethernet bus.

Legacy network support is implemented as a Linux network driver. It connects directly to the Ethernet bus driver, whereas in the prior art, it connected to the native Linux bus support directly for effecting the control over the NIC.

Because the Linux kernel permits loadable modules to interact with the memory manager, the Linux implementation of the distributed memory driver 42b handles more tasks than the Windows distributed memory driver 42a. In particular, the distributed memory driver 42b is responsible for catching and processing page faults.

Ethernet device drivers 40b are implemented as char drivers or block drivers, depending on a device type of the corresponding Ethernet device. The device enumerator and plug and play manager server 58b always loads the Ethernet device drivers 40b in the Linux implementation.

As shown in the illustrated embodiment, software Ethernet device gateway servers 44b are implemented as Linux servers that connect to a top of the device and service connector char driver 54b using device and service connector library shared object 95b, although in other embodiments software Ethernet device gateway servers may be implemented as a plug and play driver using kernel mode program instructions.

As with Windows, all of the, processing units begin by loading a start image executable file 97*b*. The main difference is that the implementation does not rely on Windows structured exceptions to catch page faults, which are effected by the distributed memory char driver 42*a*.

The invention has therefore been described in relation to a method and system for effecting a network bus over a data network in order to selectively use OS functionality of processor nodes for managing hardware devices of the data network. The invention has further provided a distributed processing system that provides for the sharing of network resources among the processor nodes.

The embodiment(s) of the invention described above is(are) intended to be exemplary only. The scope of the invention is therefore intended to be limited solely by the scope of the appended claims.

We claim:

1. A method for defining a network bus between a plurality of hardware devices connected to each other over a data network by network interface circuitry (NIC) without the need for network stack processing, at least one of said plurality of hardware devices being a processor node having processing capability, the method comprising:

providing, on each processor node, a network bus driver, a bus adapter driver and a NIC, said network bus driver configured to control exchange of network messages by accessing said NIC through said bus adapter driver, said bus adapter driver controlling said NIC;

registering on each processor node, an NIC driver for each of said plurality of hardware devices to permit said network bus driver on that processor node to effect communications with respective NICs for said hardware devices via said data network;

providing, on each processor node, a device driver for each of said plurality of hardware devices for controlling respective hardware devices through said network bus driver; and creating on each processor node, a software abstraction layer of the network bus for communicating between said plurality of hardware devices by registering said bus adapter driver with said network bus driver instead of an operating system (OS) on said processor node as a network provider thus bypassing network stack processing, and having said bus adapter driver forward received messages to said network bus driver;

wherein said software abstraction layer permits said plurality of hardware devices to be seen as physical resources available to each processor node and configures said hardware devices to communicate as if over a bus to share resources at a network bus level removing need for said network stack processing.

2. The method as claimed in claim 1 wherein providing the network bus driver further comprises installing the NIC driver, which consists of kernel program instructions for controlling the NIC.

3. The method as claimed in claim 1 wherein providing the device drivers comprises:

instantiating drivers for base driver objects that may be added to or removed from the network while the respective processor node remains connected to the data network;

providing a device monitoring function that uses network messaging to detect the connection and disconnection of the hardware devices from the data network; and providing a plug and play functionality for adding and deleting device driver instances in response to the connection and disconnection of the hardware devices.

4. The method as claimed in claim 3 wherein providing the device monitoring function comprises:

providing a device enumerator registered to receive all unaddressed network messages from the network bus driver, the device enumerator being adapted to broadcast a message requesting all hardware devices to reply with an auto-identification message, and declaring a new hardware device to the plug and play functionality upon receipt of an auto-identification message from a hardware device that is not already enumerated; and providing a timeout mechanism for each of the enumerated hardware devices.

5. The method as claimed in claim 4 wherein providing a device enumerator further comprises providing the respective processor node with kernel mode device enumerator program instructions.

6. The method as claimed in claim 3 further comprising:

providing a respective processor node with a kernel mode device driver defining a device and service connector in communication with the network bus driver; and publishing a user mode access interface for each device and service connector for permitting user mode software to access the network bus driver through the device and service connector, the user mode access interface defining a list of functions for an I/O manager of an operating system of the one of the respective processor nodes.

7. The method as claimed in claim 6 further comprising:

permitting a peripheral device of one processor node to be bus-connected to the networked devices; and providing a user mode software device gateway that uses the published access interface to permit a driver of the peripheral device to communicate with the network bus driver.

8. The method as claimed in claim 6 further comprising:

permitting a special service of one processor node to be bus-connected to the networked devices; and providing a user mode software service that uses the published user mode access interface to permit a driver of the peripheral device to access the network bus driver.

9. The method as claimed in claim 3 further comprising:

permitting a peripheral device of one processor node to be bus-connected to the networked devices; and providing a kernel mode plug and play driver defining a software device gateway for interfacing a driver of the peripheral device with the network bus driver.

10. The method as claimed in claim 3 further comprising:

permitting memory sharing and distributed processing among at least two processor nodes connected to the network bus;

providing at each of the at least two processor nodes, a distributed memory manager that cooperates with the operating system to define and maintain a shared memory space of distributed memory pages that is consistent with those of the other of the at least two processor nodes to define a pool of shared objects;

providing an addressing scheme for uniquely identifying each of the distributed memory pages; and providing a distributed memory driver of the distributed memory manager for effecting communications over the network bus to update pages of the shared memory space in order to maintain the consistency of the data when changes are made at one of the other of the at least two processor nodes.

11. The method as claimed in claim 10 wherein providing the addressing scheme further comprises:
  providing program instructions for each processing unit running on the same operating system and connected to the same distributed process, to maintain a code space of addressable program instructions, the code space definable by a list of operations loaded and unloaded by the processing unit; and
  providing program instructions for communicating any change in the code space to the corresponding code spaces of processing units of the same distributed process by adding code space change operations to the operation list.

12. The method as claimed in claim 10 wherein providing the distributed memory manager further comprises providing a notification system for permitting shared objects to exchange data.

13. The method as claimed in claim 12 further comprising:
  providing a library of user mode program instructions that permits mutual exclusion of the pages by the at least two processor nodes updating a page to prevent two of the at least two processor nodes from concurrently updating the same page.

14. The method as claimed in claim 13 wherein providing the library to produce the distributed memory manager further comprises providing user mode program instructions for selecting an idle processing unit for a distributed process, the selection being made according to a property of at least one of the distributed process, and a processor node running the processing unit.

15. The method as claimed in claim 10 wherein the at least two processor nodes are adapted to share control of one or more of the hardware devices, and the method further comprises:
  providing at each of the at least two processor nodes connected to the same network bus, a mirror image of a part of a kernel memory space of each of the other of the at least two processor nodes in respective parts of a shared kernel memory space, the part of the kernel space that is mirrored containing context information, and identifying user mode applications using respective device drivers;
  ensuring that a network-wide unique addressing space is used by user mode applications of the at least two processor nodes so that each user mode application is identifiable;
  providing the distributed memory driver with program instructions for exchanging local notifications, and for passing local notifications for requesting and accessing kernel mode memory pages; and
  providing the distributed memory manager with program instructions for effecting a distributed memory service that controls access to the kernel mode memory space.

16. The method as claimed in claim 14 further comprising:
  creating a standby processing unit for a running processing unit, the standby processing unit running on a different processor node from that of the running processing unit;
  providing program instructions for enabling the standby processing unit to passively monitor all system-level object notification messages sent to the processor node with the running processing unit; and
  communicating any change in the code space to the standby processing unit so that if the primary processing unit fails, the standby processing unit can start all of the threads that were running on the primary processing unit.

17. The method as claimed in claim 14 wherein providing a notification system further comprises permitting remote processor nodes to start, stop, suspend, resume, or kill a thread, by issuing a notification to the thread's shared object.

18. The method as claimed in claim 3 further comprising:
  providing one processor node with a plurality of NICs;
  defining an aggregate network bus supported by the plurality of NICs; and
  registering an aggregator to the network bus driver, and registering a NIC driver of each of the plurality of NICs to the aggregator so that the network communications of the aggregator's network bus driver is effected through the aggregator, the aggregator being a plug and play driver having program instructions for transmitting all of the packets received from any of the NICs to the aggregate network bus, and to direct packets from the aggregate network bus toward respective ones of the network buses.

19. The method as claimed in claim 18 further comprising:
  defining a respective network bus for each of the NICs by providing a corresponding network bus driver for each of the NIC drivers; and
  defining an aggregation manager for each of the network buses by providing a plug and play driver for exchanging packets with the aggregator;
  wherein registering the NIC driver to the aggregator comprises registering each of the NIC drivers and aggregation managers to the respective network bus driver, and registering the aggregation managers with the aggregator.

20. The method as claimed in claim 18 wherein registering the aggregator and defining the aggregation manager comprises providing program instructions for effecting an aggregator and aggregation manager instance in compliance with an Ethernet standard for load sharing, load balancing and/or higher reliability connections through redundancy.

21. The method as claimed in claim 1 wherein providing the network bus driver further comprises providing kernel mode program instructions for encrypting and decrypting information exchanged between the hardware devices.

22. The method as claimed in claim 1 further comprising:
  providing a bridge between two or more network buses with a bus-to-bus bridge, the bus-to-bus bridge comprising a plug and play driver coupled to each of the buses;
  communicatively coupling the plug and play drivers to each other; and
  providing program instructions at each of the plug and play drivers for defining and applying permissions that control passage of messages between the network buses.

23. The method as claimed in claim 22 wherein communicatively coupling the plug and play drivers comprises establishing a communications link between the two plug and play drivers that are implemented on respective processor nodes.

24. The method as claimed in claim 1 wherein providing said device driver comprises:
  instantiating a driver for a base OS network subsystem support allowing communications with standard data networking equipment and processes.

25. A system for defining a network bus between a plurality of hardware devices interconnected over a data network by network interface circuitry (NIC) without the need for network stack processing, at least one of said plurality of hardware devices being a processor node having processing capability, the system comprising said at least one processor node, each processor node comprising:
  a network bus driver, a bus adapter driver and a NIC, said network bus driver configured to control exchange of network messages by accessing said NIC through said bus adapter driver, said bus adapter driver controlling said NIC;

an NIC driver for each of said plurality of hardware devices registered on said processor node to permit the network bus driver on that processor node to effect communications with respective NICs for said hardware devices via the data network;

a device driver for each of said plurality of hardware devices for controlling respective hardware devices through said network bus driver; and program instructions for creating a software abstraction layer of said network bus for communicating between said plurality of hardware devices by registering said bus adapter driver with said network bus driver instead of an operating system (OS) on said processor node as a network provider thus bypassing network stack processing, and having said bus adapter driver forward received messages to said network bus driver;

wherein said software abstraction layer permits said plurality of hardware devices to be seen as physical resources available to each processor node and configures said hardware devices to communicate as if over a bus to share resources at a network bus level removing the need for said network stack processing.

26. The system as claimed in claim 25 wherein the NIC driver is a plug and play driver for controlling the NIC.

27. The system as claimed in claim 25 further comprising:
device drivers instantiated for the hardware devices that may be added to or removed from the data network while at least one processor node remains connected to the data network;

program instructions at the at least one processor node for defining a device monitoring function that uses network messaging to detect the connection and disconnection of the hardware devices from the data network; and program instructions at the at least one processor node for defining a plug and play functionality for adding and deleting device driver instances in response to detected connection and disconnection of the hardware devices.

28. The system as claimed in claim 27 wherein the device monitoring function program instructions comprise:

a device enumerator registered to receive all network messages from the network bus driver that are not addressed to a plug and play device driver, the device enumerator being adapted to broadcast a message requesting all hardware devices reply with an auto-identification message, and to declare a new hardware device to the plug and play functionality upon receipt of an auto-identification message from a hardware device that is not enumerated;

a timeout mechanism for each of the enumerated hardware devices; and a monitor for resetting a timer of a corresponding hardware device whenever a message is received from the corresponding hardware device; issuing a request for a response from the corresponding hardware device whenever the hardware device's timer expires; and declaring the corresponding hardware device dropped to the plug and play functionality if no response is received within a predetermined time after a predetermined number of requests have been issued.

29. The system as claimed in claim 28 wherein the device enumerator comprises kernel mode program instructions.

30. The system as claimed in claim 28 wherein the at least one processor node further comprises:

a kernel mode plug and play device driver defining a device and service connector in communication with the network bus driver;

a user mode access interface for permitting device and service drivers to access the network bus driver through the device and service connector, the user mode access interface defining a list of functions for an I/O manager of an operating system of the at least one processor node; and the device enumerator comprises user mode program instructions that use the user mode access interface to communicate with the network bus driver in order to exchange the broadcast request message and receive the auto-identification messages.

31. The system as claimed in claim 30 wherein the system further permits a peripheral device of one of the at least one processor node to be accessed by the network bus, and the system further comprises:

a user mode software device gateway for the peripheral that connects to a driver of the peripheral device, and uses the access interface to access the network bus driver, the software device gateway providing for the connection of the peripheral device driver to the network bus.

32. The system as claimed in claim 30 wherein the system further permits a special service of one of the each processor node to be accessed by the network bus, and the system further comprises user mode program instructions defining the special service that uses the access interface to access the network bus driver.

33. The system as claimed in claim 28 further comprising:
a peripheral device of one of the at least one processor node is accessible by the network bus; and a kernel mode plug and play driver defining a software device gateway for interfacing a driver of the peripheral device with the network bus driver.

34. The system as claimed in claim 27 further comprising:
permitting memory sharing and distributed processing among at least two processor nodes connected to the network bus;

at each of the at least two processor node, a distributed memory manager that cooperates with the operating system to define and maintain a shared memory space of distributed memory pages that is consistent with those of the other of the at least two processor nodes for storing shared objects;

the distributed memory manager including a library of user mode program instructions for maintaining an addressing scheme that uniquely identifies each of the distributed memory pages; and a plug and play distributed memory driver of the distributed memory manager for effecting communications over the network bus to update pages of the shared memory space, in order to maintain the consistency of the data when changes are made at the other of the at least two processor nodes.

35. The system as claimed in claim 34 further comprising:
program instructions that maintain a code space of addressable program instructions for each processing unit running on a same operating system and connected to the same distributed process, a content of the code space being definable by a list of operations loaded and unloaded by the processing unit; and program instructions for communicating any change in the code space to corresponding code spaces of other processing units of the same distributed process by adding code space change operations to the operation list.

36. The system as claimed in claim 35 wherein the system permits each processing unit of a same distributed process to call methods to be effected at processing units of remote processor nodes.

37. The system as claimed in claim 35 wherein the distributed memory manager further comprises program instructions for effecting a notification system for permitting shared objects to exchange data.

38. The system as claimed in claim 35 wherein the distributed memory manager library further comprises program instructions that permit mutual exclusion of the data structures by the processing units to prevent two processor units from concurrently updating the same data structure.

39. The system as claimed in claim 38 wherein the distributed memory manager library further comprises user mode program instructions for selecting an idle processing unit for a distributed process, the selection being made according to a property of at least one of the distributed process, and a processor node running the processing unit.

40. The system as claimed in claim 35 wherein each of the at least two processor nodes is adapted to share control of one or more of the hardware devices with each other of the at least two processor nodes.

41. The system as claimed in claim 40 further comprising:
at each of the at least two processor nodes connected to one network bus, a mirror image of a part of a kernel memory space of the each of the other at least two processor nodes in respective parts of a shared kernel memory space, the part of the kernel memory space that is mirrored containing context information, and identifying user mode applications using respective device drivers;
a network-wide unique addressing space for user mode applications of the at least two processor nodes so that each user mode application is identifiable;
program instructions of the distributed memory driver for exchanging local notifications for requesting and accessing kernel mode memory pages; and
program instructions of the distributed memory manager library for effecting a distributed memory service that controls access to the kernel mode memory space.

42. The system as claimed in claim 37 further comprising:
a standby processing unit for at least one running processing unit,
each standby processing unit running on a different processor node from that of the running processing unit;
program instructions for enabling the standby processing unit to passively monitor all system-level object notifications sent to the processor node with the running processing unit; and
program instructions for communicating any change in the code space to the standby processing unit so that if the primary processing unit fails, the standby processing unit can start each thread that was running on the primary processing unit.

43. The system as claimed in claim 27 wherein one of the at least one processor node comprises a plurality of NICs, and the network bus is an aggregate network bus supported by the plurality of NICs.

44. The system as claimed in claim 43 further comprising a plug and play driver enabled to communicate with the network bus driver defining an aggregator, wherein a NIC driver for each of the plurality of NICs are enabled to communicate with the aggregator, so that the network communications of the network bus driver are effected through the aggregator, the aggregator being adapted to transmit all of the packets received from any of the NICs to the aggregate network bus, and to direct packets from the aggregate network bus toward respective ones of the network buses.

45. The system as claimed in claim 43 further comprising:
a network bus driver for each of the NIC drivers defining respective network buses for each of the NICs; and
an aggregation manager for each of the network buses, the aggregation manager comprising a plug and play driver for exchanging packets with the aggregator.

46. The system as claimed in claim 45 wherein the aggregator and the aggregation manager comprises program instructions for effecting an aggregator and aggregation manager instance in compliance with an Ethernet standard for load sharing, load balancing and/or higher reliability connections through redundancy.

47. The system as claimed in claim 25 wherein the network bus driver further comprises kernel mode program instructions for encrypting and decrypting information exchanged between the hardware devices.

48. The system as claimed in claim 25 further comprising:
a bus-to-bus bridge between the network bus and another similar network bus, the bus-to-bus bridge comprising a plug and play driver coupled to the network bus, and another plug and play driver coupled to the other network bus;
a communications link coupling the plug and play drivers to each other; and
program instructions at each of the plug and play drivers for defining and applying permissions that control a passage of messages between the network buses.

49. The system as claimed in claim 48 wherein the communications link coupling the plug and play drivers comprises a network communications link between the two plug and play drivers that are implemented on respective ones of the at least one processor node.

50. The system as claimed in claim 25 wherein the hardware device are drivers instantiated for an OS network subsystem support allowing communications using standard data network equipment and processes.

* * * * *